US009069853B2

(12) United States Patent
Stading

(10) Patent No.: US 9,069,853 B2
(45) Date of Patent: Jun. 30, 2015

(54) SYSTEM AND METHOD OF GOAL-ORIENTED SEARCHING

(75) Inventor: Tyron Jerrod Stading, Austin, TX (US)

(73) Assignee: Innography, Inc., Austin, TX (US)

( * ) Notice: Subject to any disclaimer, the term of this patent is extended or adjusted under 35 U.S.C. 154(b) by 495 days.

(21) Appl. No.: 11/731,377

(22) Filed: Mar. 30, 2007

(65) Prior Publication Data

US 2008/0243786 A1 Oct. 2, 2008

(51) Int. Cl.
*G06F 17/30* (2006.01)

(52) U.S. Cl.
CPC .... *G06F 17/30864* (2013.01); *G06F 17/30011* (2013.01); *G06F 2216/11* (2013.01)

(58) Field of Classification Search
CPC ............... G06F 17/30696; G06F 17/30867; G06F 17/30011; G06F 17/3064; G06F 17/30864; G06F 2216/11
See application file for complete search history.

(56) References Cited

U.S. PATENT DOCUMENTS

| | | | | |
|---|---|---|---|---|
| 4,751,635 A * | 6/1988 | Kret | | 1/1 |
| 6,370,537 B1 * | 4/2002 | Gilbert et al. | | 1/1 |
| 7,403,942 B1 * | 7/2008 | Bayliss | | 707/748 |
| 7,814,096 B1 * | 10/2010 | Roy | | 707/721 |
| 7,885,987 B1 * | 2/2011 | Lee | | 707/923 |
| 8,078,545 B1 * | 12/2011 | Zilka et al. | | 705/310 |
| 8,161,025 B2 * | 4/2012 | Lundberg et al. | | 707/706 |
| 8,204,897 B1 * | 6/2012 | Djabarov et al. | | 707/767 |
| 2003/0033295 A1 * | 2/2003 | Adler et al. | | 707/3 |
| 2003/0115191 A1 * | 6/2003 | Copperman et al. | | 707/3 |
| 2005/0131882 A1 * | 6/2005 | Beretich et al. | | 707/3 |
| 2005/0160080 A1 * | 7/2005 | Dawson | | 707/3 |
| 2005/0210008 A1 * | 9/2005 | Tran et al. | | 707/3 |
| 2006/0106847 A1 * | 5/2006 | Eckardt et al. | | 707/101 |
| 2006/0155694 A1 * | 7/2006 | Chowdhury et al. | | 707/4 |
| 2006/0248120 A1 * | 11/2006 | Sukman | | 707/104.1 |
| 2007/0050351 A1 * | 3/2007 | Kasperski et al. | | 707/4 |
| 2007/0168331 A1 * | 7/2007 | Reddy et al. | | 707/3 |
| 2008/0010251 A1 * | 1/2008 | Fontoura et al. | | 707/3 |
| 2008/0086507 A1 * | 4/2008 | Szygenda et al. | | 707/104.1 |
| 2008/0154848 A1 * | 6/2008 | Haslam et al. | | 707/3 |
| 2009/0172783 A1 * | 7/2009 | Eberstadt | | 726/4 |
| 2010/0106752 A1 * | 4/2010 | Eckardt et al. | | 707/805 |
| 2011/0137902 A1 * | 6/2011 | Wable et al. | | 707/737 |

\* cited by examiner

*Primary Examiner* — Polina Peach
(74) *Attorney, Agent, or Firm* — Cesari & Reed LLP; R. Michael Reed

(57) ABSTRACT

In a particular embodiment, a method of goal-oriented searching is disclosed that includes providing a graphical user interface including an input and a selectable indicator. The selectable indicator is related to a pre-defined query associated with a particular goal. The particular goal includes multiple criteria. The method also includes receiving data related to the input and inserting the data into the pre-defined query to produce a goal-oriented query to identify one or more documents that satisfy the multiple criteria.

28 Claims, 39 Drawing Sheets

SYSTEM AND METHOD OF GOAL-ORIENTED SEARCHING

FIELD OF THE DISCLOSURE

The present disclosure is generally related to systems and methods of searching data sources.

BACKGROUND

In general, public information sources, such as the Internet, present challenges for information retrieval. The volume of information available via the Internet grows daily, and search engine technologies have scaled dramatically to keep up with such growth. Conventionally, search engines, such as those provided by Yahoo, Google, and others, utilize data collection technologies, such as spiders, bots, and web crawlers, which are software applications that access web pages and trace hypertext links in order to generate an index of web page information. The data collected by such software applications is typically stored as pre-processed data on which search engines may operate to perform searches and to retrieve information.

Additionally, a vast amount of data exists that is not accessible to the public Internet (e.g., "dark web" data, internal data; internal application data, private data, subscription database data, other data sources, or any combination thereof). Such data can often be searched via private access interfaces, private search tools, other application program interfaces, or any combination thereof. Such information may be segregated from other information sources, requiring multiple interfaces, multiple protocols, multiple formats, and different database drivers to access the data. Accordingly, information retrieval can be complicated by the variety of data sources.

To improve the quality of search results and to remove "junk results," search engines may include logic or tools to fine-tune the search results. In some instances, such fine-tuning may be based on relevance to other users, on a number of links from other web pages to a particular resource, or on a combination of information that is not specific to a user's interests (i.e. the user's search and the question related to the user's search). Additionally, with the volume of search results, even after fine-tuning, it often remains difficult to identify desired information. Hence, there is a need for an improved system and method of searching distributed data sources.

DETAILED DESCRIPTION OF THE DRAWINGS

In a particular embodiment, a system is disclosed to search one or more data sources. The system includes an interface to a network, a visualization system to provide a search interface to a destination device via the network, and a search system. The search system communicates with the interface to receive a query from the destination device. The search system proxies the query to search multiple data sources, receives search results from the multiple data sources, and extracts data from the search results. The system also includes a personalization system to personalize the search results from the multiple data sources to a particular user.

In a particular embodiment, a method of goal-oriented searching is disclosed that includes providing a graphical user interface including an input and a selectable indicator. The selectable indicator is related to a pre-defined query associated with a particular goal. The particular goal includes multiple criteria. The method also includes receiving data related to the input and inserting the data into the pre-defined query to produce a goal-oriented query to identify one or more documents that satisfy the multiple criteria.

In another particular embodiment, a system to perform a goal-oriented search is disclosed that includes a server system. The server system includes processing logic and memory accessible to the processing logic. The memory includes instructions executable by the processor to provide a graphical user interface including a text input and a selectable indicator to a destination device. The selectable indicator is related to a pre-defined query associated with a particular goal, where the particular goal is defined by multiple criteria. The memory also includes instructions executable by the processing logic to receive data from the destination device and to insert the data into the pre-defined query to produce a goal-oriented query constructed to identify one or more documents that satisfy the multiple criteria.

In still another particular embodiment, a method of goal-oriented searching is disclosed that includes receiving an input and an identifier related to a pre-defined goal, where the pre-defined goal includes multiple criteria. The method also includes inserting the data into a pre-defined query to produce a goal-oriented query constructed to identify one or more documents that satisfy the multiple criteria.

Figure 1:
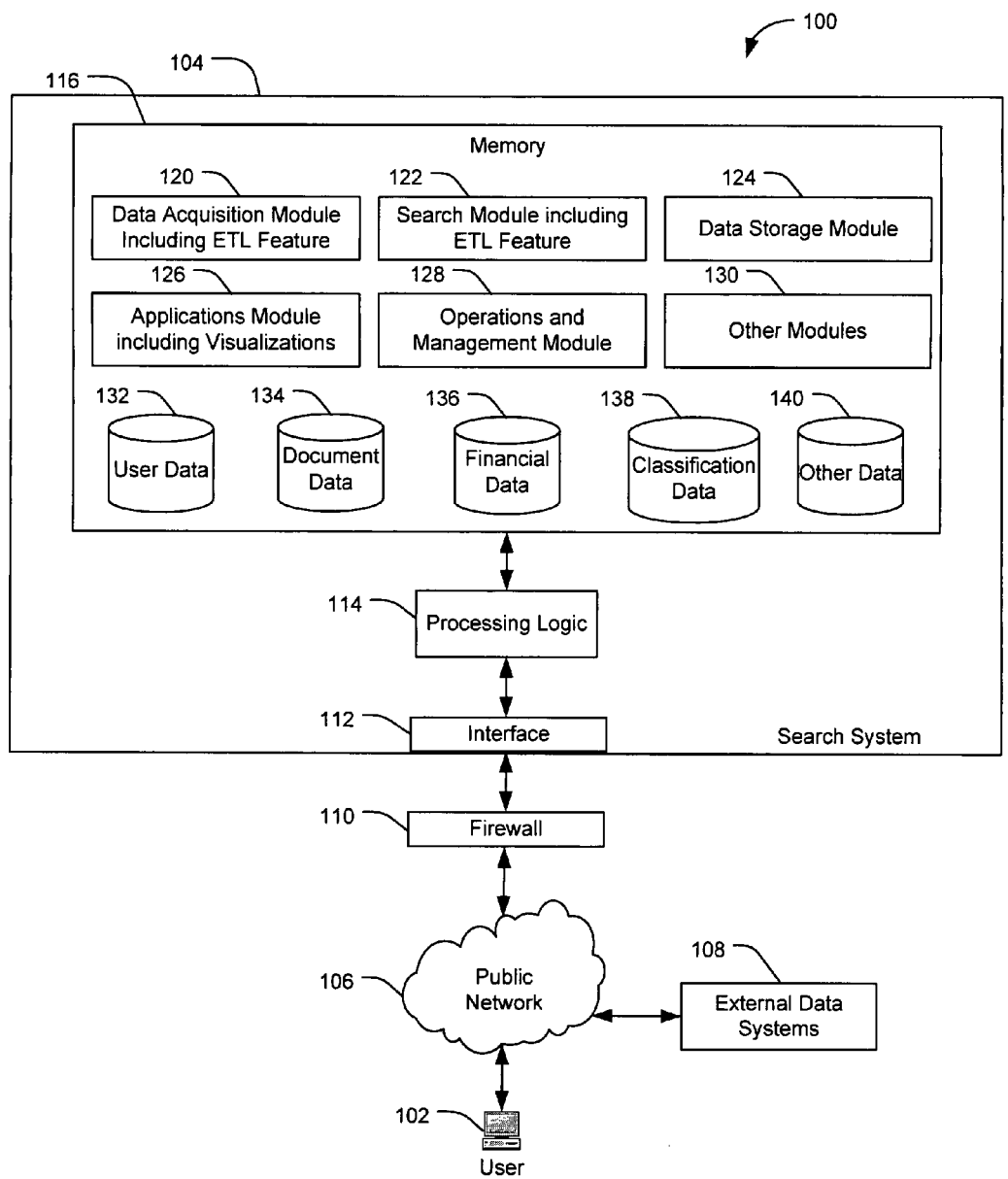
FIG. 1 is a block diagram of a particular illustrative embodiment of a system to search data sources.

FIG. 1 is a block diagram of a particular illustrative embodiment of a system 100 to search data sources. The system 100 includes a user device 102 that can communicate with a search system 104 via a network 106. In a particular illustrative embodiment, the network 106 may be a public network (such as the Internet), a private network (such as a corporate intranet, a virtual private network, an enterprise system, or any combination thereof), or any combination thereof. In general, multiple remote devices, such as the user device 102, can communicate with the search system 104 via the network 106. In a particular illustrative embodiment, the user device 102 may represent any device having access to the Internet and that is capable of executing an Internet browser application, such as a computer, a web-enabled mobile phone, a personal digital assistant (PDA), a set-top box device, or any combination thereof.

Additionally, the search system 104 may communicate with one or more external data sources 108, such as web sites, commercial databases, libraries, government sites, internal or private data sources, user-generated data (i.e. meta-data, user-tagged data, web logs (blogs), or other user-generated data), other data sources, or any combination thereof. Such external data sources 108 may include structured data (such as pre-processed data, database records, other structured data, or any combination thereof), semi-structured data (such as tagged data, e.g., hypertext markup language (HTML); extensible markup language (XML); formatted data; or any combination thereof), and unstructured data (such as text). In a particular illustrative embodiment, the structured data may include indexed data, such as data that is assembled using an automated software application, such as a spider, a "bot," a software agent, or other software, which is commonly used by search engine applications to index data sources for later retrieval. The search system 104 can communicate via the network 106 with the user device 102, with the external data sources 108, and with other devices through a firewall 110, which provides security to the search system 104 to prevent undesired intrusions.

The search system 104 includes an interface 112 that is responsive to the network 106, processing logic 114 that is coupled to the interface 112, and memory 116 that is accessible to the processing logic 114. In a particular illustrative embodiment, the search system 104 may include multiple servers having separate processors and memory devices, which may cooperate to provide the search system 104. The memory 116 includes a data acquisition module 120, including an extract-transform-load (ETL) feature, that is executable by the processing logic 114 to acquire data from the external data sources 108 and to extract, transform and load the acquired data into one or more data stores, including a document data storage 134. In a particular illustrative embodiment, the ETL feature of the data acquisition module 120 can identify missing information (such as missing fields, missing meta-data, garbled information, omitted data, or any combination thereof) and can make probabilistic determinations to assign values in lieu of the missing information. For example, in a particular illustrative embodiment, the data acquisition module 120 identifies missing assignee information associated with a particular patent and makes a probabilistic determination to extrapolate a likely assignee of the patent.

The memory 116 may also include a search module 122 having an ETL feature. The search module 122 can be executed by the processing logic 114 to receive a query, to generate queries to other search engines and to one or more of the other data sources 108, and to extract data from search results (using the ETL feature). In a particular illustrative embodiment, the search module 122 may include a query learner to monitor user interactions with search results, to receive user input related to relevance of selected search results, to determine a desired result based on the user input and the initial query, and to generate new queries based on determining the desired result.

The memory 116 may also include a data storage module 124 that is executable by the processing logic 114 to store retrieved data, metadata, statistics, other data, or any combination thereof. The memory 116 may include a user data storage 132, a document data storage 134, a financial data storage 136, a classification information data storage 138, other data storage 140, or any combination thereof. The user data storage 132 can include user-provided tags (descriptions, meta-data, categories, or other information) related to documents or data associated with other stored information. The user data storage 132 can also include correlations to user-created data, such as spreadsheet data, table data, document data, web log (blog) data, other data, or any combination thereof.

The document data storage 134 can include meta-data about documents (e.g., ownership data, location data, authorship data, date information, classification data, publication/source data, relationship/reference data, embedded tags, other data, or any combination thereof). In a particular illustrative, non-limiting embodiment, the document data storage 134 can include data related to particular structured documents, such as Patents, Published Patent Applications, and other structured documents. In such an instance, the document data storage 134 can include data related to the title, the inventors, the assignee, the priority data, the claims (e.g., number of claims, number of independent claims, claim terms, types of claims, other information, or any combination thereof), the Abstract (e.g., text of the abstract, keywords extracted from the abstract, a number of words in the Abstract, other information related to the abstract, or any combination thereof), the file history (e.g., whether claims were amended during prosecution, a list of cited references, links to file wrapper documents, other information, or any combination thereof), excerpts from the specification that relate to search terms, or any combination thereof. The document data storage 134 may also include various documents, such as Patents, journals, research papers, white papers, product documents, web sites (i.e. as a stored source file), articles, press releases, books, manuals, presentations, reports, sales information, any other document containing text, or any combination thereof.

In a particular illustrative embodiment, the financial data storage 136 can include revenues, profits, credit history, price-to-earnings (P/E) ratio, industry data for classification of tax records, Securities and Exchange Commission (SEC) reports, stock prices, stock trends, other financial data, or any combination thereof, that is related to each particular company. In another particular illustrative embodiment, the financial data storage 136 may also include financial data related to individuals, organizations, associations, other entities that have financial information, or any combination thereof. In still another particular illustrative embodiment, the financial data storage 136 can include other financial information that can be related to any category of interest.

In a particular illustrative embodiment, particular financial data may be added to the financial data storage 136 to provide customized data to a particular enterprise. The financial data storage 136 may also include information that is not financial, but that is related to an entity's structure, size, organization, or other information. For example, the financial data storage 136 may include employee records, number of employees, subsidiary information, corporate officer information, tax jurisdictions, governmental grants (such as a Small Business Innovative Research (SBIR) grants, Small Business Administration (SBA) loans, other governmental grants), press release data, contracts, and other data that is related to the financial data of a particular company, entity, individual, association, or enterprise. In another particular illustrative embodiment, the financial data storage 136 can include enterprise resource planning (ERP) data, sales data, customer relationship management (CRM) data, other enterprise data, or any combination thereof.

In a particular illustrative embodiment, the classification information data storage 138 can include multiple industry classifications and data related to those classifications. For example, the classification information data storage 138 can include a number of companies in each industry, a number of employees of each industry, average salaries of employees, revenues of companies, average revenues, average payroll, average number of companies per classification, other information, or any combination thereof. In a particular illustrative embodiment, the classification information data storage 138 can include location information, which may be summarized by region, state, city, zip code information, or any combination thereof. In a particular illustrative embodiment, the classification information data storage can include normalized classifications that are translated from North American Industry Classification System (NAICS) classifications, Standard Industry Classification (SIC) system classifications, United States Patent and Trademark Office classifications, international classification systems, legal classification systems, Reuter's classifications systems (news release categories), other news services classification systems, or any combination thereof. Additionally, the classification information system can include normalized translations that are translated from any industry-specific taxonomy, including medical indices, semiconductor industry classifications, consumer product classifications, other classifications, or any combination thereof. The classification data storage 138 also includes associations between classifications from various sources. In a particular illustrative embodiment, the classification data storage system 138 can include buyer information and supplier information that is related to a particular industry. In a particular illustrative embodiment, the classification data storage system 138 can include logic to translate or to integrate classifications from various classification systems to an intermediate classification system.

In a particular illustrative embodiment, other data storage 140 can include legal information, such as litigation-related data, including length of cases (start date and end date), decisions/outcomes of the cases, damages requested, damages granted, winners, actions of the cases (i.e. injunction, transfer, court-ordered royalties, other information), the plaintiffs, the defendants, the asserted intellectual property information, jurisdiction information, location information (of the parties, of the court, etc.), rates of settlement, dismissal, verdict, unknown, settlement, statistics, other data, or any combination thereof. The other data storage 140 can also include corporate legal department information, including licensing information, names of legal department contacts, other information, or any combination thereof. In a particular illustrative embodiment, the other data storage 140 can also include corporation data, Securities and Exchange Commission (SEC) filings (i.e. litigation information, including settlements, on-going litigation, and other litigation information extracted from the SEC filings), legislative information, other data, or any combination thereof. In another particular illustrative embodiment, the other data storage 140 can also include person information (i.e. telephone whitepages, yellowpages, other people "find" features, or any combination thereof).

In a particular illustrative embodiment, the user data storage 132, the document data storage 134, the financial data storage 136, the classification information data storage 138, and the other data storage 140 may be stored at different servers, which may be in different geographic locations. In another particular embodiment, the user data storage 132, the document data storage 134, the financial data storage 136, the classification information data storage 138, and the other data storage 140 may be stored at a storage server device. In another particular illustrative embodiment, the user data storage 132, the document data storage 134, the financial data storage 136, the classification information data storage 138 and the other data storage 140 may be stored in a single data store, which may be accessible to one or more servers.

The memory 116 also includes an applications module 126 that is executable by the processing logic 114 to generate graphical maps, charts, dashboard elements, other visual representations, or any combination thereof, for visual analysis of particular data elements, including search results, data derived from the search results, corporate data, industry data, document data, document statistics, other data, or any combination thereof. Additionally, the applications module 126 can be executed by the processing logic 114 to reverse engineer user queries, to track user interactions with search results, and to evaluate explicit user feedback to train a query learner application and a document learner application and to automatically generate new searches. Further, the applications module 126 can be executed by the processing logic 114 to analyze the search results, to apply rules derived from the document learner, to refine the search results, and to produce additional information about the search results.

The memory 116 also includes an operations and management module 128 that is executable by the processing logic 114 to manage subscriber accounts, to manage individual sessions, to generate alerts and other communications, and to control a user experience with the search system 104. Depending on the particular implementation, the memory 116 can also include other modules 130 that can be executed by the processing logic 114, such as a graphical user interface (GUI) generator to generate a graphical user interface, including multiple selectable options.

In a particular illustrative embodiment, the search system 104 may provide a graphical user interface (GUI) that may be rendered within an Internet browser application of a remote computing device, such as the user device 102. The GUI may request a username and password, which can be entered via the user device 102 to access the search system 104. The search system 104 receives a username and password via the network 106, verifies the username and password using the operations and management module 128, and retrieves subscriber account information associated with the username and password. For example, the search system 104 may retrieve stored information, including search information, messages, stored analysis, and other information. The search system 104 may generate a GUI that includes selected portions of the stored information.

In a particular illustrative embodiment, the search system 104 can search structured data, semi-structured data, and unstructured data from one or more data sources, can merge search results from each of the data sources, and can provide the search results to the user via a GUI. In a particular embodiment, the processing logic 114 may execute the data acquisition module 120 to extract data from documents associated with the search results and to calculate statistics related to the documents. The processing logic 114 may access the search module 122 to generate queries based on the extracted data or user metadata (such as a role assigned to a particular user, e.g., an administrator role, a guest role, a user role, another role, or any combination thereof). The processing logic 114 performs a secondary search related to the extracted data or metadata. The search system 104 may augment the search results with results from the secondary search.

In a particular illustrative example, the search system 104 may search a variety of data sources using one or more keywords (which may be provided by a user via the user device 102). The search system 104 may receive search results that satisfy the query string. Each search result may be associated with a particular document, which may include structured data, semi-structured data, unstructured data, or any combination thereof. The search system 104 may extract data from each document, such as ownership data (i.e. an assignee, an author, etc.) and may generate a secondary query based on the extracted data. For example, the search system 104 may extract ownership data and location data from each of the documents, where the ownership data identifies a corporation that is associated with the document and where the location data identifies a location associated with the corporation, with the inventors, or any combination thereof. The search system 104 may utilize the extracted data to generate a secondary query, which the search system 104 may use to search the financial database 136, the classification information data 138, and the other data 140 for secondary data related to the identified corporations or related to other meaningful entities (such as a person's contact information).

In a particular illustrative embodiment, the search system 104 may utilize data derived from the secondary search of the classification information data 138 to identify industry classifications. The search system 104 may utilize the identified industry classifications to categorize or classify each of the search results with one or more of the industry classifications. Thus, classification data may be utilized to normalize retrieved data across distributed data sources and data types, including structured and unstructured data sources. In a particular embodiment, the search system 104 may associated each of the search results into multiple categories, including an industry category, a date category, a geographic location category, a document source category, other categories, or any combination thereof. In a particular illustrative embodiment, the search system 104 may associate each document with an industry classification that corresponds to the owner of the document (i.e. the assignee, the source, etc.). Additionally, the search system 104 may associate each document with a particular date associated with the publication, the priority date (i.e. patent priority date), or other date related information. Further, the search system 104 may associate each document with a geographic location that is related to the ownership data. The search system 104 can generate a GUI that includes the search results and includes multiple control options based on the industry classifications, which may be selected to refine the view of the search results. For example, at least one of the control options can be a negation control option, which can be selected to remove items from the search results that are associated with a particular industry classification.

In a particular illustrative embodiment, the search system 104 can generate a graphical user interface and provide the graphical user interface to the user device 102 via the network 106. The graphical user interface can include a text input, a graphical map having multiple selectable graphic elements, links, menu options, or any combination thereof. In a particular embodiment, the graphical user interface includes search results, statistical data derived from the search results, and secondary data related to the search results. The graphical user interface can provide multiple different views of the search results to allow a user to visualize the same search results from different perspectives. Further, the graphical user interface may allow a user to share a snapshot of the search results with another user via the network 106. While the data available from the multiple data sources may change over time, the snapshot represents a picture of the search results at a point in time.

In a particular illustrative embodiment, the snapshot represents a stored instance of particular search parameters. The search system 104 can store the date and time that the particular snapshot is taken, and any modifications from previous stored snapshots (i.e. versioning). The search system 104 may store the search parameters. During a save process, the search system 104 may prompt a user to designate whether and how he or she wishes to be notified by an alert under particular circumstances, such as when the saved search parameters uncover a new search result. The server system 104 can generate an alert (such as an email, a text message, a pager notification, instant messaging, a letter via the United States Postal Service, a phone call, other alerts, or any combination thereof). In a particular embodiment, when a user logs into the search system 104, the search system 104 may provide a graphical user interface to bring the user up-to-date with respect to any changes to the search results since the last time the user logged into the search system 104. In another particular illustrative embodiment, the search system 104 can apply user-specific filters to filter out search results based on implicit or explicit user input.

Figure 2:
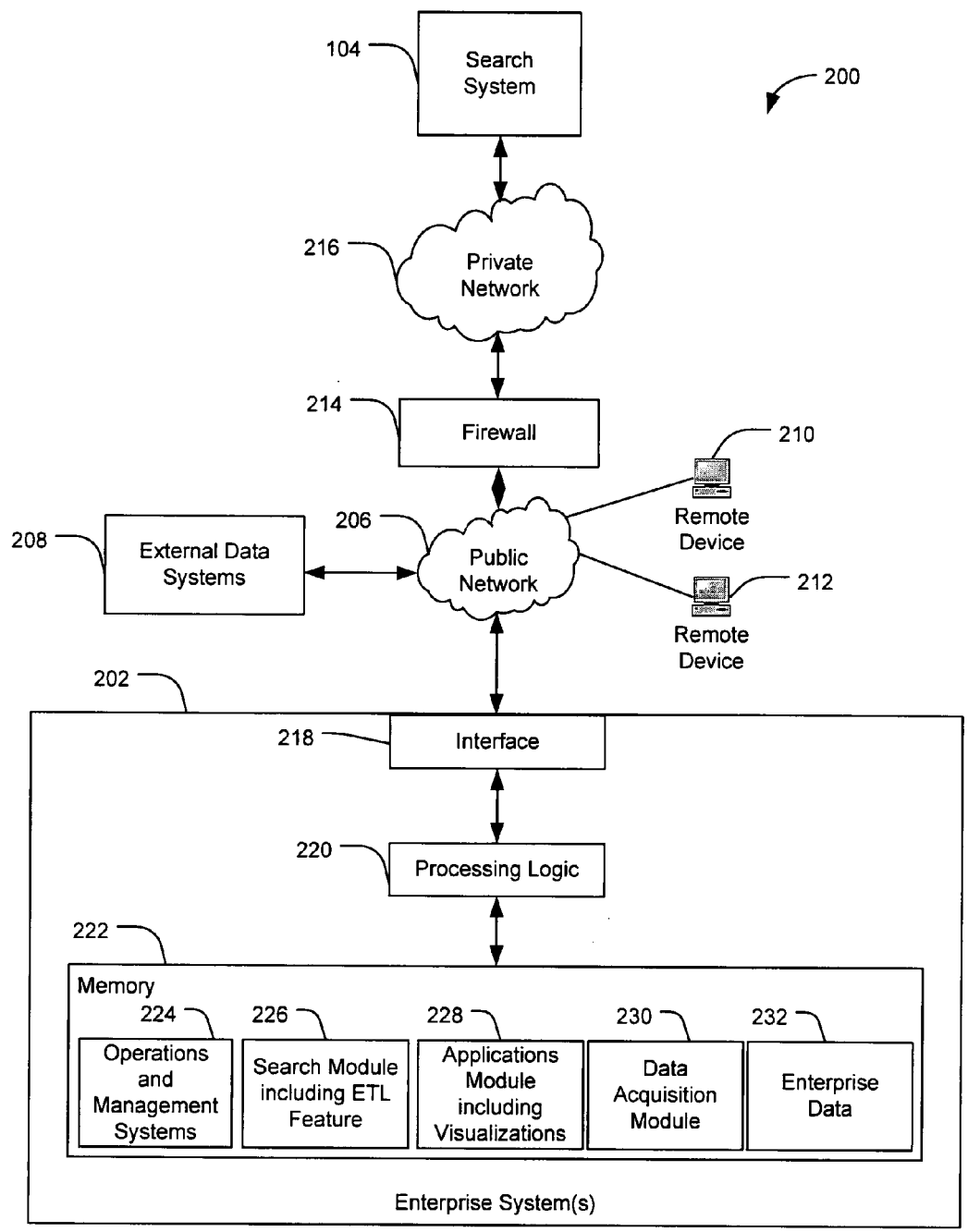
FIG. 2 is a block diagram of a second particular illustrative embodiment of a system to search data sources.

FIG. 2 is a block diagram of a second particular illustrative embodiment of a distributed system 200 to search data sources. The system 200 includes the search system 104, which may communicate with an enterprise system 202 via a public network 206, such as the Internet. The enterprise system 202 can be a corporation, a law firm, a business entity, an individual, or any combination thereof.

In general, the search system 104 may communicate with the enterprise system 202 via the public network 206 through a firewall 214, which prevents unauthorized access to a private network 216 (such as a restricted access network) associated with the search system 104. In a particular embodiment, the search system 104 may include multiple servers that communicate over a local area network (private network 216), which the firewall 214 can isolate from the public network 206 to prevent unauthorized access.

The search system 104 and the enterprise system 202 can communicate with external data systems 208 and remote devices 210 and 212 via the public network 206. In a particular illustrative embodiment, the external data systems 208 can include any number of data sources, including commercial databases, secure data, websites, governmental websites, public data repositories, other data sources, or any combination thereof. The remote devices 210 and 212 can include any device that is capable of executing an Internet browser application to access the public network 206. The remote devices 210 and 212 can be computers, mobile telephone devices, portable digital assistants (PDAs), set-top box devices, other computing devices, or any combination thereof. In a particular illustrative embodiment, the remote device 210 may be associated with a user having a subscription with the search system 104, and the remote device 212 may be associated with a user having an account with the enterprise system 202.

The enterprise system 202 includes an interface responsive to the network 206, processing logic 220 and memory 222 accessible to the processing logic 220. The memory 222 can include operations and management systems 224 executable by the processing logic to manage user access and to manage a user experience with the enterprise system 202. The operations and management module 128 can also manage subscriber accounts, to manage individual sessions, to generate alerts and other communications, and to control a user experience with the search system 202.

The memory 222 can also include a search module 226 including an extract-transform-load (ETL) feature that can be executed by the processing logic 220 to receive a query, to generate queries to other search engines and to one or more of the other data sources 208, and to extract data from search results (using the ETL feature). In a particular illustrative embodiment, the search module 226 may include a query learner to monitor user interactions with search results, to receive user input related to relevance of selected search results, to determine a desired result based on the user input and the initial query, and to generate new queries based on the determination. Additionally, the applications module 228 can be executed by the processing logic 220 to reverse engineer user queries, to track user interactions with search results, and to evaluate explicit user feedback to train a query learner application and a document learner application and to automatically generate new searches. Further, the applications module 228 can be executed by the processing logic 220 to analyze the search results, to apply rules derived from the document learner, and to refine the search results and produce additional information about the search results.

The memory 222 may also include a data storage module 230 that is executable by the processing logic 220 to store retrieved documents, user-created tags, data, metadata, statistics, other data, or any combination thereof. The data storage module 230 may extract data from search results, transform the extracted data, and load the extracted data into a data storage, such as a database within the enterprise data 232. The enterprise data 232 can include private data, which may include structured data (such as database records), semi-structured data (such as word-processing documents, tagged data, e.g., markup language data including extensible markup language (XML) documents, hypertext markup language (HTML) documents, other semi-structured data, or any combination thereof), and unstructured data (i.e. text data, image data, audio data, or any combination thereof).

In a particular illustrative embodiment, a user may utilize the remote device 212 to access the enterprise system(s) 202 via the public network 206. The user may access the search module 226 to search the enterprise data 232 and to search external data systems 208 with a single query. The enterprise system 202 can extract data from the search results and use the search module 226 and the applications module 228 to generate a secondary query based on the search results. The enterprise system 202 can send the secondary query to the enterprise data 232, the external data systems 208, and the search system 104. Further, the enterprise system 202 can receive secondary data related to the secondary query and can use the secondary data to augment the search results. The enterprise system 202 can merge the search results from the various data sources, can augment the merged search results with the secondary data, and can generate a graphical user interface including the augmented search results to the remote device 212.

Figure 3:
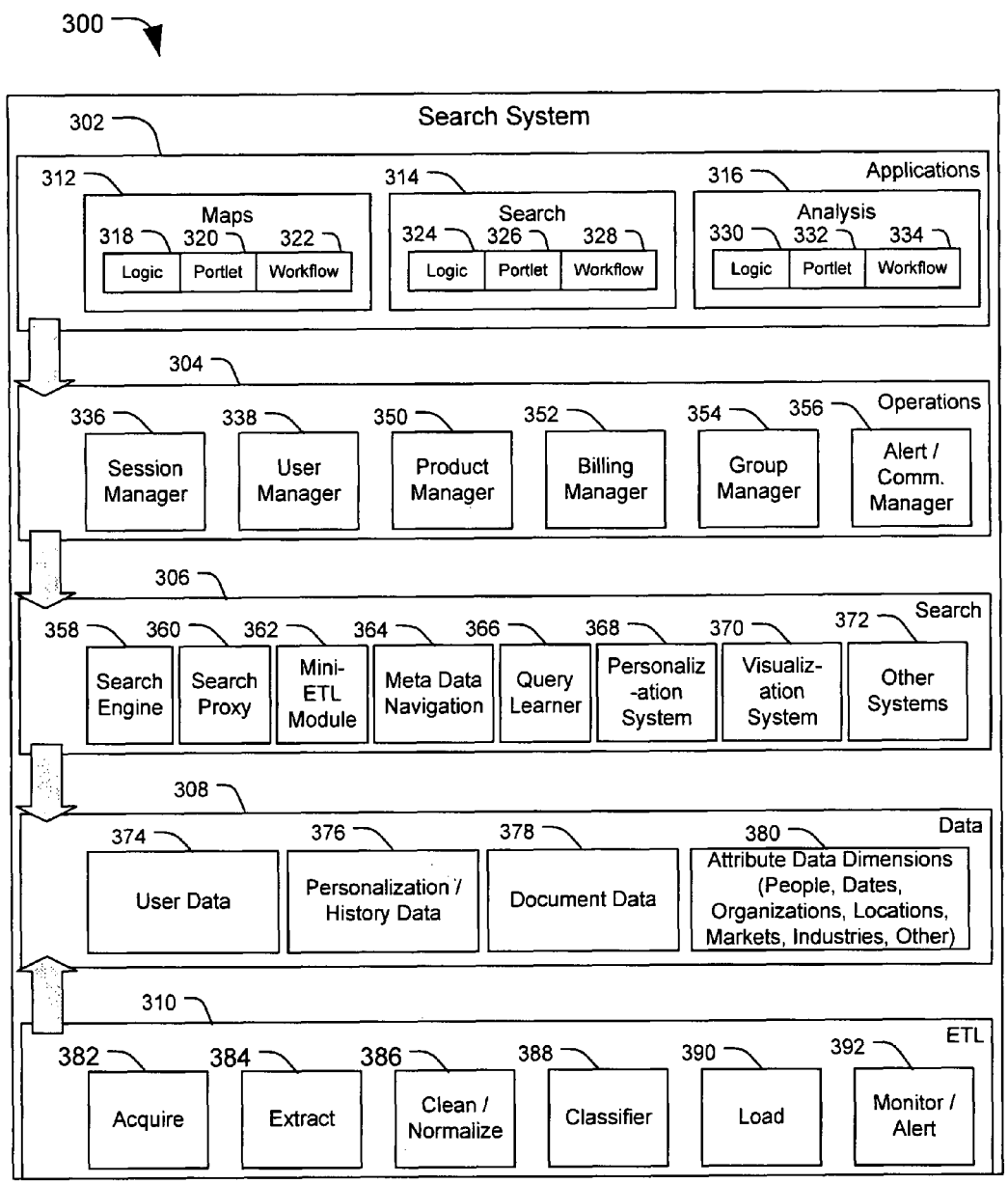
FIG. 3 is a block diagram of a third particular illustrative embodiment of a system to search data sources.

FIG. 3 is a block diagram of a third particular illustrative embodiment of a system 300 to search data sources. The system 300 includes an applications tier 302, an operations tier 304, a search tier 306, a data tier 308, and an extract-transform-load (ETL) tier 310, which include processing logic and instructions executable by the processing logic to search data sources and to present search results.

The applications tier 302 can include multiple applications. Each application can be a combination of logic (display, interaction, etc), portlets (visual components), and workflow (process of how components work together). The applications tier 302 includes a maps module 312 that can be executed by processing logic to visually display landscapes and other visualizations. The applications tier 302 includes a search module 312 that can be executed by processing logic to search multiple data sources, including structured data sources, semi-structured data sources, and unstructured data sources. The applications tier 302 includes an analysis module 312 that can be executed by processing logic to process retrieved data to produce interactive visualizations for analysis.

The maps module 312 can include logic 318 to control the display of information, the graphical user interface for interacting with the information, and other functionality associated with visualizations (maps). The maps module 312 can include a portlet 320 to define visual components for inclusion in a graphical user interface and a workflow module 322 to manage context and flow control. The search module 314 controls a search interface, interactions with data sources, and how searches are performed. The search module 314 can include logic 324 to control the display of search results and to define a graphical user interface for interacting with the search results, a portlet 326 to define visual components associated with a search interface and a workflow module 328 to manage context and flow control. The analysis module 312 includes logic 330 to control the analysis of search results, a portlet 332 to define visual components associated with the analysis (such as a recommend results option). The analysis module 316 includes a workflow module 334 to manage context, flow control, and performance of the analysis.

The operations tier 304 is adapted to manage sessions, to manage user accounts, and to generally manage the user experience. The operations tier 304 can include functionality to provide administrative features, including security features such as authentication and authorization functions. The operations tier 304 can include a session manager 336 to track of user information, user preferences, permissions, and other information. Additionally, the session manager 336 can track user input, implicit and explicit user interactions, store the input and the interactions, and adjust the user experience accordingly, such as by presenting search results in a particular manner to one user and in a different manner to another user. The operations tier 304 also includes a user manager 338 to manage permissions for each user and to manage interconnections. The operations tier 304 includes a product manager 350 to group applications and features for particular subscriptions. The operations tier 304 includes a billing manager 352 to track user activity and to convert user activity to billable events. The operations tier 304 also includes a group manager 354 to track connections between users. For example, the group manager 354 may maintain an address book for each user, a list of associations, and other information, which can be used to facilitate collaboration between users. The operations tier 304 can include an alert/communications manager 356 to communicate with users via email, instant messages, web logs ("blogs"), really simple syndication, documents, simple messaging system text messages, other messages, or any combination thereof, to connect the user to other users and to communicate up-to-date information to a selected user, such as when data is updated, automated search results are received, and so on.

The search tier 306 can include core components and libraries used for the maps module 312, the search module 314 and the analysis module 316 of the applications tier 302. The search tier 306 includes a search engine 358, which can support Boolean searching (i.e. keyword searching uses logical operators, including AND, OR, ANDNOT, and other operators) and which provides filtering and classification (grouping, clustering, other organization, or any combination thereof). The search engine 358 can also support word proximity searches, allowing a user to search for instances of search terms that are separated by less than a user-specified number words (e.g., a first term is within three words of a second term). The search tier 306 also includes a search proxy 360 that provides a search interface to other search engines, to other data sources, or any combination thereof, by generating search queries from Boolean searches to match a desired query format for each data source and to query the data sources on behalf of the user. If Boolean searching is not supported by a particular data source, the search proxy 360 can degrade and translate a Boolean search into another query format, provide a real-time indexing of other search data to allow support for advanced operators, or any combination thereof. In a particular embodiment, advanced operators may include logical operators (AND, OR, NOT, and other operators), range filtering, attribute filtering, proximity searching, other search operations, or any combination thereof. In an embodiment, a user Boolean query with proximity fields could be translated into query that could be sent to the Google search engine. The search system can query the Google search engine using the translated query, receive the search results, optionally download documents associated with the search results, index the resulting documents with advanced searching capabilities to produce a temporary index, and perform the full query on the temporary index.

The search tier 306 includes a reduced extract-transform-load (mini-ETL) module 362 that can be used to parse retrieved documents into temporary tables mapped to an internal format. The search tier 306 also includes a metadata navigation module to extract statistics and patterns from search results, to provide correlations for visual display, and to speed navigation through search results by permitting negation of categories of information, selection of specific information, and user-training of query learner and document learner applications. The search tier 306 includes a query learner module 366 to reverse engineers a user's search into a better query by identifying "good" elements and "bad" elements and by using the identified good and bad elements to generate a modified Boolean query learned from explicit and implicit user interactions. Implicit user interactions can include links followed by a user, length of time spent on a page by the user, commonality of terms between documents associated with links followed by the user, and other implicit information. The explicit user interactions include document ratings supplied by the user for selected items in a list of search results. The search tier 306 includes a personalization system 368 to track each user's input, transaction history, search history, and actions and makes recommendations about documents. The search tier 306 also includes a visualization engine 370 to render internal document data, metadata, and dimensions into various interactive visualizations. The search tier 306 may also include other systems and modules, including algorithms, core libraries to extract patterns, statistics, and otherwise data mine information from documents, and other applications.

The data module 308 can include user data 374, including user preferences, administrative information, and other user account related data. The data module 308 can include personalization/history data that tracks user interactions, explicit feedback, and implicit feedback. The data module 308 includes a document database 378 including multiple tables to store document elements. The data module 308 also includes an attribute database 380 to store information about document attributes, correlations between documents, classifications associated with documents, other information, or any combination thereof.

The ETL tier 310 is adapted to extract information from documents received from any source (local, remote, or any combination thereof) and to convert the information to a "clean" format for internal use. The ETL tier 310 acquires the information using an acquisition module 382, extracts the information using an extraction module 384, and cleans or normalizes the information using a clean/normalize module 386. The ETL tier 310 may also classify search results in "real-time" using a classifier module 388. The classifier module 388 may be trained based on user interactions, based on vertical data sets, or any combination thereof. An example of a vertical data set can be a taxonomy that includes multiple categories or classification. The multiple categories or classifications can have associated documents, which can be utilized to train the classifier module 388 about what types of information are included within a particular category or classification. For example, the United States Patent and Trademark Office classification system is organized hierarchically and each classification includes multiple documents that may be used to train the classifier module 388.

The classifier module 388 performs dynamic correlations between search results, based on metadata, content within particular search results, ownership data, authorship data, data about the data source, and other information. The classifier module 388 may use such dynamic correlations to make probabilistic determinations about missing information, such as assignee information related to a particular patent document. In a particular illustrative, non-limiting example, the classifier module 338 can make a make a probabilistic determination to identify a likely assignee of a patent, even when the records at the United States Patent and Trademark Office do not include assignee information (i.e. the classifier module 388 can guess likely corporate owners for particular patents that appear to be unassigned). While the above-example is provided in the context of patents, the classifier module 388 can be adapted to make probabilistic determinations in a variety of contexts in order to augment search results. Such information may be presented within a graphical user interface in such a way that the probabilistic determinations can be identified as compared to retrieved data. The ETL tier 310 may utilize the load module 390 to store documents, data extracted from the documents, probabilistic determinations, classification data, correlations, and other information related to search results. The ETL tier 310 can use a monitor/alert module to apply user profiles/filters to each document for special alerts. For example, the search system 300 may support publish/subscribe methodologies, such as a really simple syndication technique, to provide updates and notices to users when information of interest to the user is acquired.

In a particular illustrative embodiment, the search system 300 may include a single server. In another particular illustrative embodiment, the search system 300 may include multiple servers having processing logic and memory accessible to the processing logic to provide search and visualization functionality.

In a particular illustrative embodiment, the search system 300 may perform a first search based on a Boolean query provided by a user using the search tier 306. The operations tier 304 may coordinate the operation of the applications tier 302 to produce a graphical user interface and to provide the graphical user interface to a destination device associated with the user. The search system 300 may acquire document data using the ETL tier 310 and may assemble information about the user using the data tier 308. The search system 300 may utilize data extracted by the ETL tier 310 to generate a secondary query, which the search tier 306 may use to search one or more data sources to acquire secondary data. The search system 300 may augment the search results with the secondary data. For example, the search system 300 may acquire financial data (secondary data) based on ownership information extracted from the search results (extracted data). The search system 300 may provide the financial data in the form of a visualization, such as an industry visualization, that can be related to the search results. A user may switch between visualizations of the data and search results associated with the data by interacting with user selectable elements of a graphical user interface.

In a particular illustrative embodiment, a system may include a search system 300 that includes a search tier to retrieve search results from multiple data sources and to extract data from the search results. The system may also include a classification system, such as the classifier 388 within the ETL tier 310, to associate each of the search results with at least one classification based on the extracted data. The system can also include a visualization system 370 to generate a graphical user interface (GUI) including data related to the search results and including multiple control options. The multiple control options can include a first option related to the extracted data and a second option related to the at least one classification.

Figure 4:
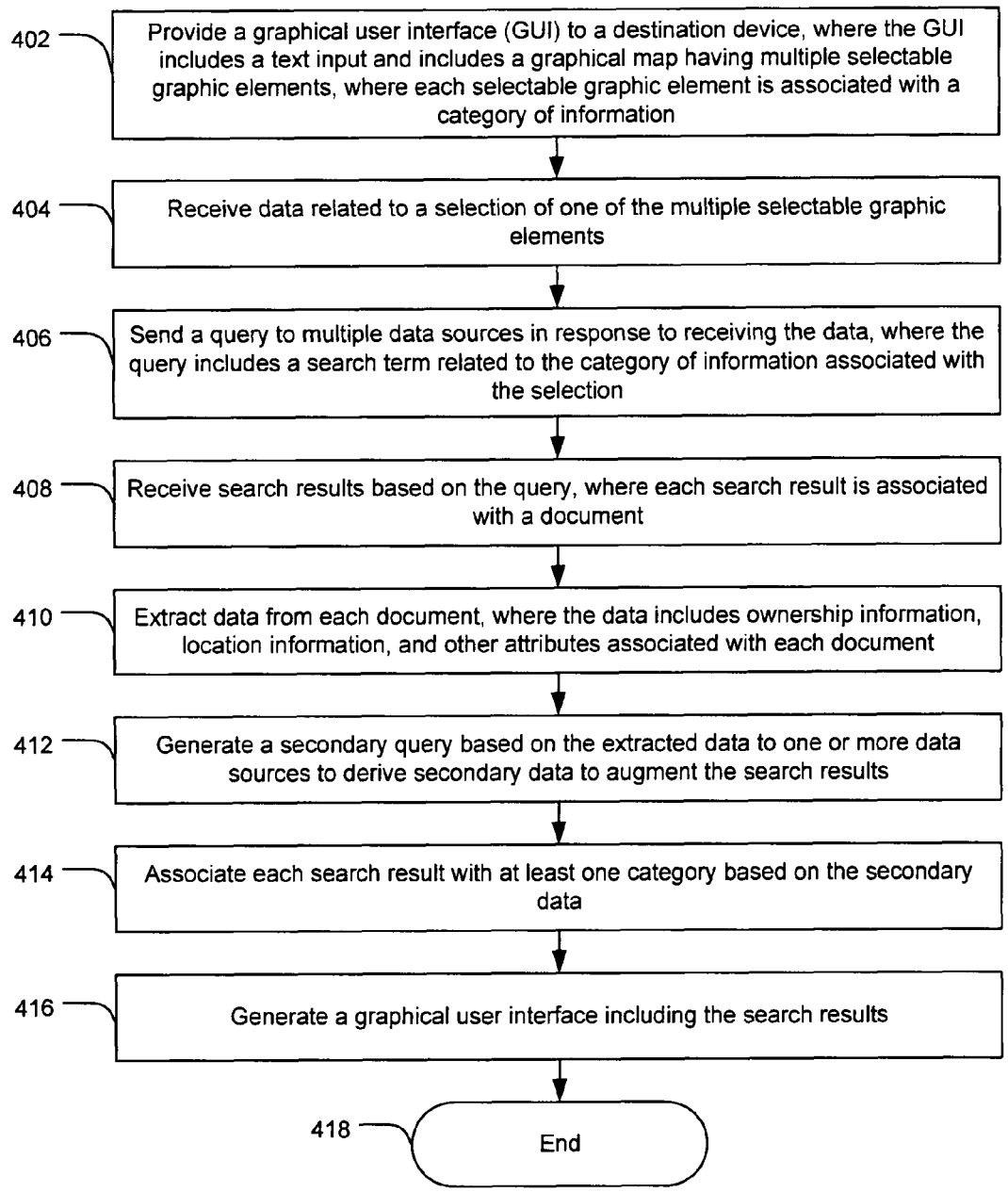
FIG. 4 is a flow diagram of a particular illustrative embodiment of a method of searching data sources.

FIG. 4 is a flow diagram of a particular illustrative embodiment of a method of searching data sources. At 402, a search system provides a graphical user interface (GUI) to a destination device, where the GUI includes a text input and a graphical map having multiple selectable graphic elements, where each selectable graphic element is associated with a category of information. Advancing to 404, the search system receives data related to a selection of one of the multiple selectable graphic elements. Proceeding to 406, the search system sends a query to multiple data sources in response to receiving the data. The query can include a search term related to the category of information associated with the selection. Continuing to 408, the search system receives search results based on the query, where each search result is associated with a document. Moving to 410, the search system extracts data from each document, where the data includes ownership information, location information, and other attributes associated with each document. Proceeding to 412, the search system generates a secondary query based on the extracted data to the one or more data sources to derive secondary data to augment the search results. Advancing to 414, the search system associates each search result with at least one category based on the secondary data. Continuing to 416, the search system generates a graphical user interface including the search results. The method terminates at 418.

In a particular illustrative embodiment, the search system can generate a first graphical user interface including a first graphical map. In response to receiving an input, the search system can perform a search and generate a second graphical user interface including a second graphical map having multiple selectable elements related to the second search results. In a particular illustrative embodiment, the graphical map may include a geographical representation of the search results. In a particular illustrative embodiment, each of the multiple selectable elements of the graphical map can include a dimension parameter related to a relative number of associated documents. For example, in a particular illustrative embodiment, each of the multiple selectable elements of the first graphical map, the second graphical map, or any combination thereof can include a color parameter related to a relative number of associated documents. A large number of documents may be represented using a red color while a small number of documents may be represented in blue. In particular implementations, the color parameters associated with large and small document spaces may vary. In an alternative embodiment, the user may modify the color representations of document spaces on the fly by interacting with selectable indicators provided within a graphical user interface.

In a particular illustrative embodiment, the search system may issue a text query from a database query. For example, at 406, the search system sends a query to multiple data sources in response to receiving the data. One such data source may include a database. The search system may receive data from the database, generate a text query from the received data and issue the text query to one or more data sources, further augmenting the search results.

Figure 5:
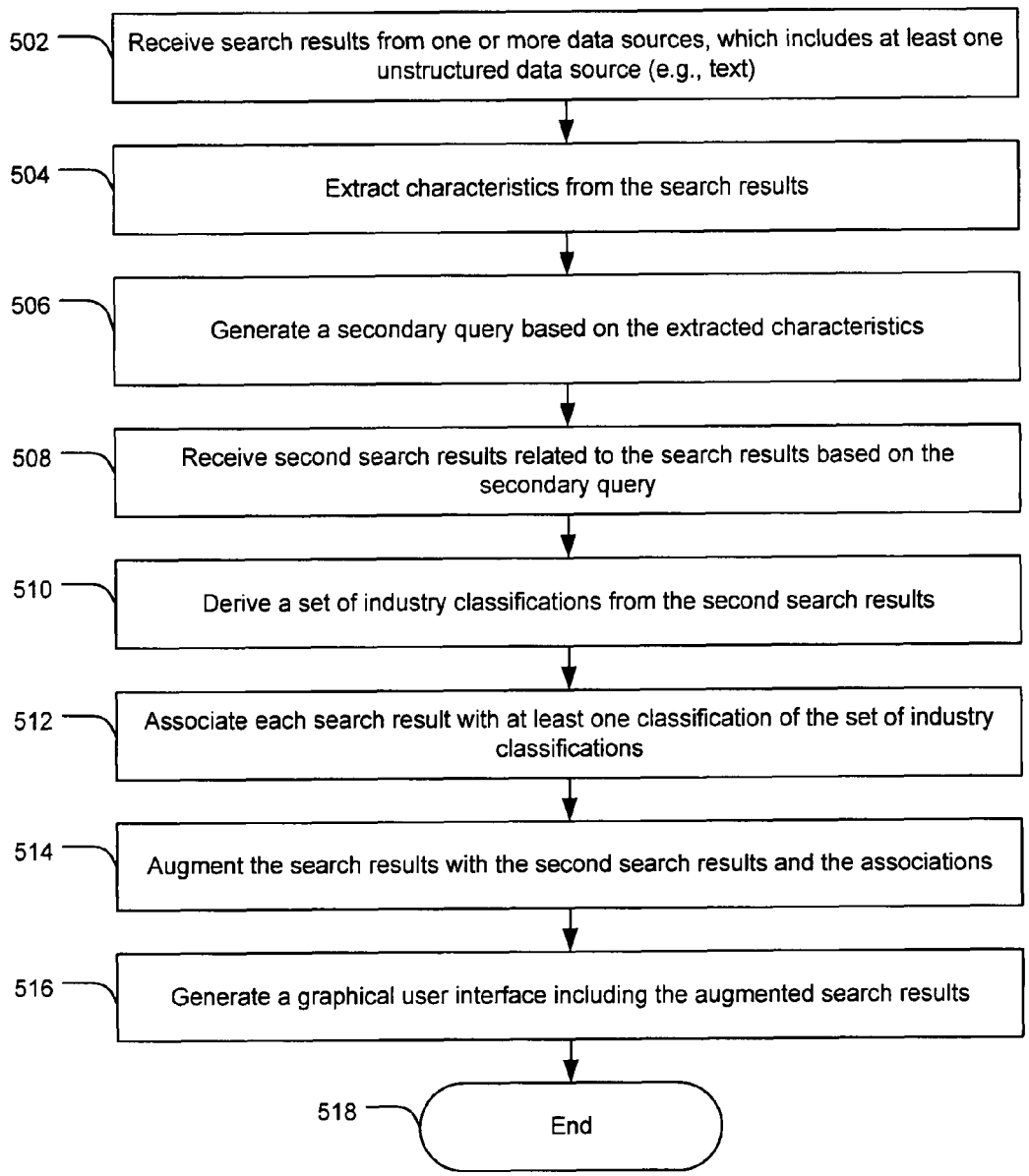
FIG. 5 is a flow diagram of a second particular illustrative embodiment of a method of searching data sources.

FIG. 5 is a flow diagram of a second particular illustrative embodiment of a method of searching data sources. At 502, the search system receives search results from one or more data sources, which can include an unstructured data source (e.g., text data, image data, video data, audio data, or other unstructured data). Moving to 504, the search system extracts characteristics from the search results. Proceeding to 506, the search system generates a secondary query based on the extracted characteristics. Continuing to 508, the search system receives second search results based on the secondary query that are related to the search results. Advancing to 510, the search system derives a set of industry classifications from the second search results. Moving to 512, the search system associates each search result with at least one classification of the set of industry classifications. The search system can make additional classifications, including associating each search result with vertical classifications (such as database source information, document type information, ownership information, and other classifications), other classifications, or any combination thereof. Proceeding to 514, the search system augments the search results with the second search results and the associations. Continuing to 516, the search system generates a graphical user interface that includes the augmented search results. The method terminates at 518.

In a particular illustrative embodiment, the search system may receive search information, including search results and secondary data related to the search results. The search system can generate a graphical user interface and provide the graphical user interface to a destination device of a first user. The graphical user interface may include multiple selectable options, which can be accessed to provide multiple views of the search information. In a particular illustrative embodiment, one of the multiple selectable options can include a search snapshot option to store a snapshot of the search information at a point in time. The snapshot of the search information may include documents, search parameters, a date, a time, user information, information about sharing of the snapshot, alert information (if the particular user wishes to be notified when new information is available), or any combination thereof. In another particular illustrative embodiment, one of the multiple selectable options can include a collaboration option to share the snapshot of the search information with a second user, and the search system may provide the snapshot of the search information to the second user using views associated with the second user. In yet another particular illustrative embodiment, one of the multiple views can include a graphical map having multiple selectable graphic elements. In still another particular embodiment, one of the views comprises a list of the search results and a control panel including multiple selectable indicators to filter the search results. The control panel can include a graphical element providing statistical data related to the search results.

Figure 6:
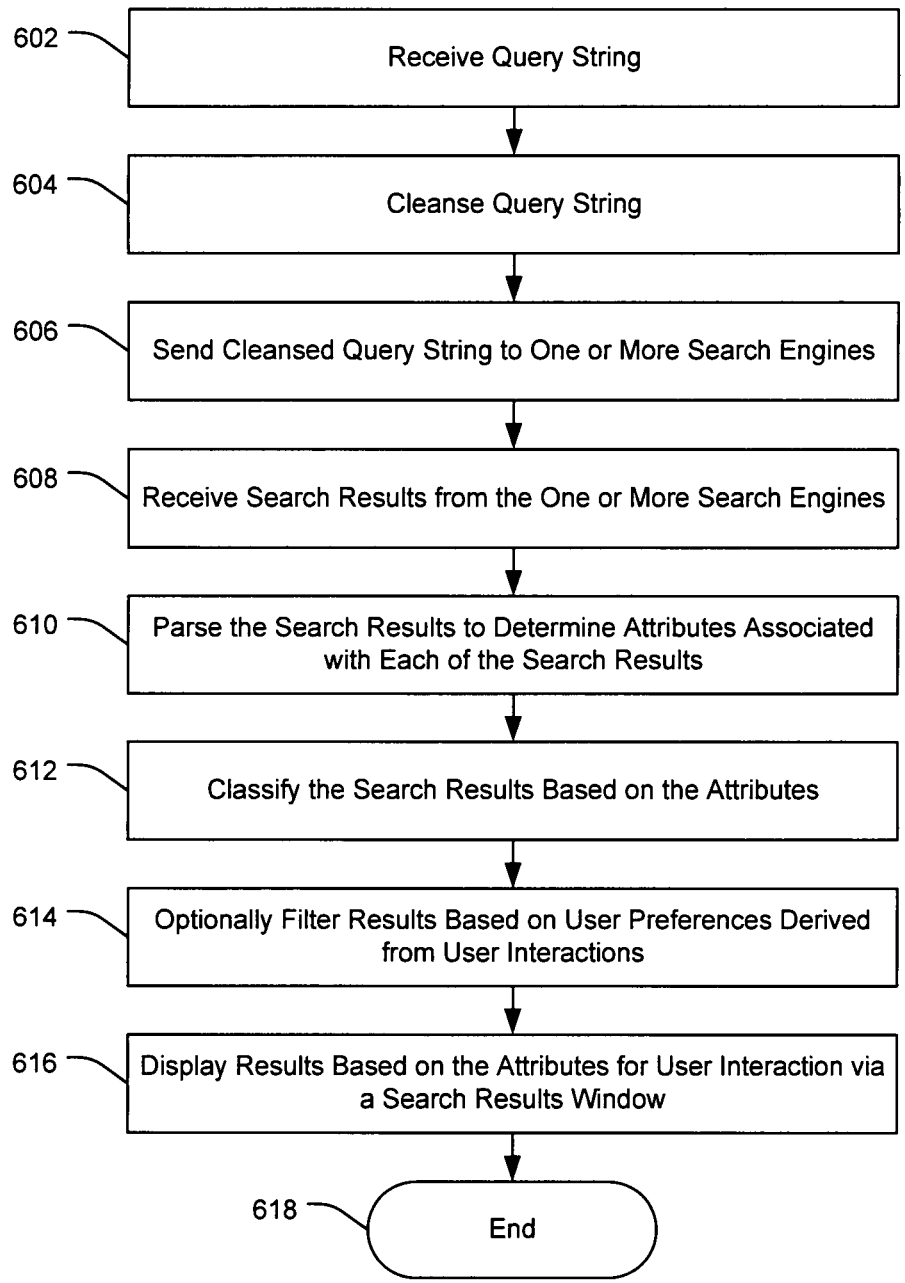
FIG. 6 is a flow diagram of a third particular illustrative embodiment of a method of searching data sources.

FIG. 6 is a flow diagram of a third particular illustrative embodiment of a method of searching data sources. At 602, a search system receives a query string. Advancing to 604, the search system cleanses/normalizes the query string. The search system may cleanse the query string by replacing the keywords or the query structure to match the query structures for each of a variety of data sources (i.e. by "proxying" the query). Moving to 606, the search system sends the cleansed/normalized query string to one or more data sources. Proceeding to 608, the search system receives search results from the one or more data sources. Moving to 610, the search system parses the search results to determine attributes associated with each of the search results. Continuing to 612, the search system classifies (categorizes) the search results based on the determined attributes. Advancing to 614, the search system optionally filters the search results based on user preferences derived from user interactions. Continuing to 616, the search system provides the search results to a destination device based on the attributes for user interaction via a search results user interface. For example, the search system may generate a graphical user interface, including control options and other data related to the search results, which can be sent to the destination device. The method terminates at 618.

Figure 7:
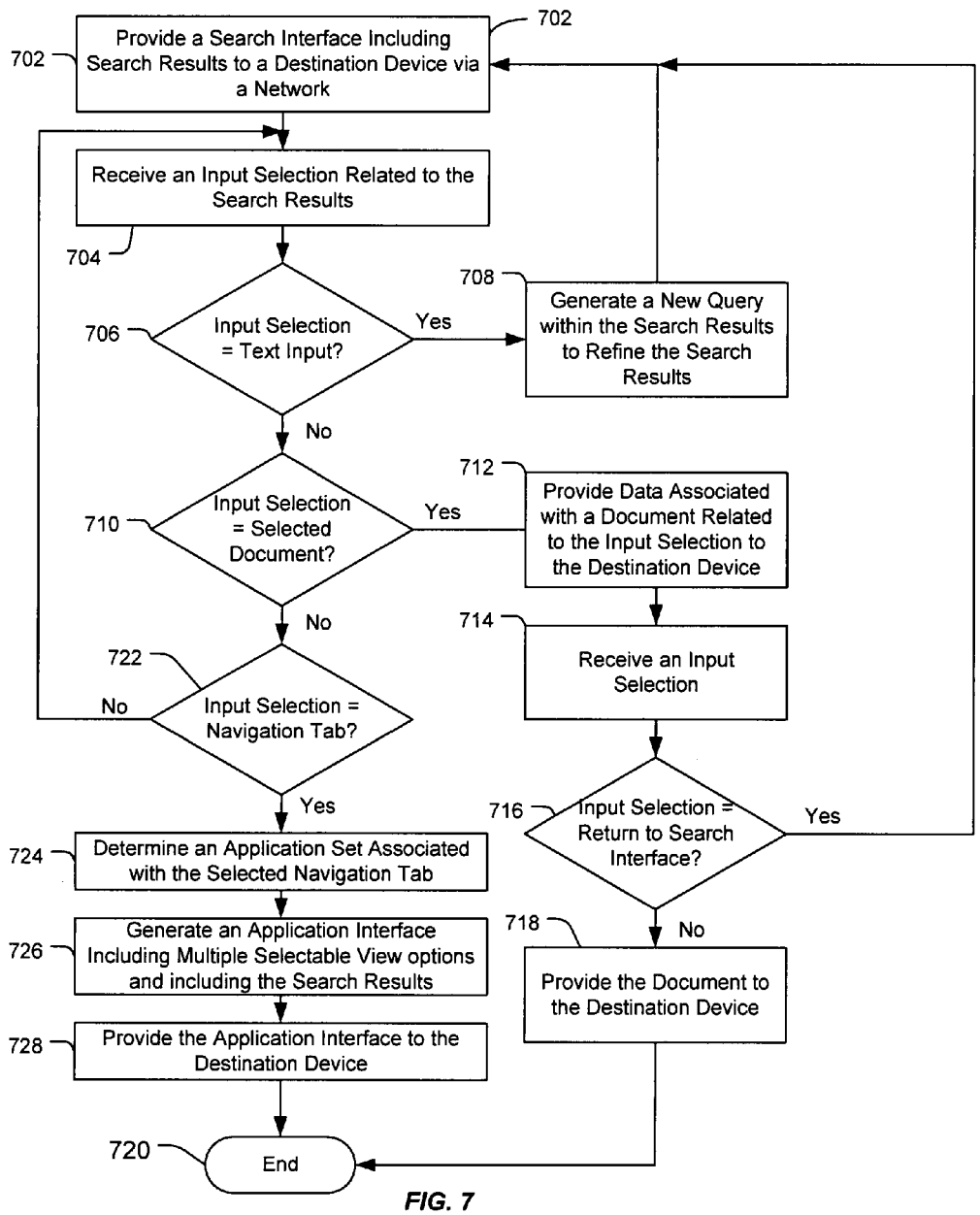
FIG. 7 is a flow diagram of a fourth particular illustrative embodiment of a method of searching data sources.

FIG. 7 is a flow diagram of a fourth particular illustrative embodiment of a method of searching data sources. At 702, a search system provides a search interface to a destination device via a network, where the search interface includes search results. Moving to 704, the search system receives an input selection that is related to the search results. Advancing to 706, the search system determines whether the input selection is equal to a text input. If the input selection is a text input, the method advances to 708 and the search system generates a new query within the search results to refine search results. The method advances to 702 and the search system provides a search interface including the search results to the destination device.

In a particular embodiment, at 706, the input may be an attribute, a date, or other information that is translated to a text input. Additionally, the translated text input may be used to generate an ancillary query. For example, particular search results may be tangentially interesting to a user, but may not be a primary goal of a particular search. The search system can allow a user to perform an ancillary query and to view results of that query, without displacing the original search results.

Returning to 706, if the input selection is not a text input, the method advances to 710 and the search system determines whether the input selection is a selected document. If the input selection is a selected document, the method advances to 712 and the search system provides data associated with the selected document that is related to the input selection to the destination device. Proceeding to 714, the search system receives an input selection that is related to the data. Advancing to 716, the search system determines if the input selection is related to an instruction to return to the search interface. If the input selection indicates a return to the search interface, the method advances to 702 and the search system provides a search interface including the search results to the destination device. If the input selection is not a return to interface selection, the method advances to 718 and the document is provided to the destination device. The method terminates at 720.

Returning to 710, if the input selection is not related to a selected document, the method advances to 722 and the search system determines if the input selection is related to a navigation tab. If the input selection is not related to a navigation tab, the method returns to 704. If the input selection is related to a navigation tab at 722, the method advances to 724 and the search system determines an application set that is associated with the selected navigation tab. For example, a graphical user interface may include a tab that is related to graphical maps and a second tab that is related to analysis of search results. Selection of either the graphical maps or the analysis tabs requires the system to determine a context and an application set associated with the selected tab. Proceeding to 726, the search system generates an application interface including multiple selectable view options and including the search results. Advancing to 728, the search system provides the application interface to the destination device. The method terminates at 720.

In a particular illustrative embodiment, the search system can infer a desired interface to present to the user, either based upon user preferences, user history, or the data retrieved. For example, financial data related to the search may be presented within a graphical user interface in a chart, a graph, or spreadsheet form, based on the inferences made by the search system.

Figure 8:
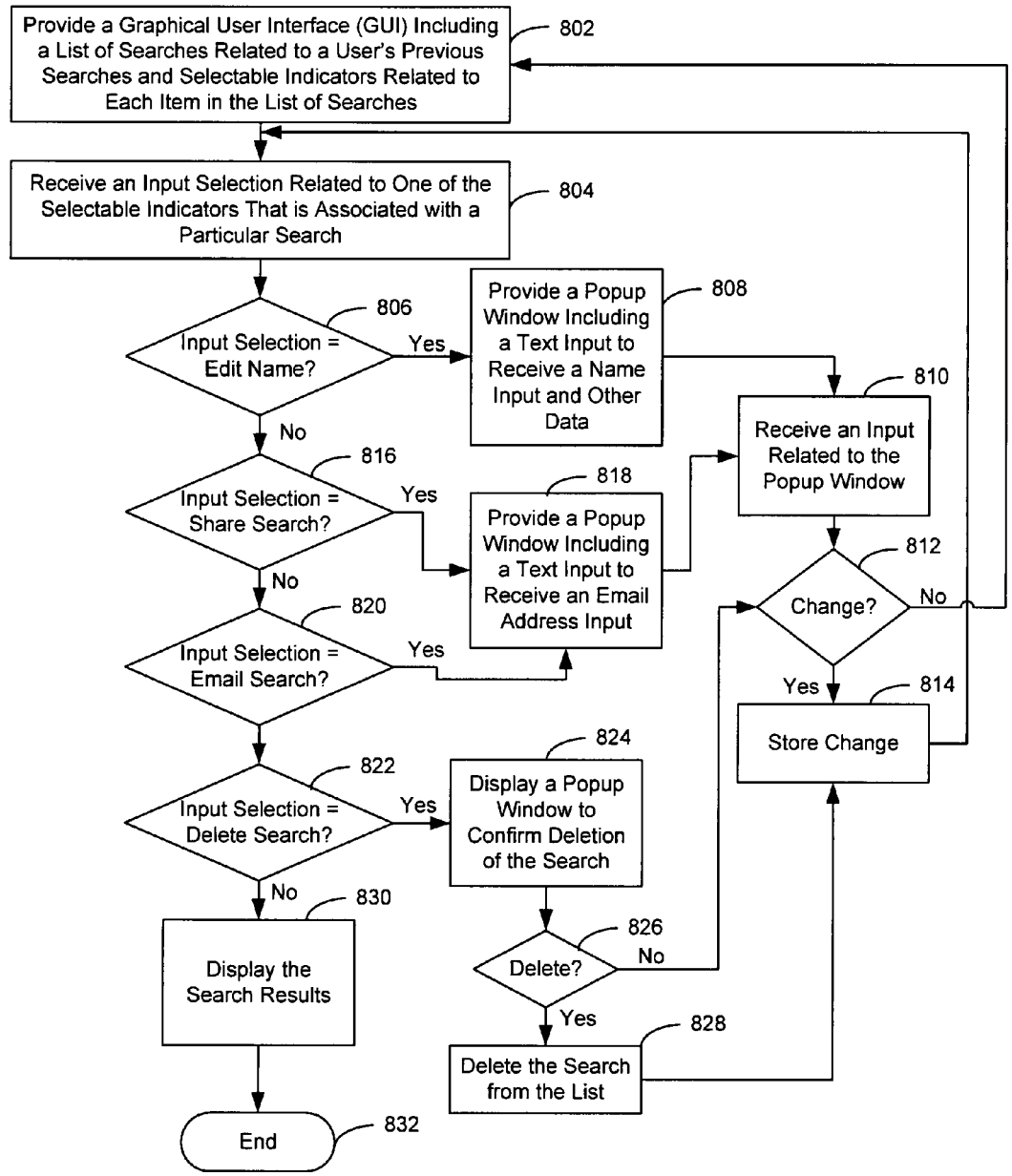
FIG. 8 is a flow diagram of a fifth particular illustrative embodiment of a method of searching data sources.

FIG. 8 is a flow diagram of a fifth particular illustrative embodiment of a method of searching data sources. At 802, the search system provides a graphical user interface that includes a list of stored searches related to a user's previous searches and including selectable indicators related to each item in the list of searches. The selectable indicators can include a save indicator to save a particular search, an email indicator to share a particular search, an edit indicator to rename or alter a particular search, and a delete indicator to delete a particular search from the list of searches.

Advancing to 804, the search system receives an input selection that is related to one the selectable indicators that is associated with a particular search. Proceeding to 806, the search system determines whether the input selection is an edit name selection. If the input selection is an edit name selection, the method advances to 808 and a pop-up window is provided that includes a text input to receive a name input and other data. Continuing to 810, the search system receives an input that is related to the pop-up window. Moving to 812, the search system determines whether a change is entered. If no change is entered, the method returns to 804. If a change is entered, the method advances to 814 and the search system stores the change before returning to 804.

Returning to 806, if the input selection does not refer to a name change, the method advances to 816 and the search system determines if the input selection is related to sharing a search. If the input selection is related to sharing a search, the method advances to 818 and the search system provides a pop-up window that includes a text input to receive an e-mail address input. The search system may share stored search information with an account associated with the entered e-mail address. The method advances to 810 and the search system receives an input that is related to the pop-up window. Advancing to 812, the search system determines if a change has been received, and if not, it method advances to 804. Otherwise, the method proceeds to 814 and the change is stored before the method returns to 804. In a particular illustrative embodiment, the search system may transmit an alert to a destination device associated with another user based on the email address input, to notify the other user of the shared search information.

Returning to 820, if the input selection is not an e-mail selection, the method proceeds to 822 and the search system determines if the input selection is a delete search selection. If the input selection is a delete search selection, advancing to 824 a pop-up window is displayed to confirm deletion of the search. Proceeding to 826, the search system determines if the deletion is confirmed, and if not, the method returns to 812 to determine if a change has been made. If no change has been made, the method returns to 802, and the search system provides a graphical user interface (GUI) including the list of searches. At 812, if a change is made, the method advances to 814 and the search system stores the change. The method returns to 804. If at 826 a confirmation is received, the search is deleted from the list. Advancing to 814, the search system stores the change.

Returning to 822, if the input selection is not a delete selection, the method advances to 830, and the search system displays the search results. The method terminates at 832.

Figure 9:
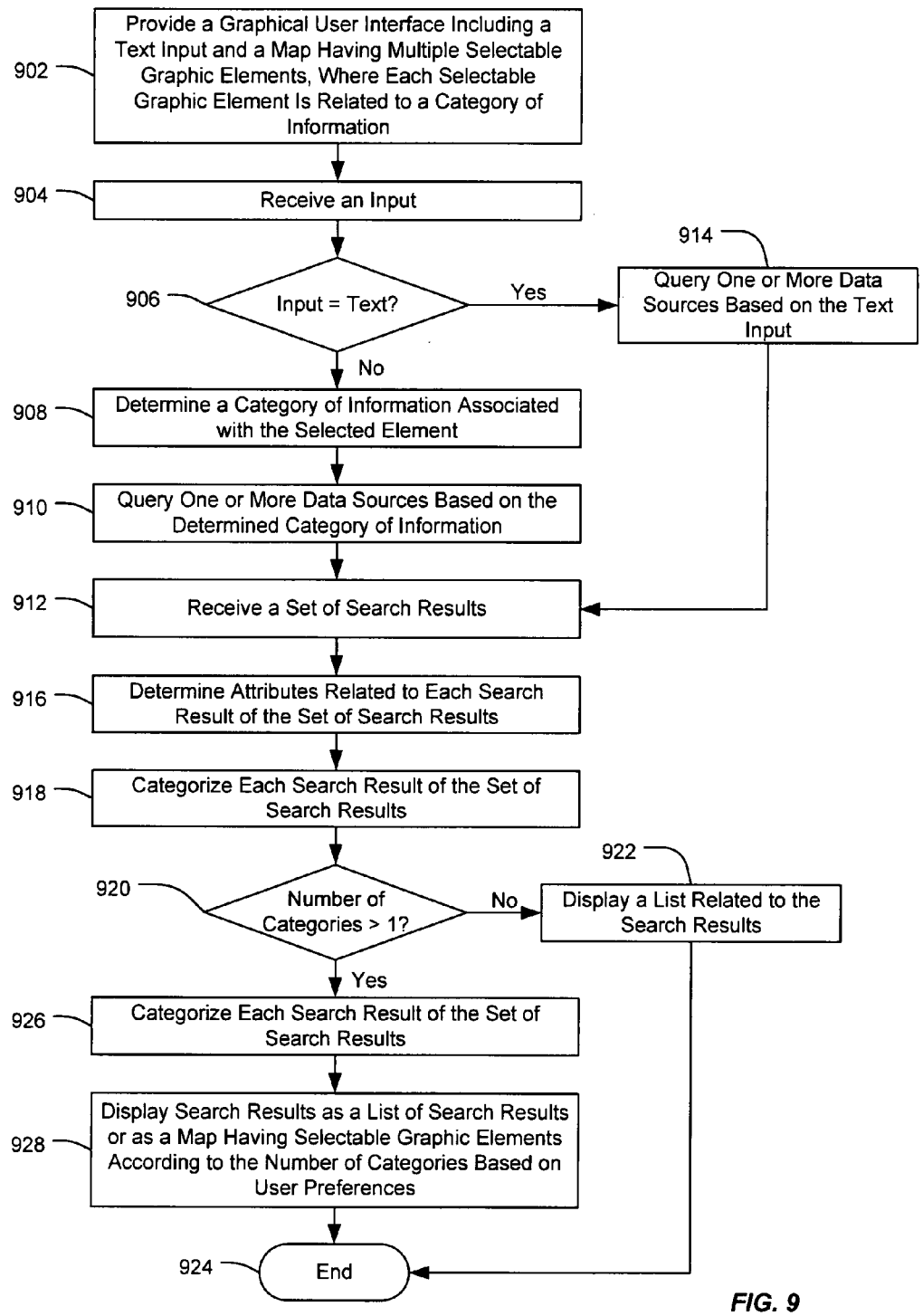
FIG. 9 is a flow diagram of a sixth particular illustrative embodiment of a method of searching data sources.

FIG. 9 is a flow diagram of a sixth particular illustrative embodiment of a method of searching data sources. At 902, a search system provides a graphical user interface to a destination device. The graphical user interface can include a text input and a map having multiple selectable graphic elements, where each selectable graphic element is related to a category of information. Advancing to 904, the search system receives an input. Moving to 906 the search system determines whether the input is text input, and if so, the method advances to 914 and one or more data sources are queried based on the text input. The method proceeds to 912, and the search system receives a set of search results related to the query. Returning to 906, if the text input is not text, the method advances to 908 and the search system determines a category of information associated with the selected element. Proceeding to 910, the search system queries one or more data sources based on the determined category of information.

Advancing to 912, the search system receives a set of search results. Proceeding to 916, the search system determines attributes related to each search result of the set of search results. Moving to 918, the search result categorizes each search result of the set of search results. Continuing to 920, the search system determines if the number of categories is greater than one. If the number of categories is not greater than one, the method advances to 922 and the search system displays a list related to the search results. The method terminates at 924.

Returning to 920, if the number of categories is greater than one, the method advances to 926 and the search system displays the search results as a list or as a map having selectable graphic elements according to the number of categories and based on user preferences. The method terminates at 924.

In a particular illustrative embodiment, the search system may store a user preference associated with how a particular user wishes to view search results. The particular user may prefer a graphical map as opposed to a list of search results. Accordingly, the search system may generate and provide a graphical user interface including a graphical visualization of the search results, where the graphical visualization is a graphical map having multiple selectable graphic elements with which the particular user may interact to navigate the search results.

Figure 10:
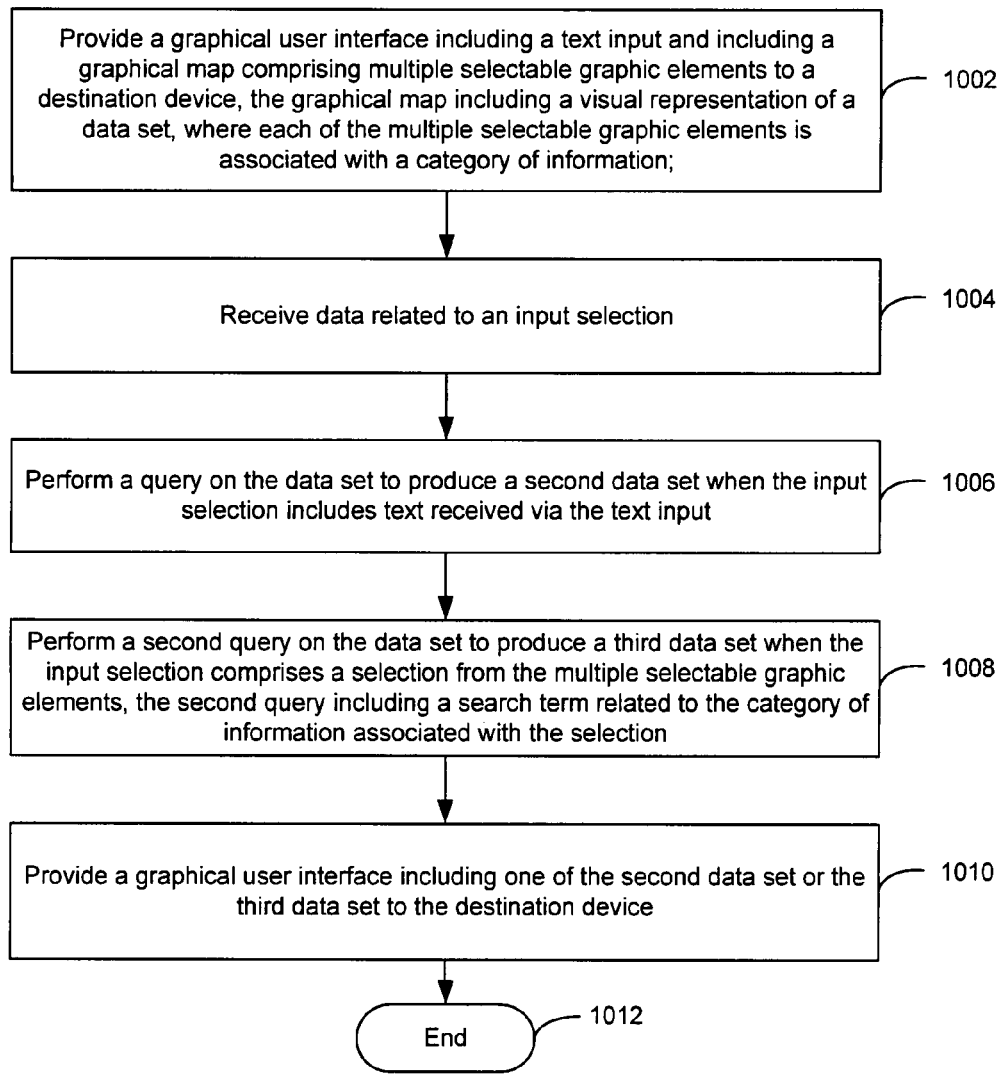
FIG. 10 is a flow diagram of a seventh particular illustrative embodiment of a method of searching data sources.

FIG. 10 is a flow diagram of a seventh particular illustrative embodiment of a method of searching data sources. At 1002, the search system provides a graphical user interface to a destination device, where the graphical user interface includes a text input and a graphical map comprising multiple selectable graphic elements. The graphical map includes visual representation of a data set, such as a search result, where each of the multiple selectable graphic elements is associated with a particular category of information related to the search results. Advancing to 1004, the search system receives data related to an input selection. Proceeding to 1006, the search system performs a query on the data set to produce a second data set when the input selection includes text received via the text input. In a particular illustrative embodiment, the text input may refine the set of search results. Proceeding to 1008, a second query is preformed on the data set to produce a third data set when the input selection comprises a selection of one of the multiple selectable graphic elements, where the second query includes a search term related to the category of information associated with the selection. Proceeding to 1010, the search system provides a graphical user interface that includes one of the second data set or the third data set. The method terminates at 1012.

Figure 11:
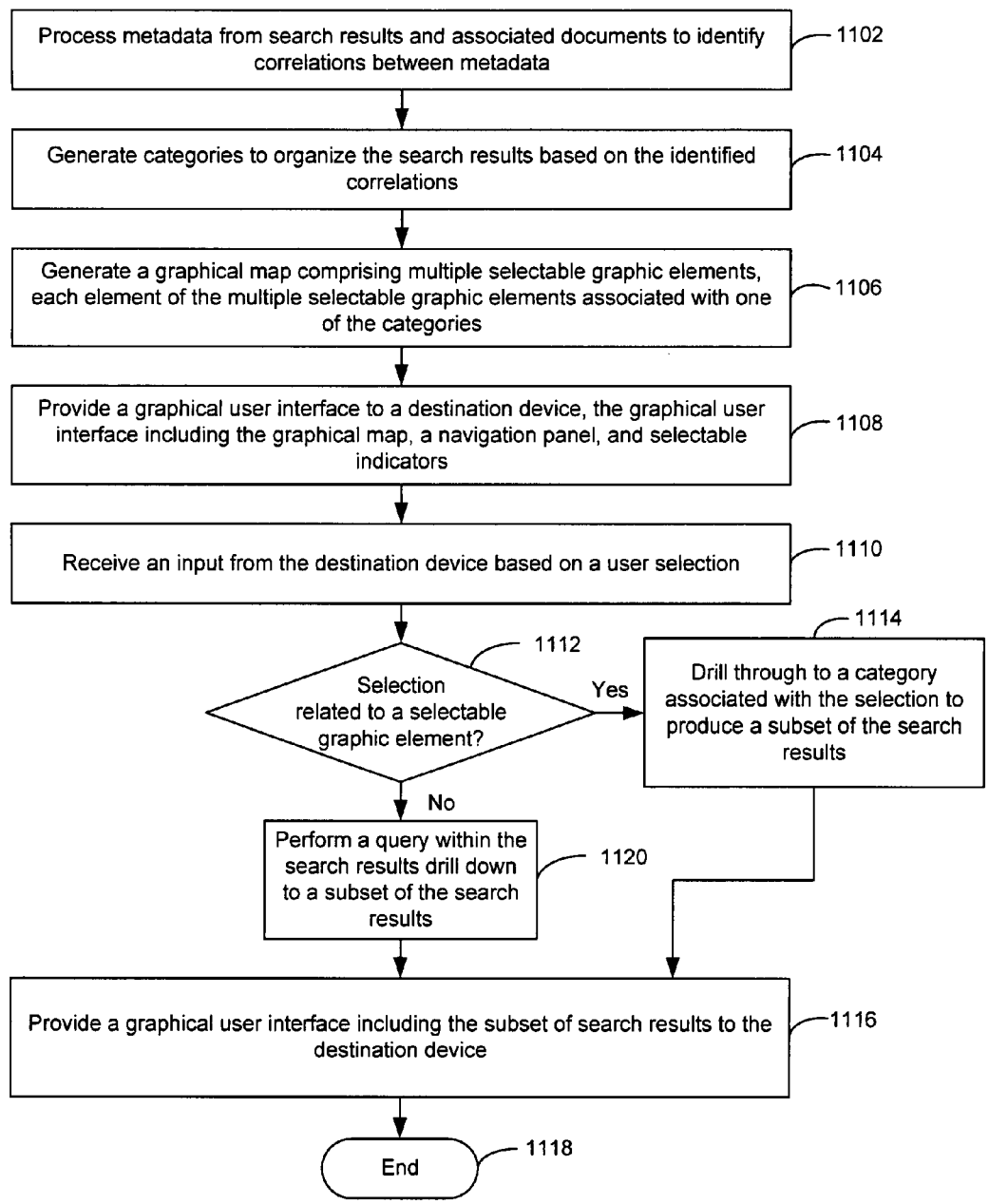
FIG. 11 is a flow diagram of an eighth particular illustrative embodiment of a method of searching data sources.

FIG. 11 is a flow diagram of an eighth particular illustrative embodiment of a method of searching data sources. At 1102, the search system processes metadata from search results and associated documents to identify correlations between the metadata. Advancing to 1104, the search system generates categories to organize the search result based on the identified correlations. Proceeding to 1106, the search system generates a graphical map that includes multiple selectable graphic elements where each element of the multiple selectable graphic elements is associated with one of the categories of information. Proceeding to 1108, the search system provides the graphical user interface to a destination device, where the graphical user interface includes the graphical map, a navigation panel, and selectable indicators. Advancing to 1110, the search system receives an input from a destination device based on a user selection. Advancing to 1112, the search system determines if the selection is related to a graphic element. If so, the method advances to 1114 and the search system drills through to a category associated with a selection to produce a subset of the search results. The method proceeds to 1116 and the search system provides a graphical user interface to the destination device that includes a different subset of the search results. The method terminates at 1118.

Returning to 1112, if the selection is not related to a graphical element, the method advances to 1120 and the search system performs a query within the search results to drill down to a sub-set of the search results. Proceeding to 1116, the search system provides the graphical user interface to a destination device, where the graphical user interface includes the subset of the search results. The method terminates at 1118.

In a particular illustrative embodiment, the search system can sort the search results based on correlations between attributes. For example, the graphical user interface may include menu options or selectable indicators to allow a user to interact with search results to provide different views of the same information. In a particular illustrative example, the search system may correlate an assignee of a patent with the financial records associated with the assignee. In a particular example, a menu option may allow a user to sort the search results based on data that is not part of the original document set (i.e. not part of the search results). For example, the menu option may allow a user to sort based on financial data included in financial records associated with the companies identified from the search results, to view subsets of the information within the document space or to map the subset of the information to a visualization. The graphical user interface may be adapted to allow a user to interact with the data set to sort, filter and display the same information in multiple different ways.

Figure 12:
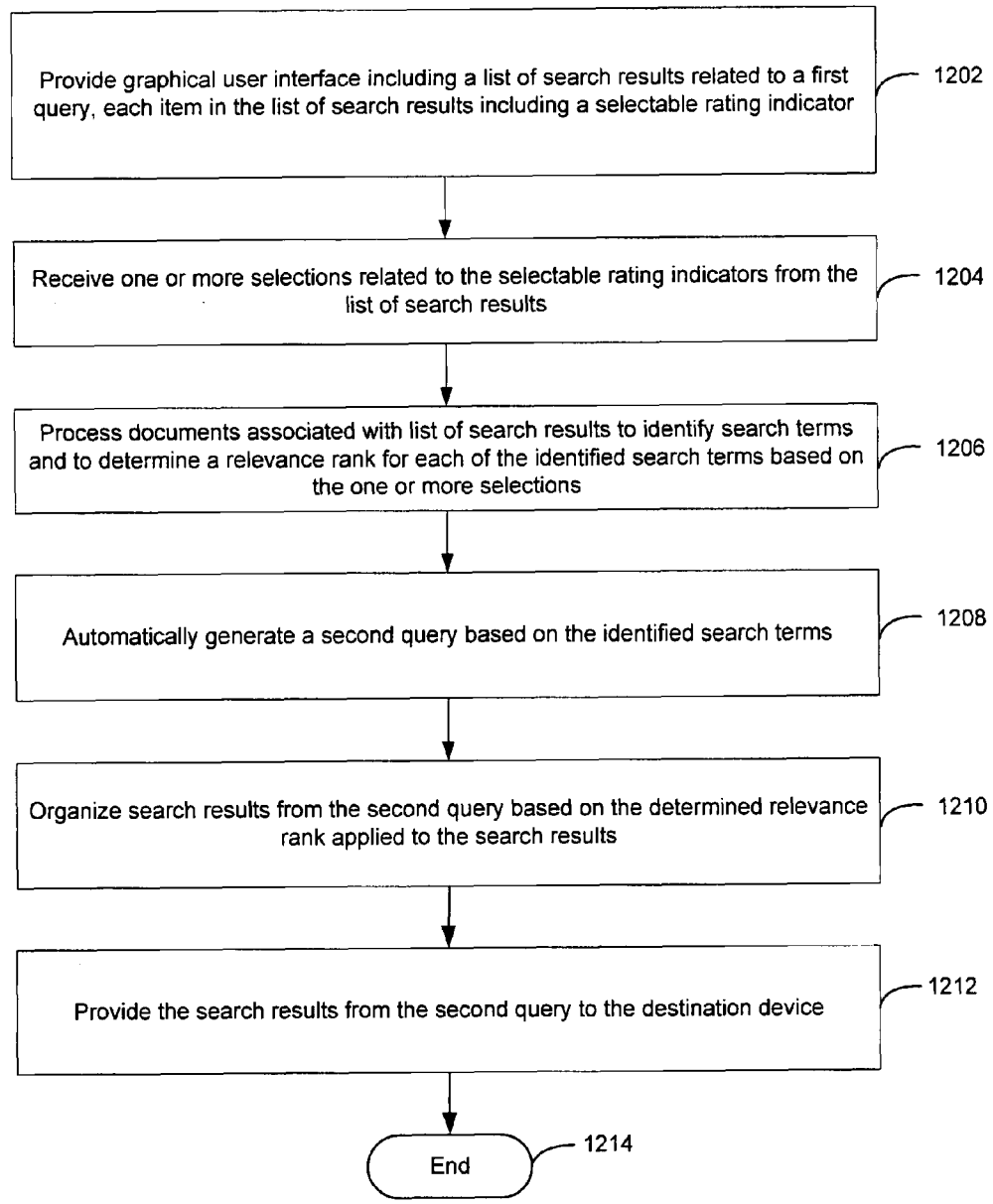
FIG. 12 is a flow diagram of a ninth particular illustrative embodiment of a method of searching data sources.

FIG. 12 is a flow diagram of a ninth particular illustrative embodiment of a method of searching data sources. At 1202, the search system provides a graphical user interface to a destination device, where the graphical user interface includes a list of search results related a first query and where each item in the list of search results includes a selectable rating indicator. Advancing to 1204, the search system receives one or more selections that are related to the selectable rating indicators from the list of search results. Proceeding to 1206, the search system processes documents associated with the list of search results to identify search terms and to determine a relevance rank of each of the identified search terms based on the one or more selections. Advancing to 1208, the search system automatically generates a second query based on identified search terms. In a particular illustrative embodiment, the secondary query may be based on ownership data associated with particular documents to retrieve financial information and other data that may be correlated to the search results. Proceeding to 1210, the search system uses the search results from the second query to augment the search results from the first query. Advancing to 1212, the search system provides the search results from the search first query and the second query to the destination device. The method terminates at 1214.

Figure 13:
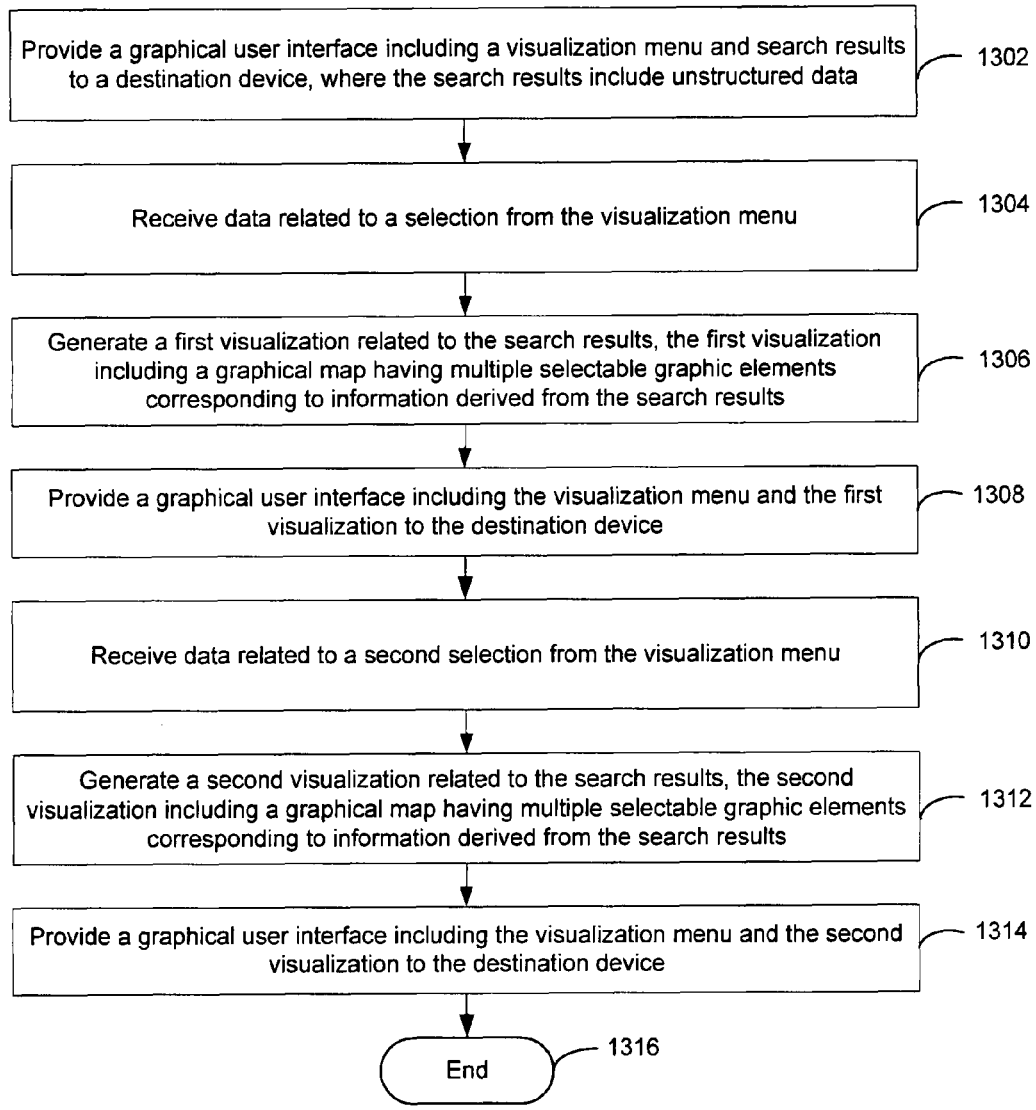
FIG. 13 is a flow diagram of a tenth particular illustrative embodiment of a method of searching data sources.

FIG. 13 is a flow diagram of a tenth particular illustrative embodiment of a method of searching data sources. At 1302, a search system provides a graphical user interface to a destination device that includes a visualization menu in search results, where the search results include unstructured data. Advancing to 1304, the search system receives data that is related to a selection from the visualization menu. Proceeding to 1306, the search system generates a first visualization that is related to the search results based on the data. The first visualization may include a graphical map having multiple selectable graphic elements corresponding to information derived from the search results. Proceeding to 1308, the search system provides the graphical user interface to the destination device that includes the visualization menu and the first visualization. Advancing to 1310, the search system receives data that is related to a second selection from the visualization menu. At 1312, the search system generates a second visualization that is related to the search results, where the second visualization includes a graphical map having multiple selectable graphical elements corresponding to information derived from the search results. Proceeding to 1314, the search system provides a graphical user interface to the destination device that includes the visualization menu and the second visualization. The method terminates at 1316.

Figure 14:
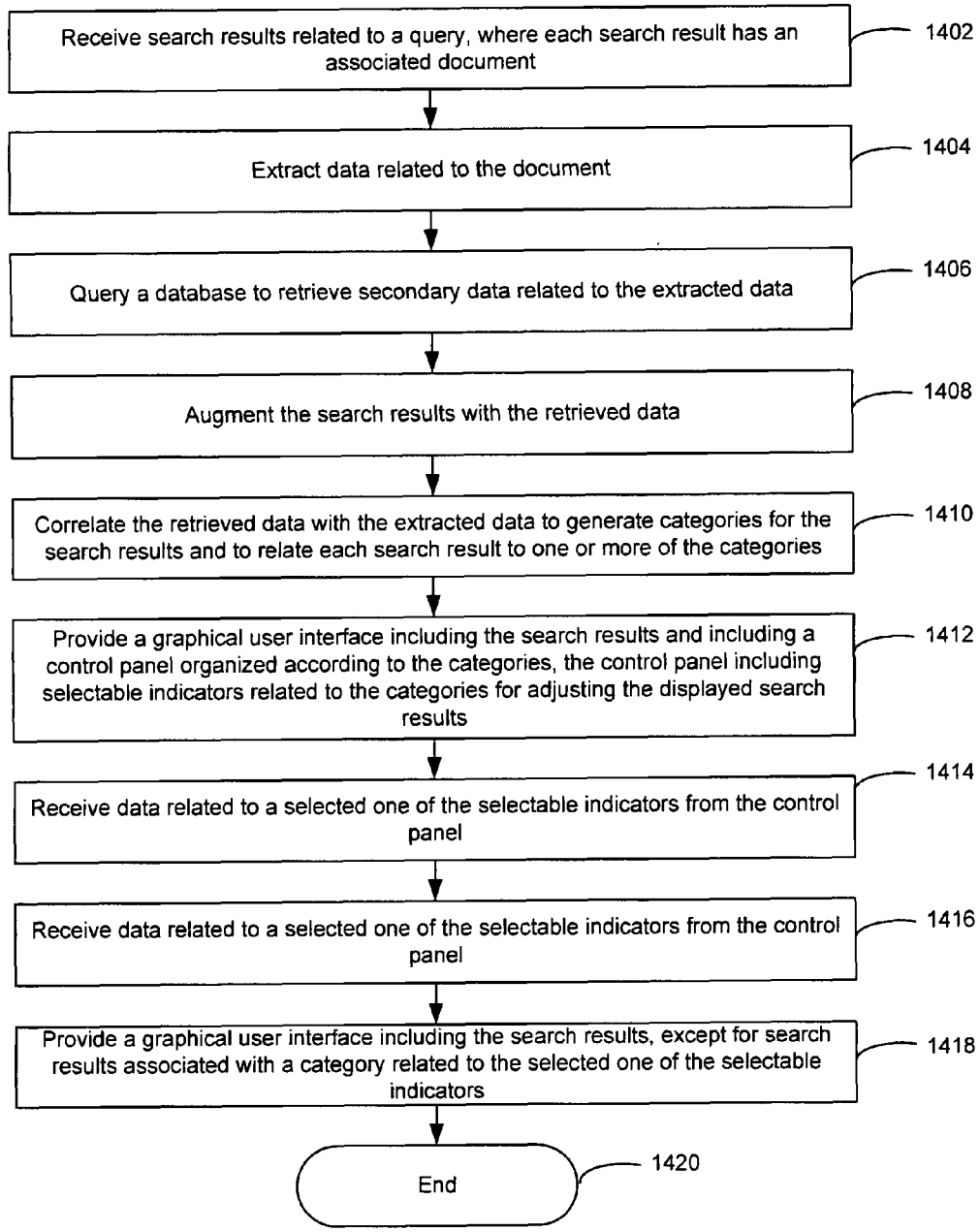
FIG. 14 is a flow diagram of an eleventh particular illustrative embodiment of a method of searching data sources.

FIG. 14 is a flow diagram of an eleventh particular illustrative embodiment of a method of searching data sources. At 1402, a search system receives search results that are related to a query, where each search result has an associated document. Proceeding to 1404, the search system extracts data that is related to the document for each search result. Advancing to 1406, the search system queries a database to retrieve secondary data related to the extracted data. Proceeding to 1408, the search system augments the search results with retrieved data from the database. Continuing to 1410, the search system correlates the retrieved data with the extracted data to generate categories for the search results and to relate each search result to one or more of the categories. Proceeding to 1412, the search system provides a graphical user interface to a destination device that includes a search results and includes a control panel organized according to the categories, where the control panel includes selectable indicators related to the categories for adjusting the displayed search results. In a particular illustrative embodiment, the control panel may permit a user to negate particular results (i.e. to filter the results to exclude particular information) by selecting a particular category within a control panel, for example. Advancing to 1414, the search system receives data that is related to a selected one of the selectable indicators from the control panel. Advancing to 1416, the search system filters the search results according to the data. Continuing to 1418, the search system provides a graphical user interface to the destination device that includes the selectable search results, except for the search results associated with a category related to the selected one of the selectable indicators. The method terminates at 1420.

Figure 15:
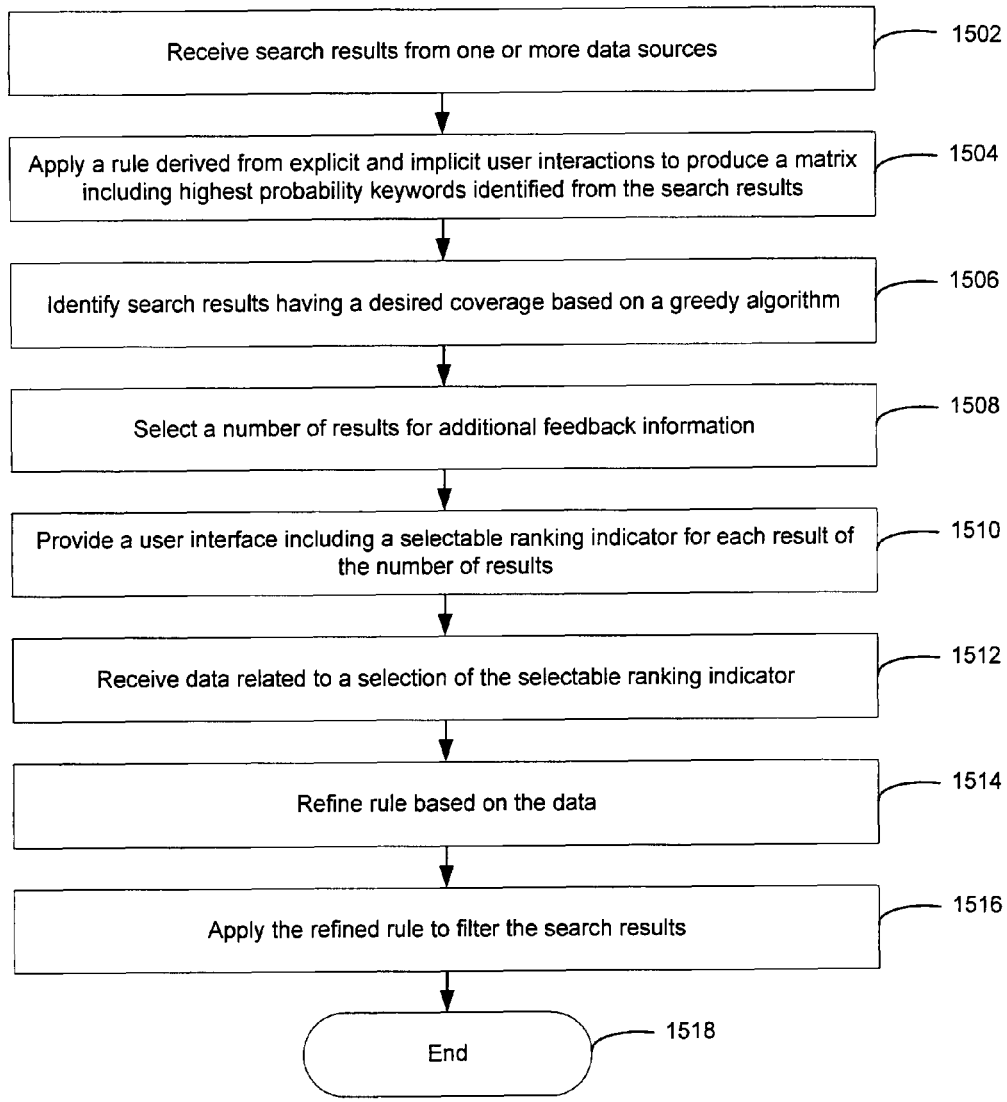
FIG. 15 is a flow diagram of a twelfth particular illustrative embodiment of a method of searching data sources.

FIG. 15 is a flow diagram of a twelfth particular illustrative embodiment of a method of searching data sources. At 1502, the search system receives search results from one or more data sources. Advancing to 1504, the search system derives a rule from explicit and implicit user actions and applies the rule to the search results to produce a matrix that includes highest probability key words identified from the search results. Continuing to 1506, the search system selects the search results having a desired coverage based on greedy algorithm (i.e. an algorithm to select a largest number of results). Moving to 1508, the search system selects a number of search results for additional user feedback information. Continuing to 1510, the search system provides a user interface that includes a selectable ranking indicator for each result of the number of search results. Proceeding to 1512, the search system receives data that is related to a selection from the selectable ranking indicators. Continuing to 1514, the search system refines the rule based on the data. Advancing to 1516, the search system applies the refined rule to filter the search results. The method terminates at 1518.

Figure 16:
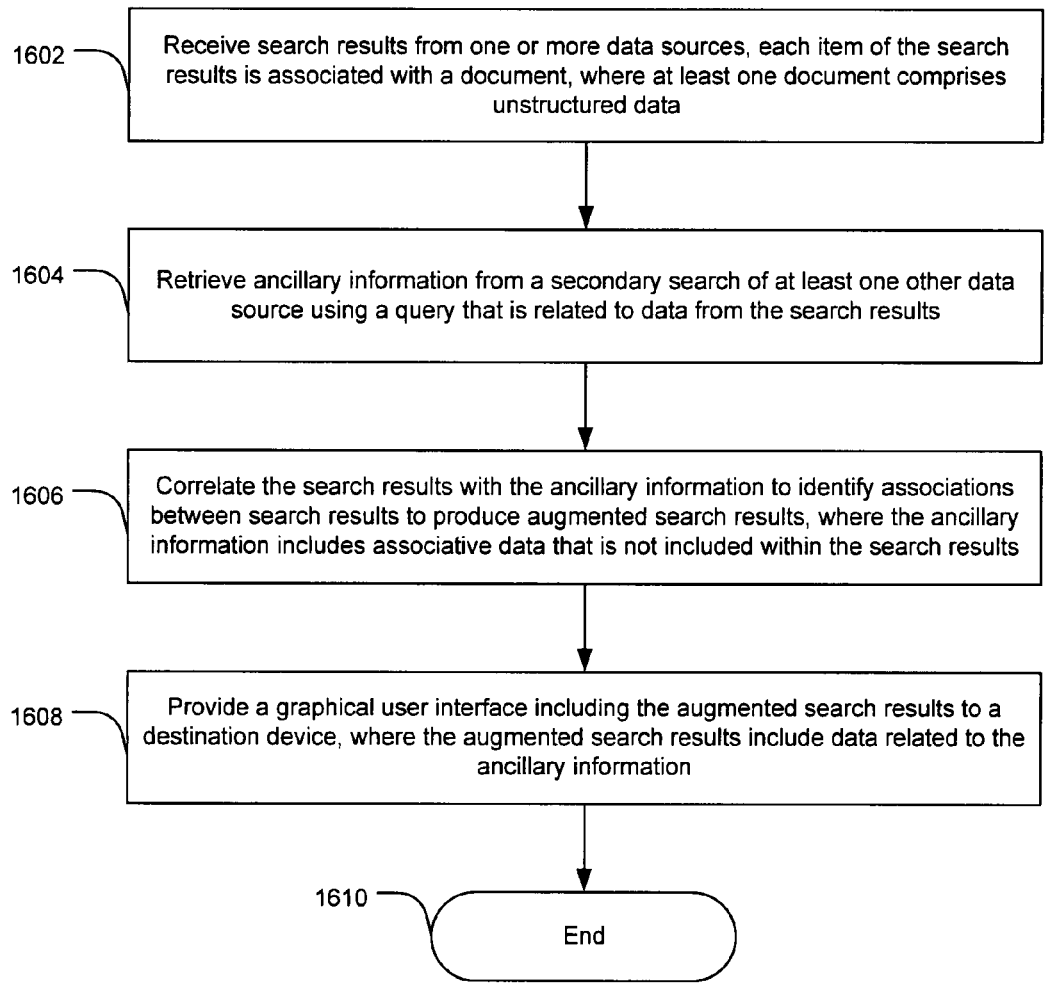
FIG. 16 is a flow diagram of a thirteenth particular illustrative embodiment of a method of searching data sources.

FIG. 16 is a flow diagram of a thirteenth particular illustrative embodiment of a method of searching data sources. At 1602, a search system receives search results from one or more data sources. Each item of the search results can be associated with a document, where at least one document comprises unstructured data. The unstructured data may be text data, image data, video data, or audio data. Moving to 1604, the search system retrieves ancillary information from a secondary search of at least one other data source using a query that is related to data from the search results. Proceeding to 1606, the search system correlates the search results with the ancillary information to identify associations between search results to produce augmented search results. The ancillary information includes associative data that is not included within the search results. Continuing to 1608, the search system provides a graphical user interface including the augmented search results to a destination device. The augmented search results can include data related to the ancillary information. The method terminates at 1610.

In a particular illustrative embodiment, the document can include semi-structured data, such as tagged documents, hypertext markup language (HTML) documents, extensible markup language (XML) documents, or other semi-structured documents. In another embodiment, the search system can retrieve data from a structured data source, such as a database, and the secondary search can include a structured database query. In another particular illustrative embodiment, the search system may retrieve data from an unstructured or variably structured data source, such as a public network (i.e. the Internet).

In a particular illustrative embodiment, each identified association includes a shared attribute derived from the search results. In another particular illustrative embodiment, the graphical user interface includes one or more selectable indicators related to the ancillary information. The one or more selectable indicators can be a button, a check box, a radio button, or another user selectable element. The one or more selectable indicators can be accessible to by a user to alter a presentation of the augmented search results.

In a particular illustrative embodiment, the ancillary information can include time-varying information, such as a current stock value. In such an instance, the augmented search results change with the ancillary information. In a particular illustrative embodiment, the search system can extract secondary data from documents associated with the search results and can send a secondary query to at least one data source based on the secondary data. In still another particular illustrative embodiment, the search system correlates the search results by identifying relationships between metadata related to the search results. The search system can generate one or more selectable indicators from the secondary data and from the ancillary information to drill through the search results. Additionally, the search system can generate one or more selectable indicators from the secondary data and from the ancillary information to drill down within the search results.

Figure 17:
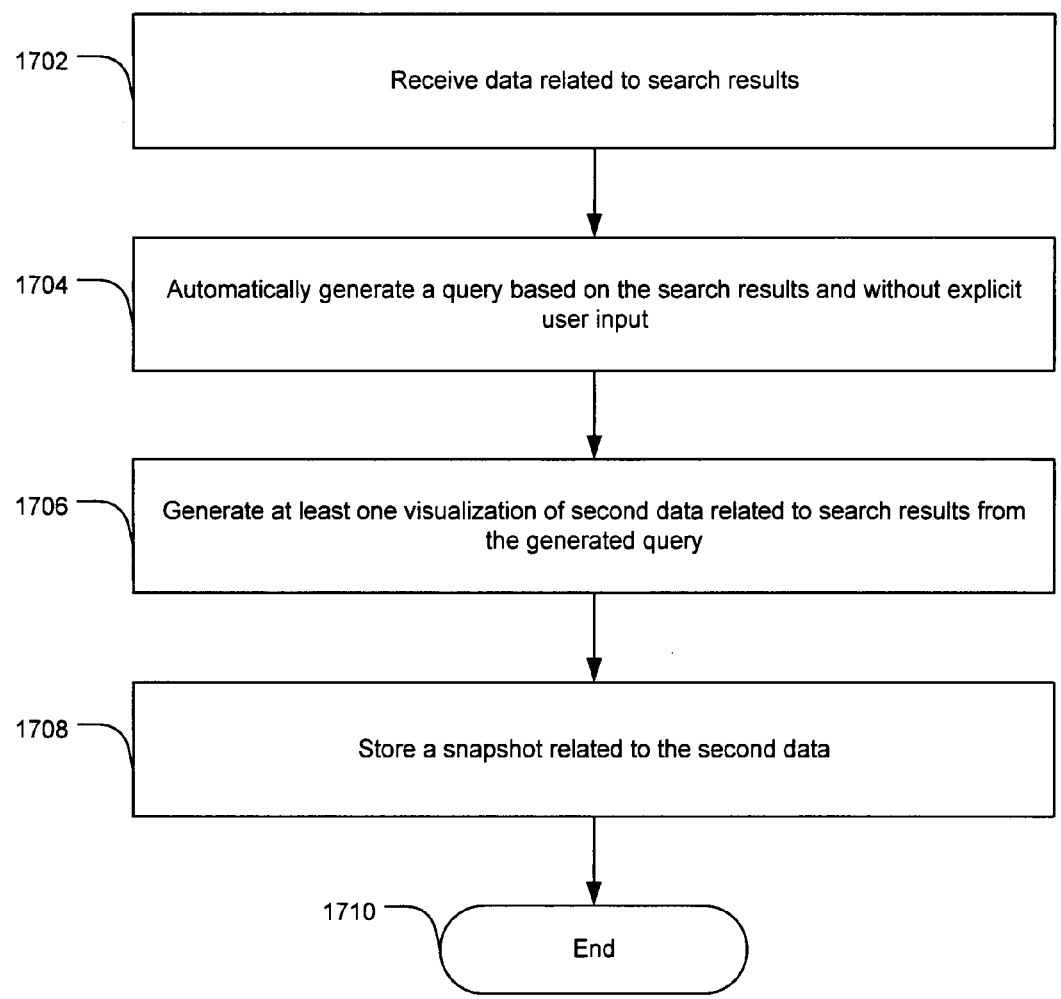
FIG. 17 is a flow diagram of a particular illustrative embodiment of a method of query refinement.

FIG. 17 is a flow diagram of a particular illustrative embodiment of a method of query refinement. At 1702, a search system receives data related to search results. Moving to 1704, the search system automatically generates a query based on the search results and without explicit input. For example, the search system can extract data from the search results and formulate a query to one or more data sources based on the extracted data. In a particular illustrative embodiment, the search system may extract ownership data related to assignees or owners of particular documents from the search results and search for ancillary information related to such ownership data. The ancillary information can include geographic information, financial information, litigation history information, and other information that is tangentially related to at least one attribute of the search results. Proceeding to 1706, the search system generates at least one visualization of second data related to search results from the generated query. Advancing to 1708, the search system stores a snapshot related to the second data. The method terminates at 1710.

In a particular illustrative embodiment, the second data may include ancillary data, data that relates (at least tangentially) to the data contained within the search results. In a particular illustrative embodiment, the search system automatically generates a query by generating a competitive intelligence query related to industry information extracted from the search results and searching at least one data source using the competitive intelligence query to identify the second data. In a particular illustrative embodiment, the visualization of the second data is generated based on a user profile, which may include explicit and implicit user feedback derived from previous communications between the user and the search system. In still another particular illustrative embodiment, the visualization of the second data is generated based on a user selection, such as from a visualization menu that includes multiple visualization options. In an illustrative example, the visualization can be a graphical visualization that includes multiple selectable graphical elements, where each selectable graphical element is related to at least one of the search results. The graphical visualization can be a geographic map, a document landscape, a chart, a graph, another visualization, or any combination thereof. In a particular embodiment, the graphical visualization can be an indicator resembling a dashboard indicator, such as a dial indicator.

Figure 18:
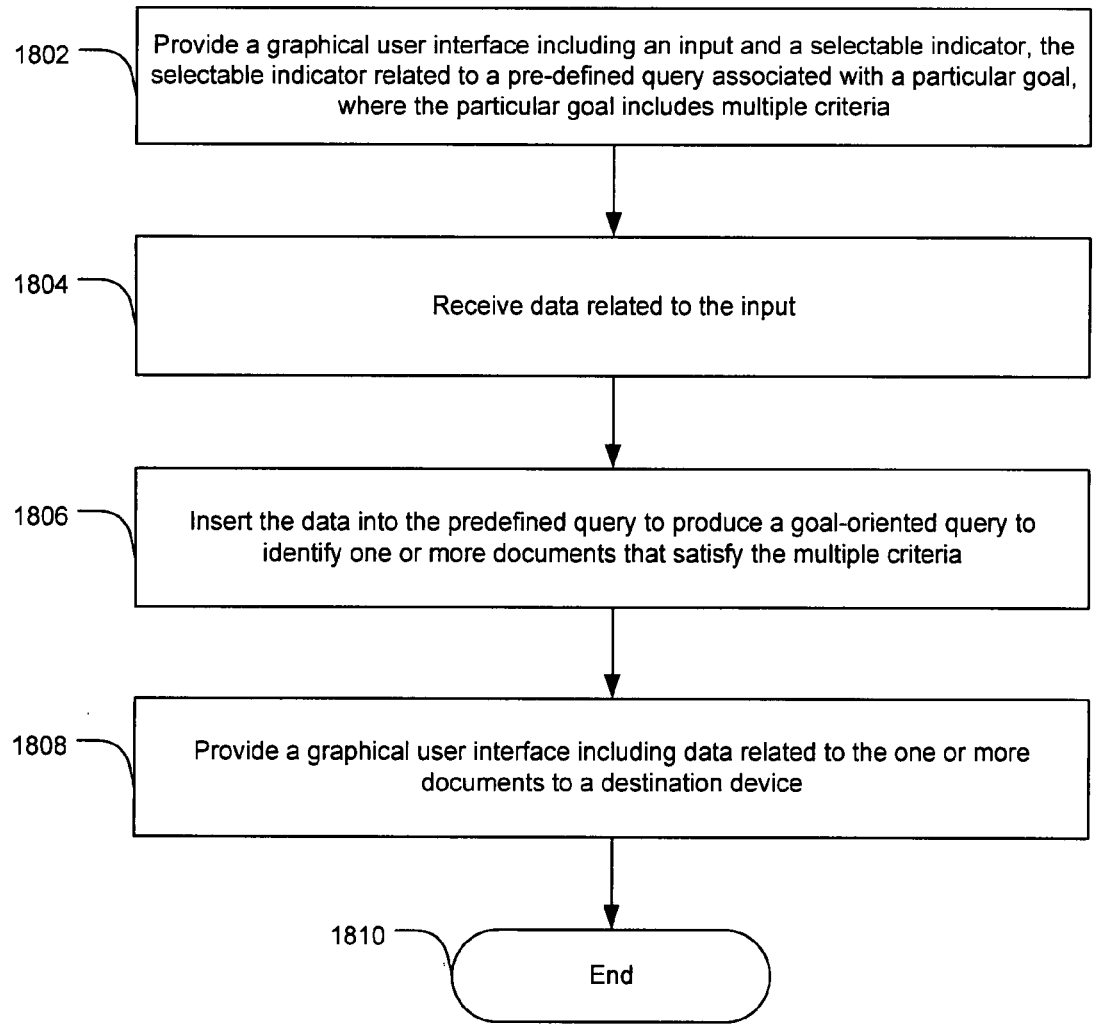
FIG. 18 is a flow diagram of a particular illustrative embodiment of a method of goal-oriented searching.

FIG. 18 is a flow diagram of a particular illustrative embodiment of a method of goal-oriented searching. At 1802, the search system provides a graphical user interface including an input and a selectable indicator. The selectable indicator may be related to a pre-defined query related to a particular goal, where the goal comprising multiple criteria. For example, the goal may include criteria to identify particular criteria for desired search results, such as criteria for identifying companies that operate in the same technology market or industry as that of an owner associated with particular document. Advancing to 1804, the search system receives data related to the input. Proceeding to 1806, the search system inserts the data into the pre-defined query to produce a goal-oriented query to identify one or more documents that satisfy the multiple criteria. Continuing to 1808, the search system provides a graphical user interface to a destination device including data related to the one or more documents. The method terminates at 1810.

In a particular illustrative embodiment, the goal-oriented query can include a competitive analysis search to identify data related to competitors of a particular entity, an asset licensing search to identify data related to potential licensees of the asset, a patent invalidity search, an asset identifying search to identify a potentially valuable asset from a plurality of assets, or any combination thereof. In another particular embodiment, the multiple criteria include a date criteria, a keyword, an industry classification, an organization identifier, or any combination thereof. In a particular illustrative embodiment, the search system retrieves a first document related to the data and performs link analysis on one or more links contained within the first document to extract additional information related to the pre-defined query. The first document can include semi-structured data.

Figure 19:
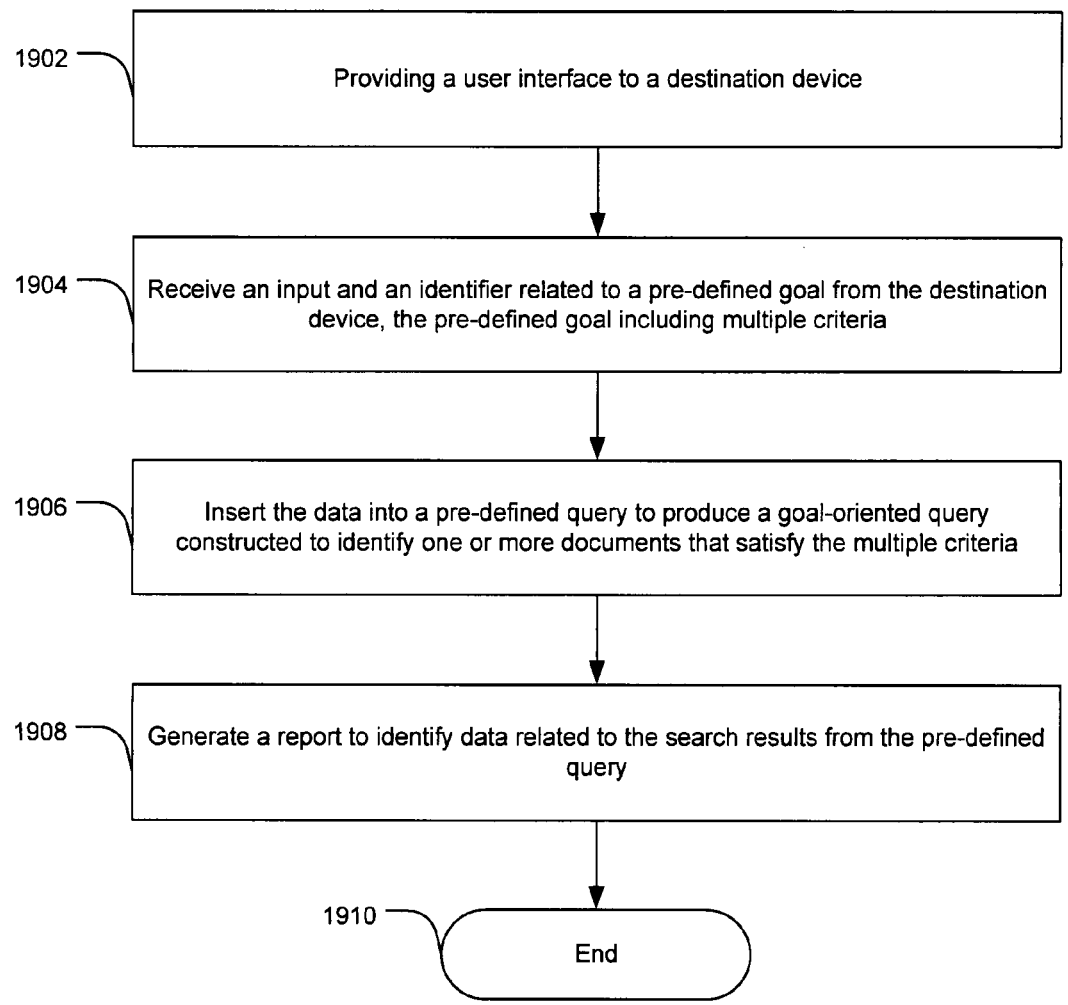
FIG. 19 is a flow diagram of a second particular illustrative embodiment of a method of goal-oriented searching.

FIG. 19 is a flow diagram of a second particular illustrative embodiment of a method of goal-oriented searching. At 1902, the search system provides a user interface to a destination device. Proceeding to 1904, the search system receives an input and an identifier related to a pre-defined goal. The pre-defined goal includes multiple criteria. Advancing to 1906, the search system inserts the data into a pre-defined query to produce a goal-oriented query constructed to identify one or more documents that satisfy the multiple criteria. Continuing to 1908, the search system generates a report identifying data related to the search results from the pre-defined query. The method terminates at 1910.

In a particular illustrative embodiment, the report may be a competitive analysis report identifying data related to competitors of a particular entity based on search results from the pre-defined query. In another particular illustrative embodiment, the report may be a licensee report identifying data related to potential licensees of an asset based on search results from the pre-defined query. In still another particular illustrative embodiment, the report may be a patent invalidity report identifying data related to documents that may invalidate a particular patent based on search results from the pre-defined query. In yet another particular illustrative embodiment, the report may be an asset report identifying data related to a potentially valuable asset from a plurality of assets based on search results from the pre-defined query.

In a particular illustrative embodiment, the method may also include retrieving a first document related to the data and performing link analysis on one or more links contained within the first document to extract additional information related to the pre-defined query. In a particular illustrative, non-limiting embodiment, the search system can traverse the links from the first document to locate other documents. The system can traverse links in the other documents to find still more documents. The system can assemble a list of documents identified from the link analysis that are not contained or cited in the first document.

In a particular illustrative embodiment, the multiple criteria include a location identifier, a range of annual revenues associated with an organization, or a combination thereof. In another particular illustrative embodiment, the search system reverse engineers a query from the one or more identified documents, which may be associated with a company that is related to the received data. In still another particular illustrative embodiment, the search system queries multiple data sources using the goal-oriented query, and provides results to a destination device within a graphical user interface.

Figure 20:
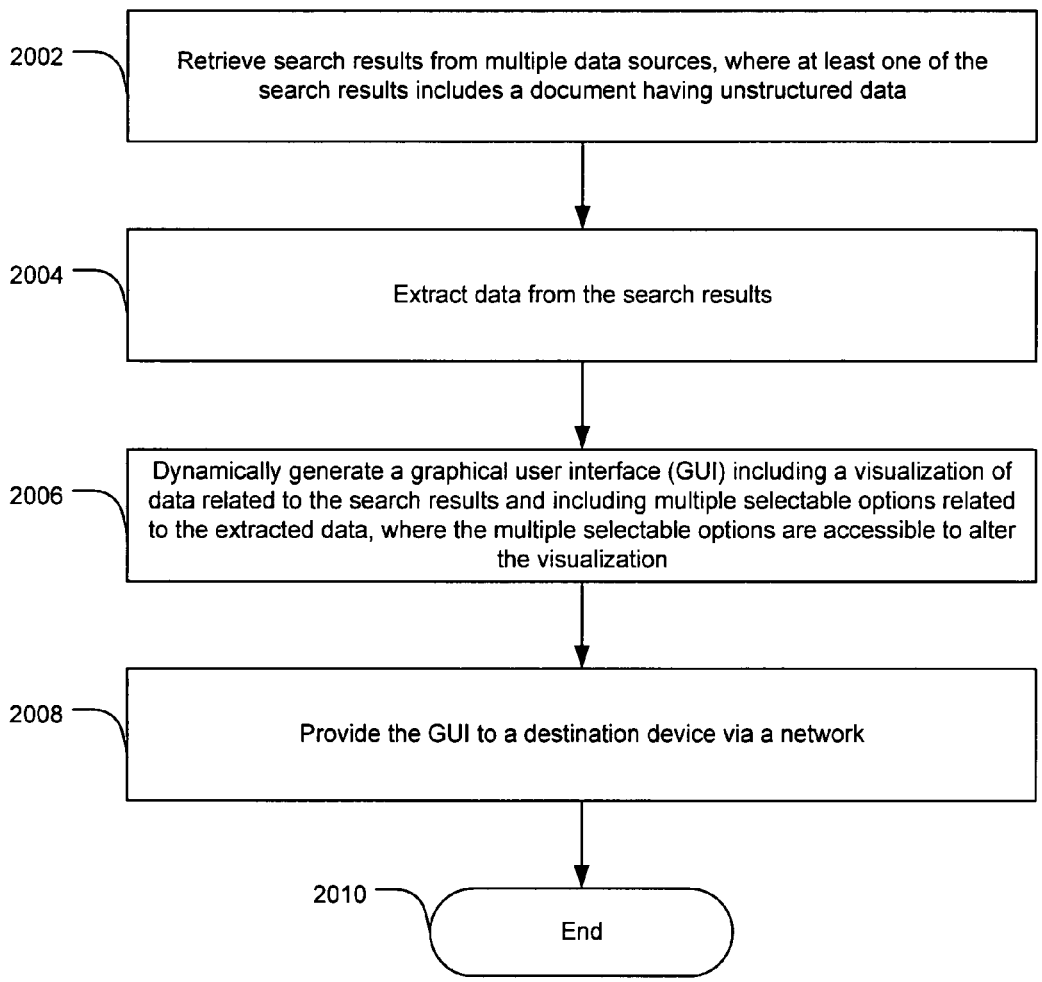
FIG. 20 is a flow diagram of a particular illustrative embodiment of a method of presenting search results.

FIG. 20 is a flow diagram of a particular illustrative embodiment of a method of presenting search results. At 2002, a search system retrieves search results from multiple data sources, where at least one of the search results includes a document having unstructured data. Proceeding to 2004, the search system extracts data from the search results. Moving to 2006, the search system dynamically generates a graphical user interface (GUI) including a visualization of data related to the search results and including multiple selectable options related to the extracted data. The multiple selectable options can be accessed to alter the visualization. Advancing to 2008, the search system provides a graphical user interface to a destination device via a network. The method terminates 2010.

In a particular illustrative embodiment, the multiple selectable options include a negation option related to a classification. The negation option is accessible to remove data related to the search results that are associated with the classification from the presentation. In another particular illustrative embodiment, the multiple selectable options comprise an industry classification option, which is based on industry categories associated with owners of documents related to the search results. The multiple selectable options may also include a document source option, which is related to a data source from which a particular search result is received. In still another particular embodiment, the multiple selectable options include a company classification option based on company names associated with owners of documents related to the search results. In yet another particular embodiment, the multiple selectable options include a geographic location option that relates to a geographic location associated with owners of documents related to the search results. For example, a corporate assignee of a patent has an address that represents a geographic location.

In a particular illustrative embodiment, the multiple selectable options include a slider bar that is accessible by a user to select among a range of values to control a presentation of the search results. In another particular illustrative embodiment, the method can include extracting data from the search results, generating a query related to the extracted data, and retrieving ancillary data from at least one data source based on the generated query. The ancillary data includes at least one classification. In a particular illustrative embodiment, the search system may provide a graphical user interface (GUI) that includes data representing statistics derived from the search results.

Figure 21:
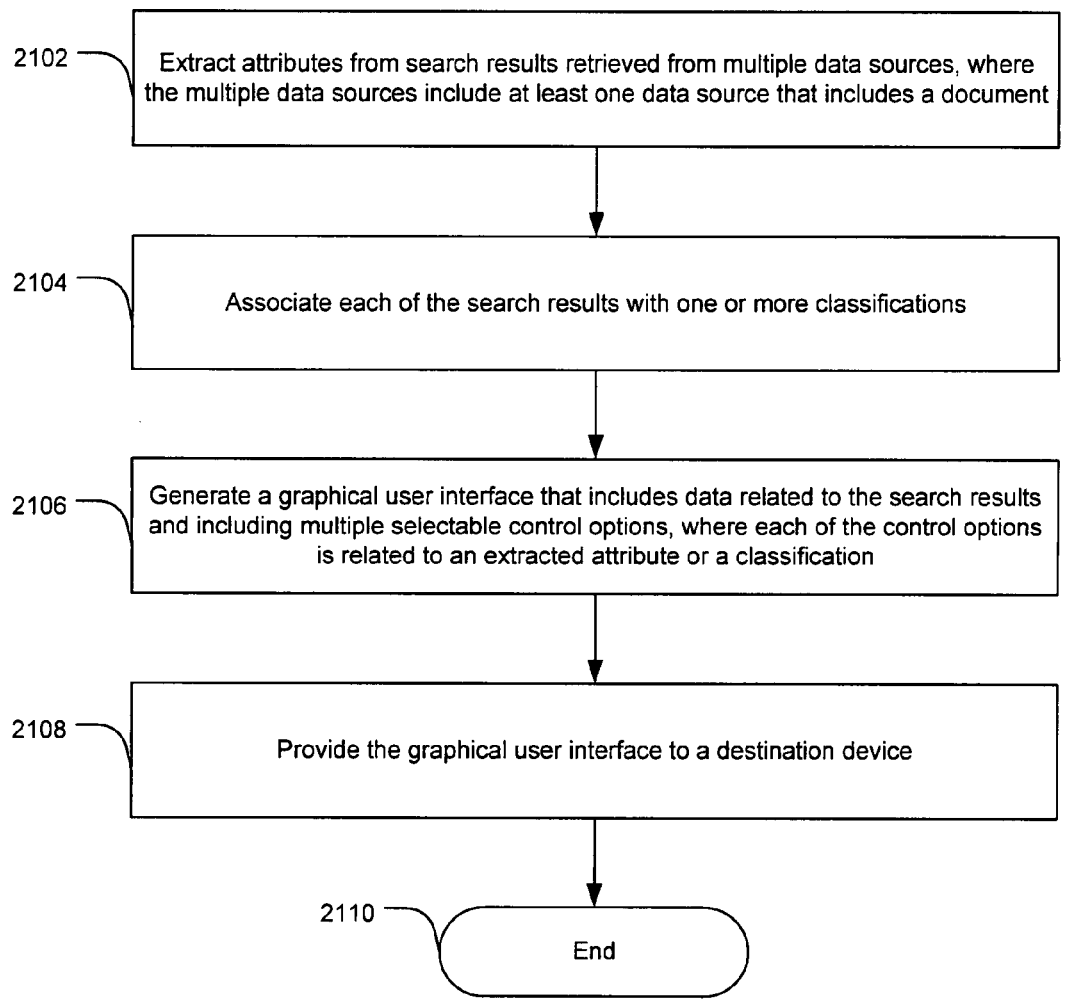
FIG. 21 is a flow diagram of a second particular illustrative embodiment of a method of presenting search results.

FIG. 21 is a flow diagram of a second particular illustrative embodiment of a method of presenting search results. At 2102, a search system extracts attributes from search results retrieved from multiple data sources. The multiple data sources include a data source that includes a document. Proceeding to 2104, the search system associates each of the search results with one or more classifications. In a particular embodiment, some of the search results may be associated with multiple classifications. Advancing to 2106, the search system generates a graphical user interface including data related to the search results and including multiple selectable control options. Each of the multiple selectable control options may be related to an extracted attribute from the search results or may be related to a classification. Continuing to 2108, the search system provides the graphical user interface to a destination device. The method terminates at 2110.

In a particular illustrative embodiment, the multiple selectable control options can include a negation option associated with a subset of search results. The negation option can be accessible to filter ("negate") the subset from the search results. In another particular illustrative embodiment, the multiple selectable control options include an industry control option accessible to view data related to search results associated with an industry classification. In another particular embodiment, the multiple selectable control options include a company control option accessible to view data related to search results associated with a particular company. In yet another particular illustrative embodiment, the multiple selectable control options can include a location control option accessible to view data related to search results associated with a particular location, a date option to limit the search results based on at least one date, a financial control option to filter the search results based on financial information associated with owners of documents related to the search results.

Figure 22:
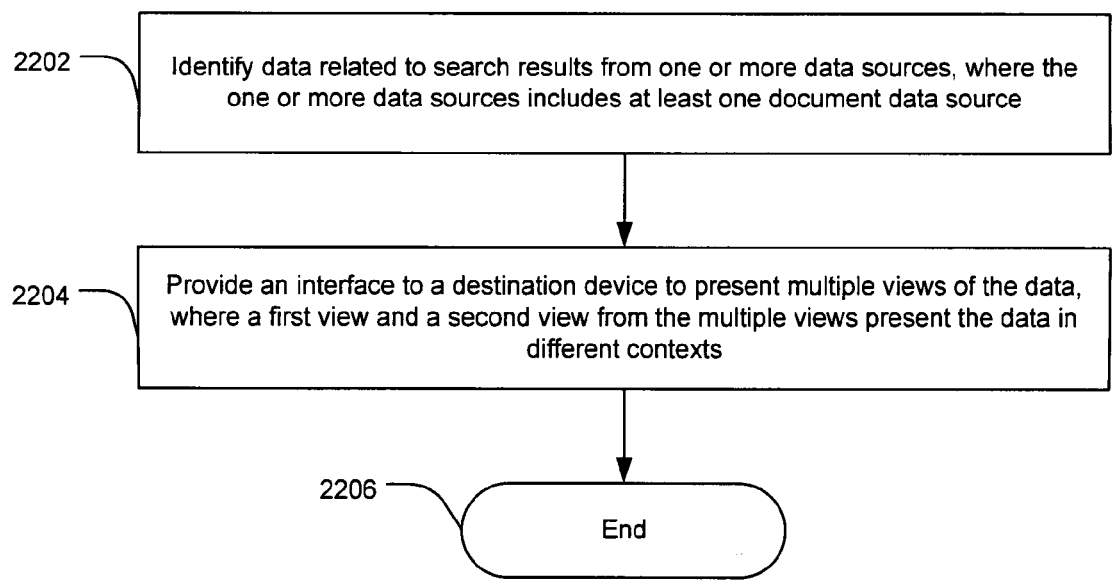
FIG. 22 is a flow diagram of a third particular illustrative embodiment of a method of presenting search results.

FIG. 22 is a flow diagram of a third particular illustrative embodiment of a method of presenting search results. At 2202, a search system identifies data related to search results from one or more data sources, which includes at least one document data source. Proceeding to 2204, the search system provides an interface to present multiple views of the data, where a first view and a second view from the multiple views present the data in different contexts. The method terminates at 2206.

In a particular illustrative embodiment, the different contexts include a geographical context, which includes a visualization to map attributes of the search results to a geographic map. In another particular embodiment, the different contexts include a financial context representing, revenues of organizations associated with the data, an industry context representing a list of companies organized by industry classification associated with the data, and a business intelligence context. The business intelligence context can be used to map particular resources of an organization against resources of other organizations to identify opportunities, threats, risks, opportunities, other intelligence, or any combination thereof.

In a particular illustrative embodiment, the interface includes a visualization adjustment option to modify a parameter of a selected view of the multiple views. The parameter may include a color range identifying color gradients of graphic elements within the selected view, a sort order of data elements within the selected view, a size dimension associated with graphic elements within the selected view, a texture parameter associated with graphic elements within the selected view. The texture parameter may be represented by shading or cross-hatching, by lines, dots, or patterns, by other patterns, or any combination thereof.

In a particular illustrative embodiment, the first view and a third view of the multiple views may present different portions of the data. In one embodiment, the first view may present a list of search results, while the third view may display financial information related to owners of the documents identified by the search results.

In another particular illustrative embodiment, the search system identifies data related to search results from one or more data sources. The one or more data sources include at least one document data source. The search system may also provide an interface to present multiple views of the data. A first view of the multiple views and a second view of the multiple views can present different portions of the data. A third view and the second view from the multiple views present the data in different contexts. In another particular illustrative embodiment, the search system can augment the search results with related information to produce augmented information, and the interface presents multiple views of the augmented information. The search system may retrieve ancillary data related to the search results.

Figure 23:
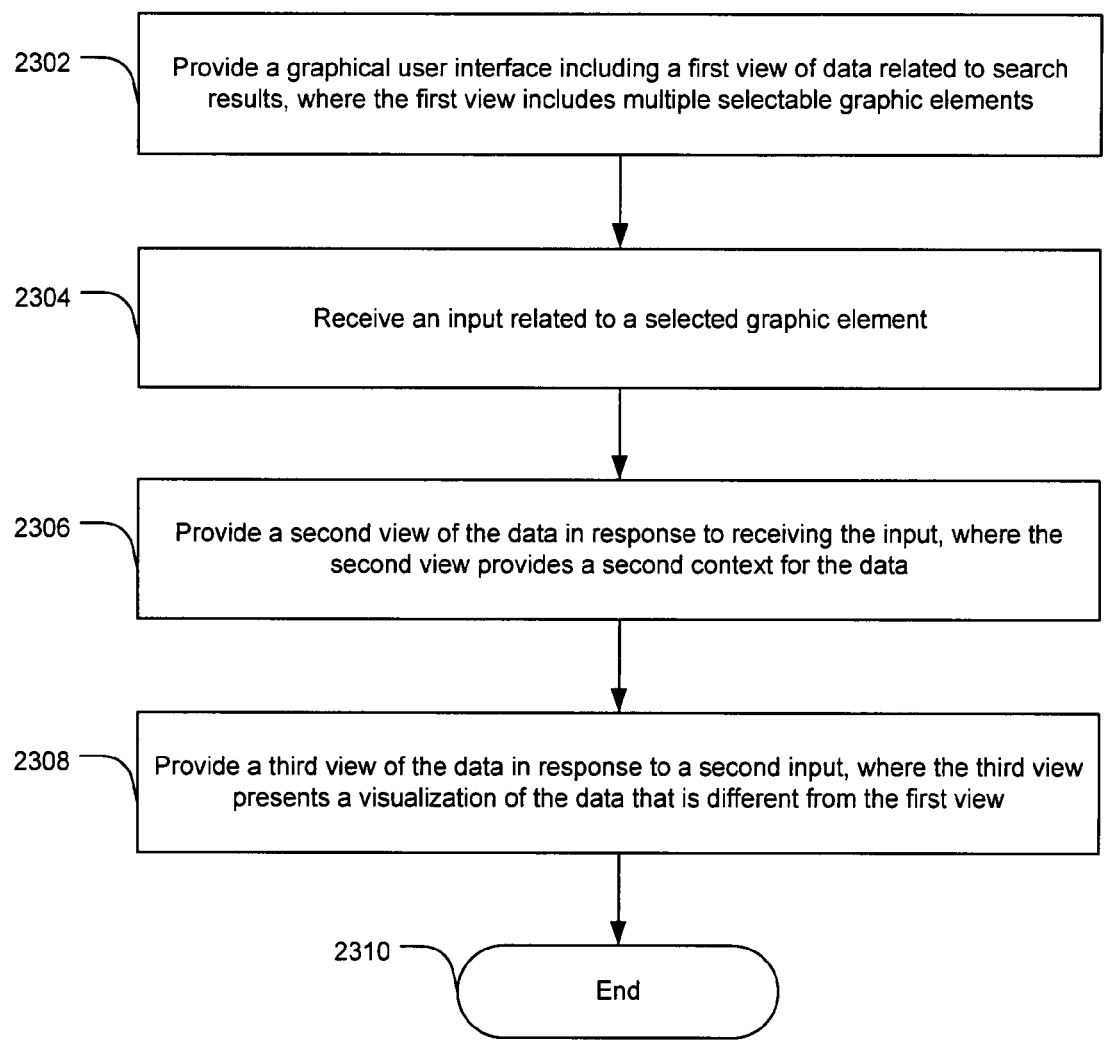
FIG. 23 is a flow diagram of a fourth particular illustrative embodiment of a method of presenting search results.

In a particular illustrative embodiment, the different contexts include a cluster visualization context to present a graphical image of related document clusters based on the search results, a competitive intelligence context to present a set of organizations in a particular market related to the search results, a legal risk context to prioritize information related to the search results based on a risk assessment, or any combination thereof. Further, the different contents can include a tree map analysis context to display a correlation between search results and an asset valuation context to identify potential monetization opportunities for selected assets related to the search results, or any combination the FIG. 23 is a flow diagram of a fourth particular illustrative embodiment of a method of presenting search results. At 2303, a search system can provide a graphical user interface including a first view of data related to search results. The first view includes multiple selectable graphic elements, such as graphical images, buttons, graphs, other selectable indicators, or any combination thereof. Proceeding to 2304, the search system receives an input related to a selected graphic element. Moving to 2306, the search system provides a second view of the data in response to receiving the input. The second view provides a second context for the data. Advancing to 2308, the search system provides a third view of the data in response to a second input, where the third view presents a visualization of the data that is different from the first view. The method terminates at 2310.

In a particular illustrative embodiment, the second view includes a subset of the search results, a portion of the data related to the search results, an expanded view of the search results, or any combination thereof. In a particular illustrative embodiment, the second view includes a different set of search results based on an attribute of the data from the first view.

FIGS. 24-39 are diagrams of particular illustrative embodiments of graphical user interfaces to search data sources. Each of the illustrative embodiments includes multiple selectable indicators or options, which a user may select to access particular functions or features. It should be understood that other graphical user interfaces and other selectable options can be provided, depending on the particular implementation. Additionally, each of multiple selectable options may be used in any of the embodiments.

Figure 24:
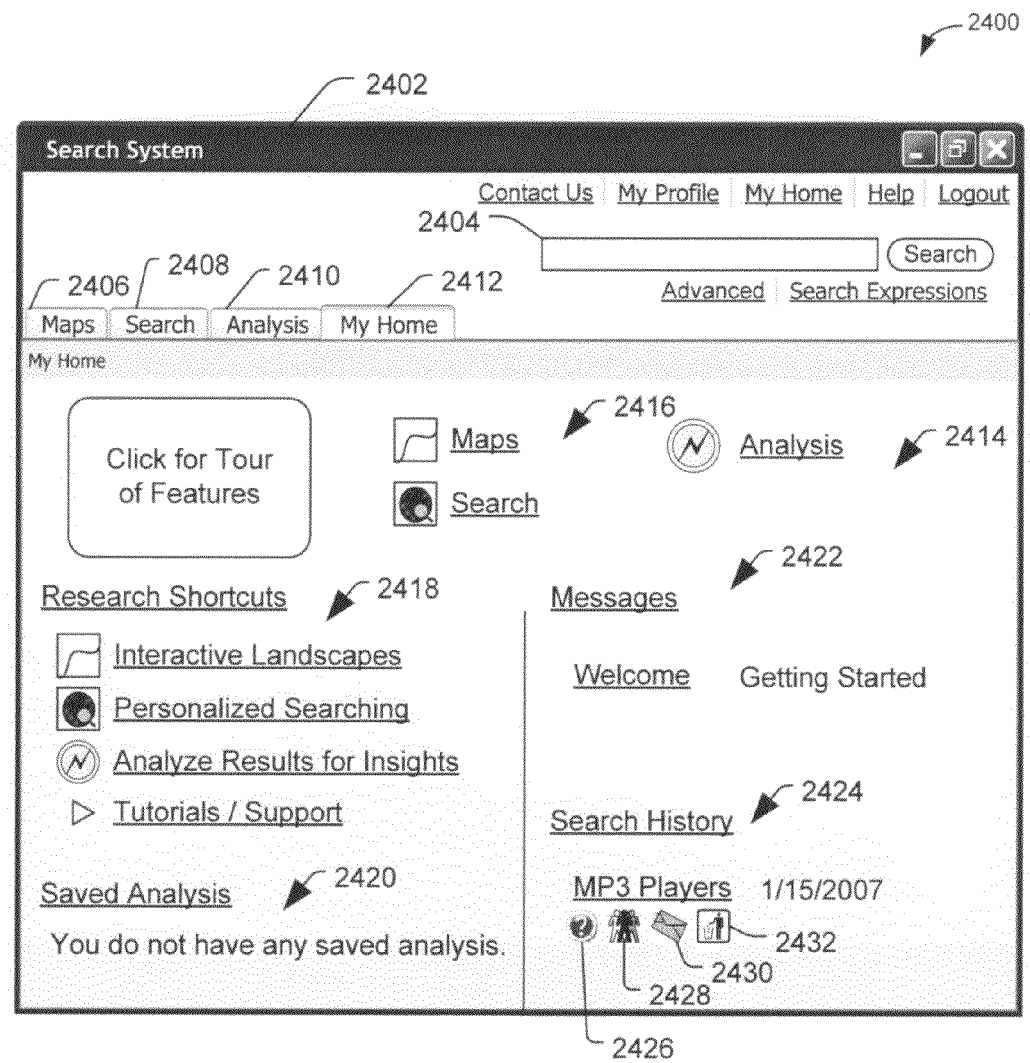
FIGS. 24-39 are diagrams of particular illustrative embodiments of a graphical user interface to search data sources.

FIG. 24 is a diagram of a particular illustrative embodiment of a particular illustrative embodiment of a graphical user interface 2400 to search data sources. The graphical user interface 2400 includes a window 2402 that includes a text input 2404, and user selectable tabs 2406, 2408, 2410, and 2412. A "My Home" tab 2412 is selected and a panel 2414 associated with the subscriber's home is displayed. The "My Home" tab 2412 includes selectable links 2416 that are related to functionality of the tabs 2406, 2408, and 2410. Additionally, the "My Home" panel 2414 includes selectable search shortcuts 2418 such as interactive landscapes (i.e. maps, charts, and other visualizations), personalized searching, search result analysis, and tutorials. Additionally, the "My Home" panel 2414 includes saved analysis area 2420, a messages in-box area 2422, and stored search history area 2424.

The search history area 2424 may include a stored snapshot associated with a search, such as a search snapshot associated with "MP-3 players," which was stored on Jan. 15, 2007. Each stored search snapshot is associated with the user selectable icons including an information icon 2426, a sharing icon 2428, an e-mail icon 2430, and a trash icon 2432. A user may select one or more of the selectable indicators to interact with the graphical user interface 2400. For example, the user may click the info icon 2426 to change the name or otherwise alter information related to the stored search history. The user may share the search with other users by clicking on the share icon 2428. The user may e-mail the search results to another user by clicking on the e-mail icon 2430, or the user may delete the search by clicking on the delete icon 2432. Additionally, the user may access other aspects of the search system by clicking on one or more of the selectable indicators. For example, a user may access the text input 2404 to search for particular data using keywords. Alternatively, a user may select one of the tabs to view search results from multiple different perspectives.

In a particular embodiment, a user may utilize the tabs 2406, 2408, 2410, and 2412 to switch between search results, a graphical visualization of the search results (e.g., a graphical user interface including a graphical map having multiple selectable elements), and various analyses of the search results. Additionally, a user may access one of the research shortcuts 2416 to begin a search.

Figure 25:
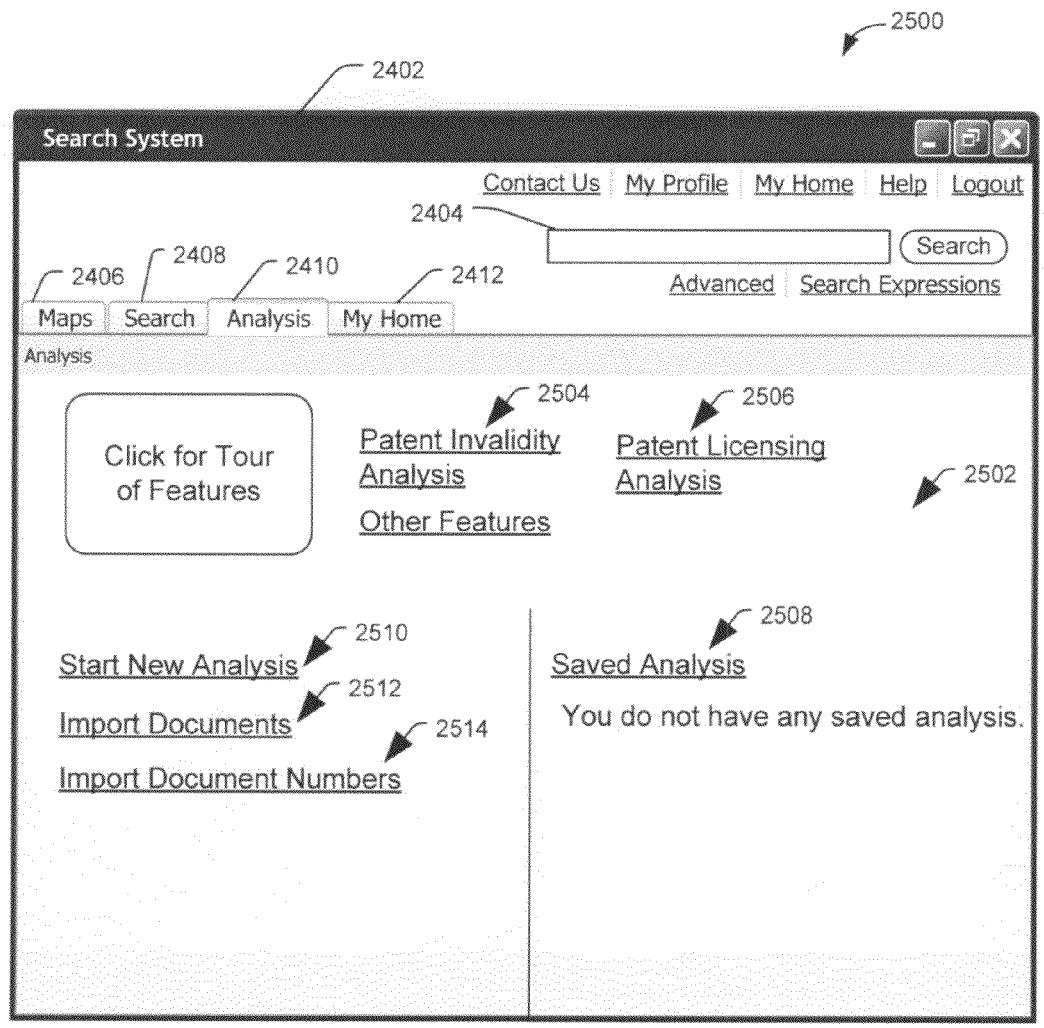

FIG. 25 is diagram of a second particular illustrative embodiment of a graphical user interface 2500 to search data sources. The graphical user interface 2500 is adapted to interact with a back-end system that may be directed to intellectual property, such as patents. In particular, the graphical user interface 2500 includes the window 2402 that has an "Analysis" panel 2502. The panel 2502 includes a "patent invalidity analysis" selectable indicator 2504, which may be utilized to perform a one-click goal-oriented search to identify a list of potentially invalidating prior art for a particular patent. The panel 2502 also includes a "patent licensing" selectable indicator 2506, which may be accessed to perform a one-click goal oriented search to identify a list of likely infringers of a particular patent. Additionally, the analysis panel 2512 may include stored analysis 2508, as well as selectable options to start a new analysis 2510, to import documents 2512, and to import document numbers 2514.

In a particular illustrative embodiment, in response to receiving data related to a selection of the patent invalidity analysis option 2504, the graphical user interface 2500 may display a popup window to receive a patent number of a patent to invalidate. The patent number may be submitted to the search system, which retrieves the patent from the United States Patent and Trademark Office website, analyzes references cited within the retrieved patent, searches the cited references and references cited within those cited references, and surfaces a list of search results of prior art that was not cited in the patent to invalidate. Additionally, the search system may apply additional logic to extract key terms and to retrieve search results from international search classifications associated with the patent to invalidate, either based on the document itself, based on classification data (such as the North American Industry Classification system), or any combination thereof. The search system may also search for documents that referenced the particular patent and analyze documents cited by those patents or patent publications. Additionally, the search system may provide the search results to the graphical user interface for display to the user. Additionally, the user may search within the search results by entering keywords to refine the search.

Figure 26:
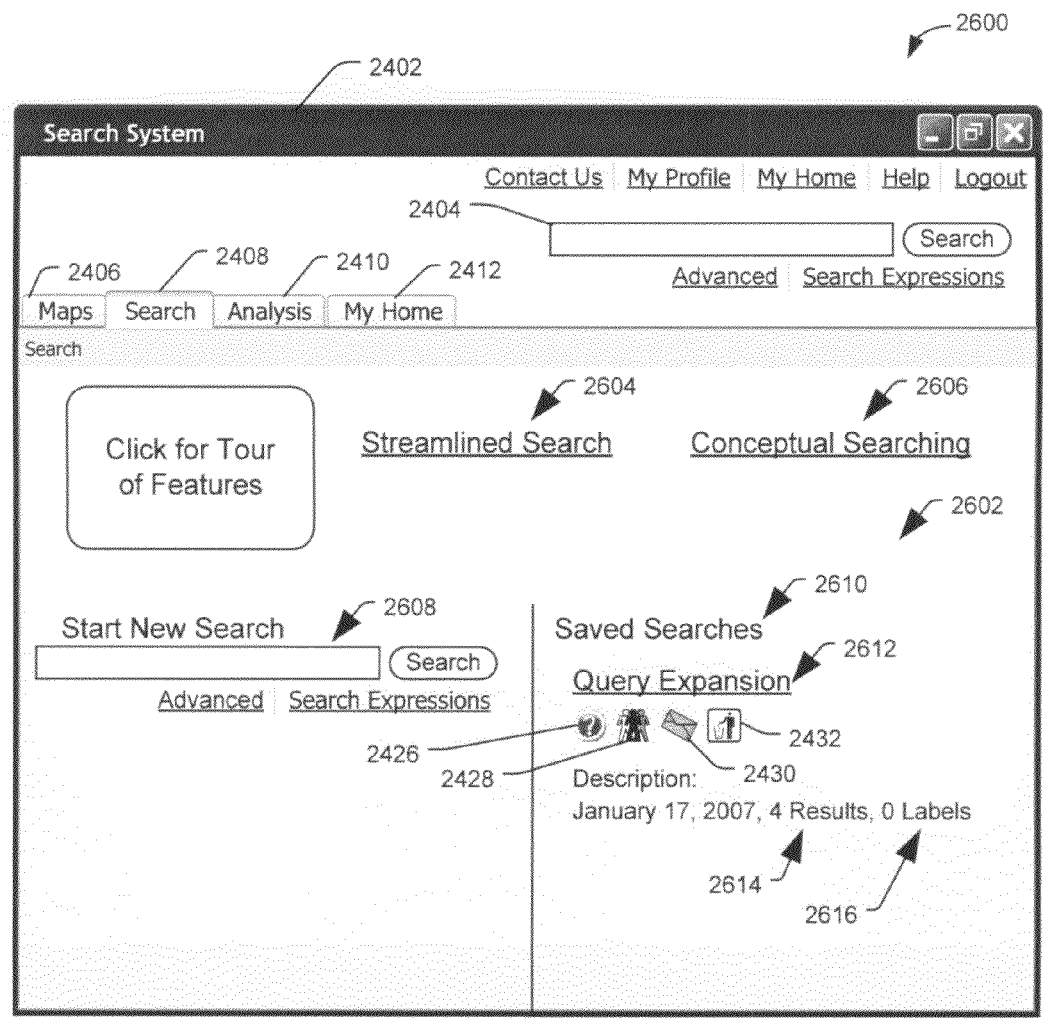

FIG. 26 is a diagram of a third particular illustrative embodiment of a graphical user interface 2600 to search data sources. The user interface 2600 includes the window 2402, which includes the "search" panel 2602. The search panel 2602 includes selectable options, including a streamlined search option 2604 and a conceptual searching option 2606. The streamline searching option 2604 provides a targeted search scope to allow a user to search particular terms within a particular database. The conceptual searching option 2606 provides a broad search opportunity to identify all of the documents and not just the particular results. In other words, the graphical user interface 2600 provides a means by which a user can restrict or adjust search results to have high precision and/or high recall. The search panel also includes an option to start a new search 2608 and can include a list of saved searches 2610. In a particular illustrative embodiment, the list of saved searches 2610 includes a query expansion search snapshot 2612, which can be presented as a selectable link. Additionally, the query expansion search snapshot 2612 snapshot is associated with the user selectable icons including an information icon 2426, a sharing icon 2428, an e-mail icon 2430, and a trash icon 2432. Additionally, a description of the query expansion search snapshot 2612 includes a date of the particular search snapshot, a first indicator 2614 of a number of results in the search and a second indicator 2616 of a number of labels. In a particular illustrative example, a user may interact with the graphical user interface 2600 to rate individual search results on a scale from irrelevant to relevant (e.g., from one star to five stars). By rating a particular search result, the user can label selected results.

Figure 27:
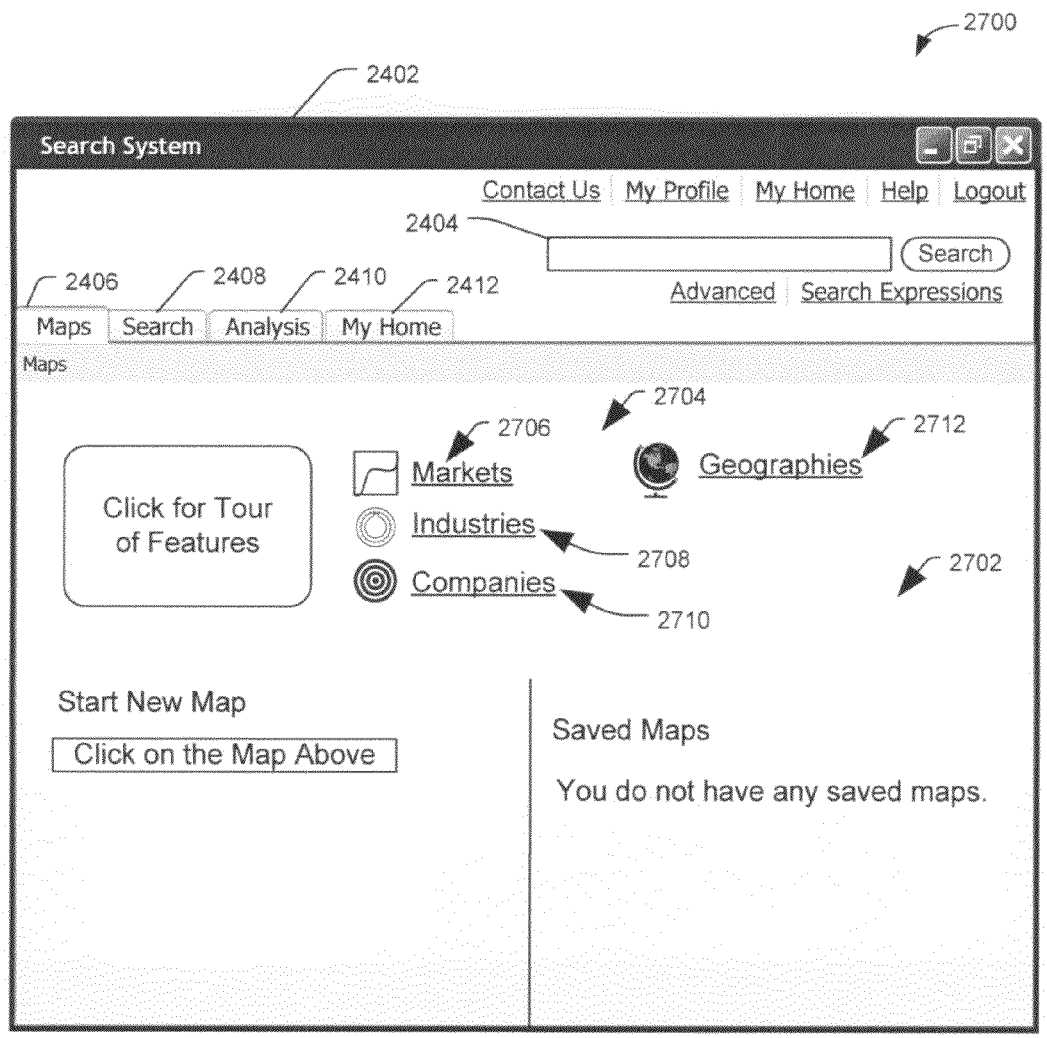

FIG. 27 is a diagram of a fourth particular illustrative embodiment of a graphical user interface 2700 to search data sources. The graphical user interface 2700 includes the window 2402 having a "Maps" panel 2702. The maps panel 2702 includes multiple selectable options 2704, such as a Markets option 2706, an industries option 2708, a companies option 2710, and a geographies option 2712. A user may select one of the selectable options 2704 to access particular visualizations (maps), which may include multiple selectable graphic elements to view search results in different ways. For example, the markets option 2706 may be selected to access a visualization including market data associated with particular search results. If a user selects the industries option 2708, the graphical user interface 2700 can display industry data related to the search results. If a user selects the companies option 2710, the graphical user interface 2700 may display data about the particular companies. If the geographies option 2712 is selected, data can be mapped to a selectable geographic map, which may be displayed within the graphical user interface 2700. In a particular illustrative embodiment, the graphical user interface 2700 may display legal risk and other data associated with a particular industry, and the graphical user interface may include selectable options, such as dollar ranges, sliding bars, buttons, pull-down menus, or other selectable options to adjust the particular information.

Figure 28:
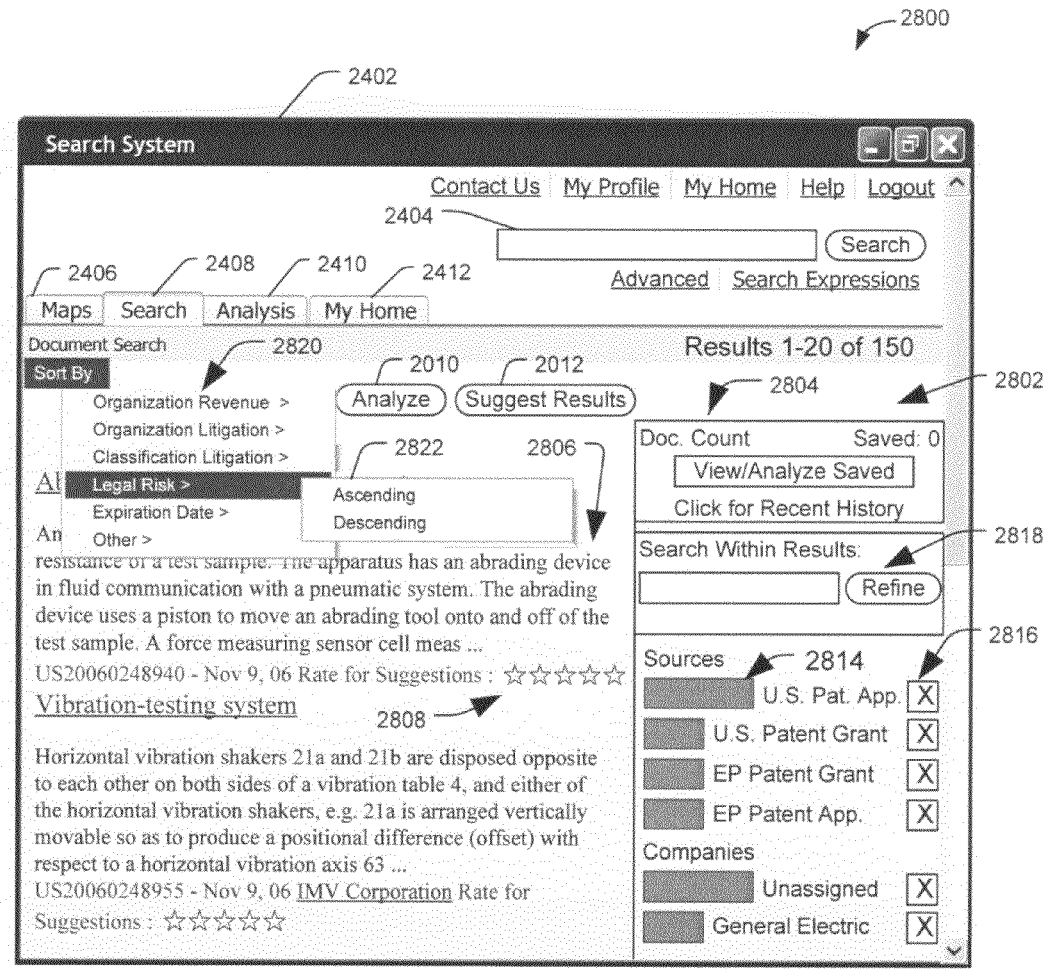

FIG. 28 is a diagram of a fifth particular illustrative embodiment of a graphical user interface 2800 to search data sources. The graphical user interface 2800 includes a search panel 2802 having a control panel 2804 and a list of search results 2806. Each search result is associated with selectable indicators 2808 for rating the search result on a scale of one to five stars (i.e. from "not relevant" to "relevant"). The selectable indicators 2808 are illustrative of one possible rating system. In a particular illustrative embodiment, the selectable indicators 2808 may be check boxes, radio buttons, other selectable objects, or any combination thereof. In another particular illustrative embodiment, the selectable indicators 2808 may be replaced with a numeric text input, a sliding bar (an adjustable element), another input type, or any combination thereof.

The selectable indicators 2808 allow the user to provide explicit feedback to the search system, which can use the explicit feedback to train a query learner and a document learner and to reverse engineer the search to produce new queries. In a particular illustrative embodiment, the contents of the control panel 2804 are dynamically generated by the search system based on the search results 2806. The control panel 2804 includes statistical information, such as a bar 2814 that represents a relative number of documents associated with a particular category from the search results, e.g., "United States Patent Applications." Additionally, each category may include a selectable option 2814, which a user may select to filter out search results that correspond to a particular category.

In a particular illustrative example, if a user selects the selectable option 2814 that is associated with the category "U.S. Pat. App.," the list of search results 2806 would be adjusted to remove patent applications from the displayed list. The selectable option 2814 may be called a "negation" option. Each category associated with the search results may be separately filtered, such that the user can selectively filter out "unassigned" patents and applications, particular companies, particular types of documents, other categories, or any combination thereof. In a particular illustrative embodiment, other document sources may include commercial databases, governmental databases, other data sources, or any combination thereof, which may be filtered using the selectable options 2814 that correspond with the particular category identifying the respective data source. Other categories of the search results may include industry classifications, geographic information, date information, other information, or any combination thereof.

Referring again to FIG. 28, the graphical user interface 2800 can include a "SORT BY" menu option 2820 that can be accessed by a user to sort items within the list of search results 2806. Each item within the list of search results 2806 may be related to a particular document. The SORT BY menu option 2820 allows the user to sort the items based on information that may or may not be contained within the documents. The "SORT BY" menu option 2820 includes an "Organization Revenue" option; an "Organization Litigation" option, a "Classification Litigation" option, an "Expiration Date" option, an "Other" option, and a "Legal Risk" option. The Organization Revenue option allows the user to sort the search results based on revenues of companies that own the document (e.g., assignees of the patent documents). The Organization Litigation option can be accessed to sort the search results based on a litigation history of an organization that owns the document. The Classification Litigation can be accessed to sort the search results based on a litigation history of the classification of the document. For example, a level of litigation activity within a particular classification with which the document is associated (e.g., semiconductor devices). The Expiration Date option can be accessed to sort the search results from a Patent Office (e.g., the United States Patent Office, the European Patent Office, other patent offices, or any combination thereof) based on a calculated expiration date, failure to pay maintenance fees, or invalidation. The search system can also calculate expiration dates for other types of data, such as Small Business Administration Innovative Research grants, which may have a request for proposal expiration date. Further, the search system can determine expiration dates related to Copyrights, Trademarks, user-defined expiration dates (such as an email expiration date), other expiration dates, or any combination thereof.

Other sorting options may include a number of documents associated with an organization or classification, a relevance ratings, date data, financial data, location data, author data, statistical data, reference data, pricing data, credit history, enterprise data, employee data, litigation data, user-provided data, user-defined sorting algorithm, or any combination thereof.

The Legal Risk option can be accessed by a user to sort the search results based on a probabilistic determination of legal risk (e.g., likelihood of a lawsuit, likelihood of a citation by another document, likelihood of licensing opportunities, other factors, or any combination thereof). In a particular illustrative, non-limiting embodiment, the search system can evaluate the legal risk based on patents and patent publications. In such an instance, the legal risk can be based on a number of claims, a number prior art citations, a number of forward references (e.g., references that cite the particular patent), a length of time between filing and grant of the patent, number of figures, number of pages, age of patent, number of inventors and information associated with the inventor (number of patents listing the inventor, distribution of patents within classification system, employment records, number of citations from other patents, number of publications or work outside of patents, other data, or any combination thereof).

Additionally, in such an instance, the legal risk can be based on assignee data, such as litigation history, financial history, entity type (e.g. university, small business, non-profit organization, inventor), local or foreign location, number of patents, number of citations from other publications, number of publications outside of patents, associations with industry standards, number of products, number of inventors, number of employees, other data, or any combination thereof. Also, in such an instance, the legal risk can be based on assignee data or the absence thereof. Further, the legal risk can be based on classification data, including litigation history, number of patents, number of citations, number of inventors, other data, or any combination thereof, within a particular classification. Additionally, the legal risk can be based on location data, including geographic data, logic geographic groupings (such as legal jurisdictions), litigation history data, country-based data (e.g., international laws, country-specific laws, treaties, other groupings, or any combination thereof), financial information, proximity to universities (i.e. proximity to intellectual talent pool), other categories, or any combination thereof. Additionally, the legal risk can be related to user-provided data or user-assigned rankings. In a particular embodiment, any of the above-listed factors may be used in any combination to evaluate legal risk.

In a particular instance, the Legal Risk option can be selected to access an associated submenu 2822, from which the user may specify an ascending or a descending order for the sorted results. Depending on which menu option is selected from the SORT BY menu 2820, other submenus and related sorting options can be accessed, allowing a user to view the same data in a variety of different ways.

Figure 29:
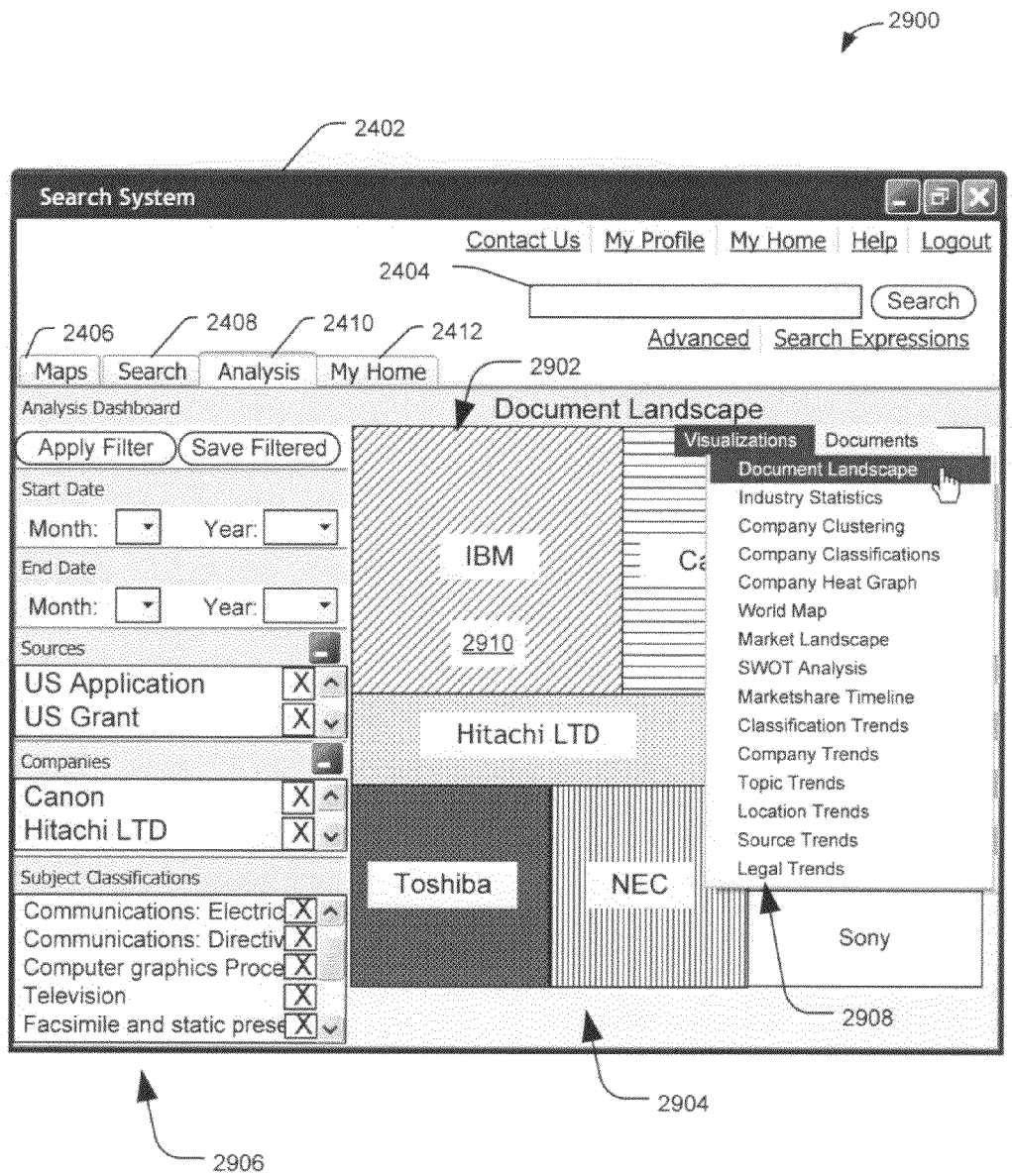

FIG. 29 is a diagram of a sixth particular illustrative embodiment of a graphical user interface 2900 to search data sources. The graphical user interface 2900 includes a visualization panel 2902 to display multiple visualizations of particular search results, such as the document landscape map 2904, and includes a control panel 2906. The document landscape map 2904 includes multiple selectable graphical elements, such as the selectable graphical element 2910 to access documents associated with a particular classification or category of the search results. The graphical user interface 2900 also includes a menu of selectable options 2908 for selecting between visualizations. The available visualizations that can be accessed using the menu of selectable options 2908 can include a document landscape visualization, an industry statistics visualization, a company clustering visualization, a company classifications visualization, a company "heat graph" visualization, a world map visualization, a market landscape visualization, a "strengths-weaknesses-opportunities-threats" (SWOT) visualization, a market-share timeline visualization, a classification trends visualization, a company trends visualization, a topic trends visualization, a location trends visualization, a source trends visualization, and a legal trends visualization. Visualizations may be added or omitted, depending on the particular implementation.

In a particular illustrative embodiment, each of the multiple selectable graphic elements, including the selectable graphic element 2910, has a size dimension indicating a relative number of documents associated with the particular category of information. Each of the selectable graphic elements may also have a respective color dimension, shading dimension, hatching dimension, or other visual indicator that represents the relative number of documents.

In a particular illustrative embodiment, the control panel 2906 provides multiple selectable options, including selectable classification negation options, selectable date options and other options. Selection of one of the selectable classification negation options causes the graphical user interface 2900 to display a document landscape 2904 that is adjusted according to the selection.

Figure 30:
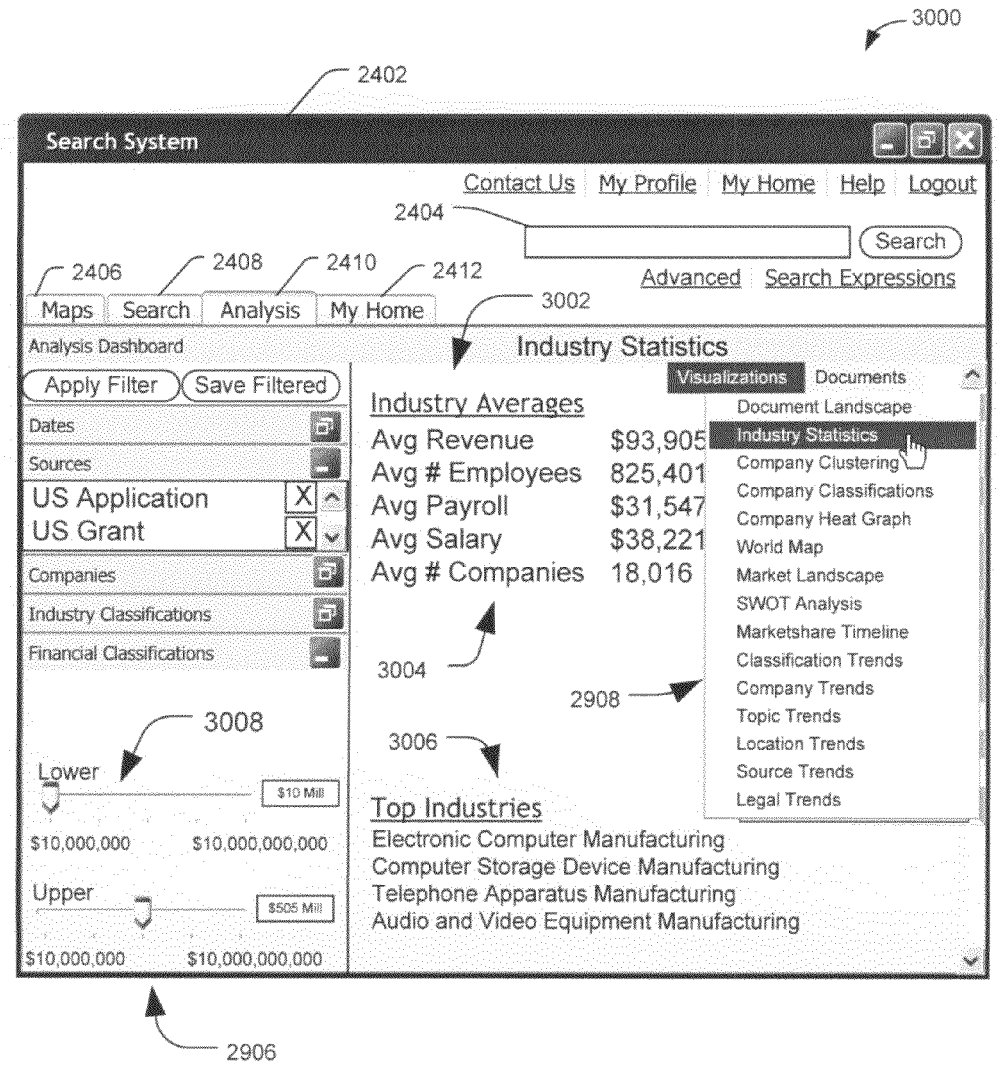

FIG. 30 is a diagram of a seventh particular illustrative embodiment of a graphical user interface 3000 to search data sources. The graphical user interface 3000 includes the control panel 2906 and an industry statistics visualization panel 3002 including industry average financial information 3004 and a list of top industries 3006 within a particular set of search results. The search system may retrieve financial data for the industry statistics visualization panel 3002 using a secondary search query derived from data extracted from search results related to a first (primary) query. The financial data can relate to companies based on ownership information extracted from the search results. For example, a search of the United States Patent Office patents database for particular keywords results in a list of search results. The search system can extract ownership data from the documents related to the search results and can search a financial database based on the ownership information to determine industry statistics corresponding to the search results. The control panel 2906 can include one or more slider control options 3008, which may be adjusted to define a parameter related to data associated with the search results, such as the financial data. For example, the slider control options 3008 may be adjusted to define a financial range, which may be used to filter the results.

Figure 31:
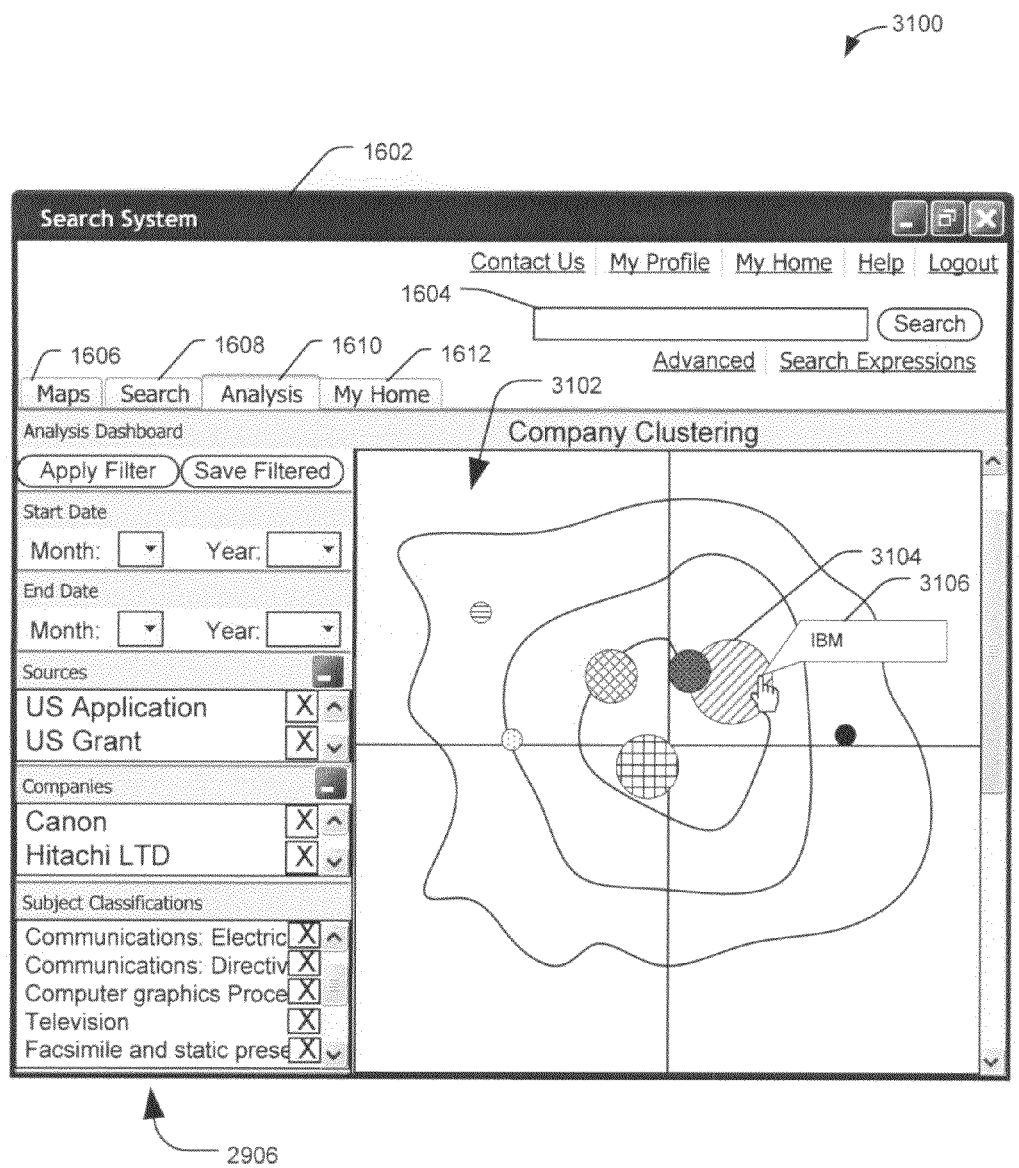

FIG. 31 is a diagram of an eighth particular illustrative embodiment of a graphical user interface 3100 to search data sources. The graphical user interface 3100 includes the control panel 2906 a company clustering visualization 3102, which displays search result data based on the ownership data. In particular, the company clustering visualization includes multiple selectable graphic elements, such as the selectable graphic element 3104. The graphical user interface 3100 may produce a callout when a pointer is placed over a particular selectable indicator. For example, when the pointer is placed over the selectable graphic element 3104, a callout 3106 is displayed indicating that the selectable graphic element 3104 is related to documents associated with IBM Corporation. Each selectable graphic element, including the selectable graphic element 3104, can include a size dimension, a color dimension, a shading dimension, a hatching dimension, an other visual dimension, or any combination thereof, indicating a relative size of a document space for a particular company relative to other companies represented within the search results. In a particular illustrative embodiment, the user may access the callout to provide a user input. The search system can associate the user input to the selectable graphic element, such as the selectable graphic element 3104, allowing the user to label or tag data. The search system can utilize such explicit user feedback for data retrieval, data classification, and personalized searching.

Figure 32:
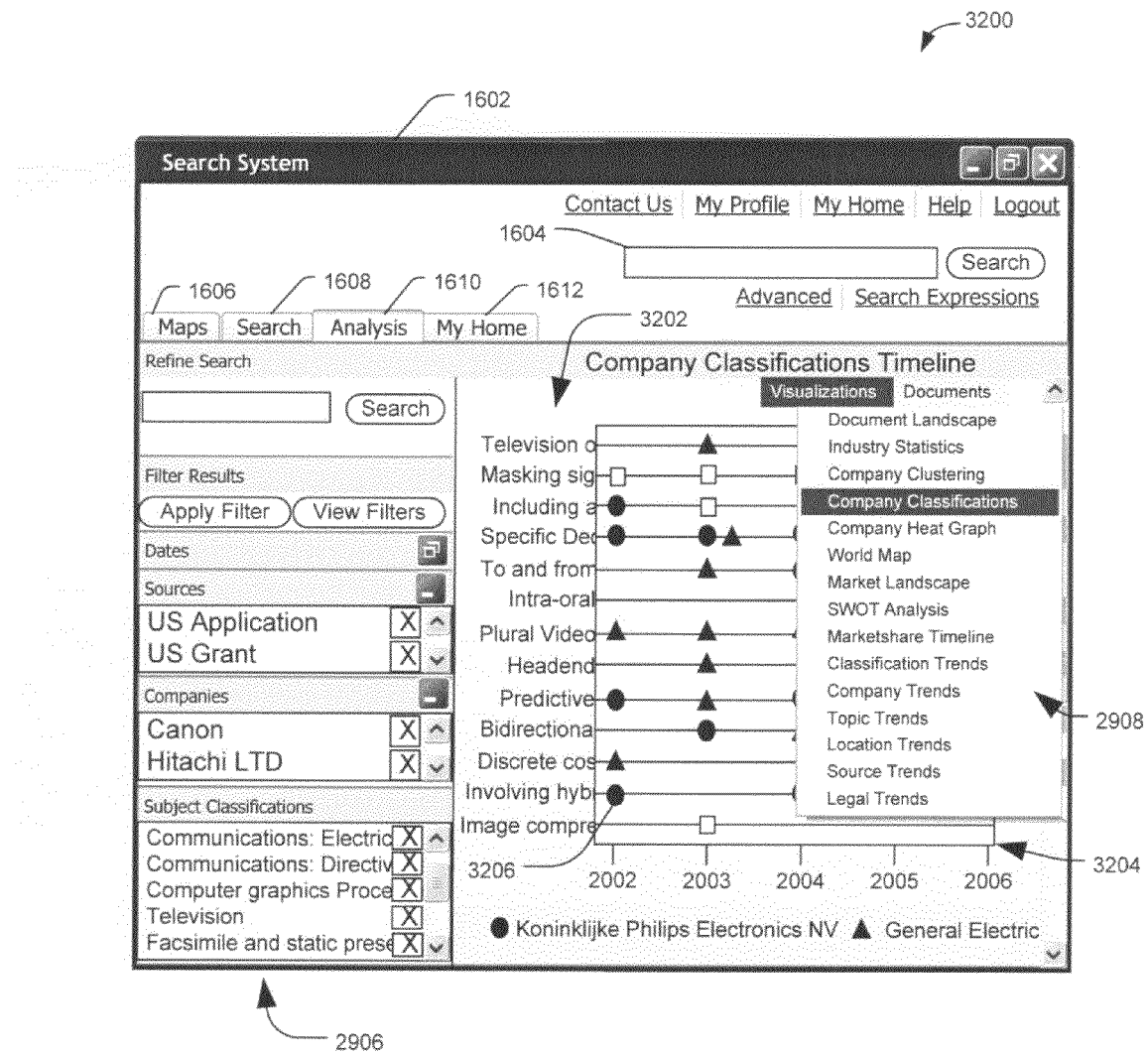

FIG. 32 is a diagram of a ninth particular illustrative embodiment of a graphical user interface 3200 to search data sources. The graphical user interface 3200 includes the control panel 2906 and a company classification timeline visualization panel 3202, which includes a timeline chart 3204 having multiple selectable indicators, such as the selectable indicator 3206. The timeline chart 3204 represents a timeline of document categories for each company represented within the search results. In a particular illustrative embodiment, the selectable indicator 3206 may be selected to access documents associated with the particular category for the year 2002 and for the particular company, Koninklijke Philips Electronics NV. In general, the control panel 2906 may be used to filter the search results, which changes the data shown at the company classification timeline visualization panel 3202.

Figure 33:
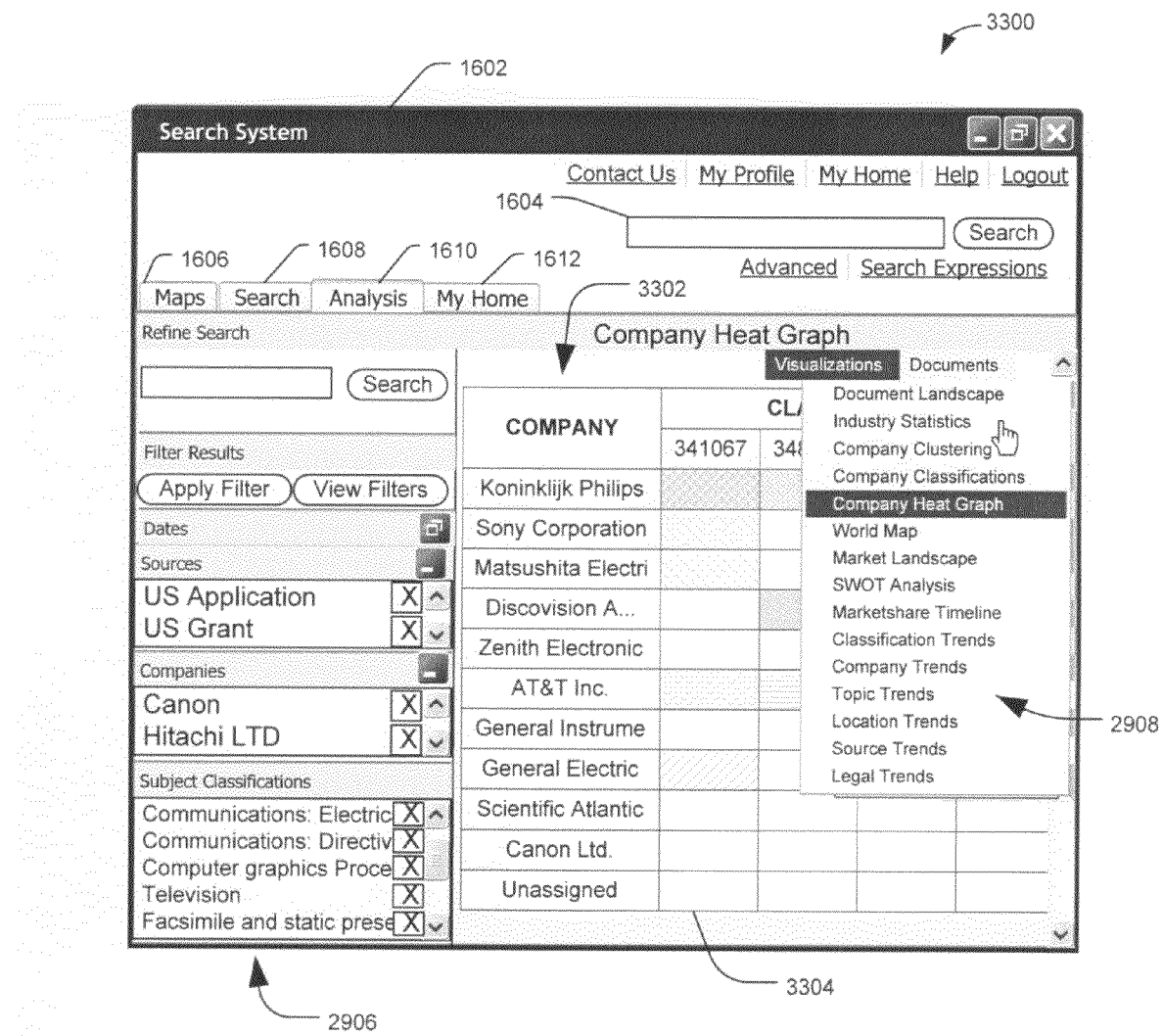

FIG. 33 is a diagram of a tenth particular illustrative embodiment of a graphical user interface 3300 to search data sources. The graphical user interface 3300 includes the control panel 2906 and a company heat graph visualization panel 3302. In a particular illustrative embodiment, the heat graph visualization panel 3302 may represent documents associated with particular companies represented within the search results that are related to a particular United States Patent Office classification. Alternatively, the heat graph visualization panel 3302 may, which includes a chart 3304 that represents documents associated with particular companies represented within the search results that are related to a particular industry classification, a particular subject matter, an other classification or category, or any combination thereof. The particular table cells may include a visual dimension, such as a color dimension, a cross-hatching dimension, a shading dimension, another visual indication, or any combination thereof, to represent a relative size of a document space within a particular category.

Figure 34:
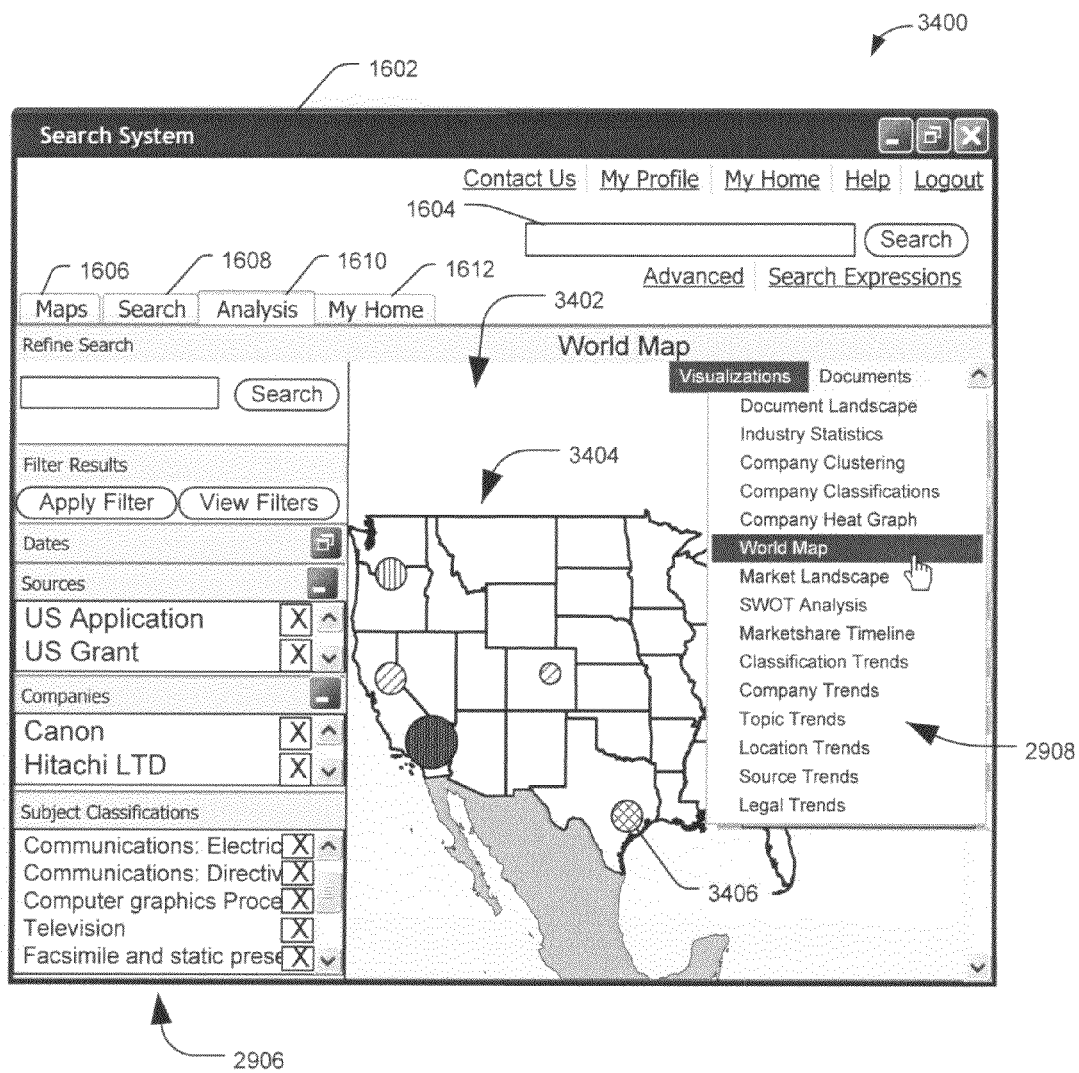

FIG. 34 is a diagram of an eleventh particular illustrative embodiment of a graphical user interface 3400 to search data sources. The graphical user interface 3400 includes a control panel 2906 and a world map visualization panel 3402. The world map visualization panel 3402 includes a selectable map 3404 including multiple selectable graphic elements, such as the selectable graphic element 3406, which represents a geographic cluster of documents related to the search results. For example, the selectable graphic element 3406 can represent documents having geographic attributes associated with Houston, Tex. Selection of the selectable graphic element 3406 causes the graphical user interface 3402 to display the documents within the search results that are associated with Houston, Tex. In a particular illustrative embodiment, the geographic association may be based on an author's address, an assignee's address, or other geographic information within a document associated with the search results.

Figure 35:
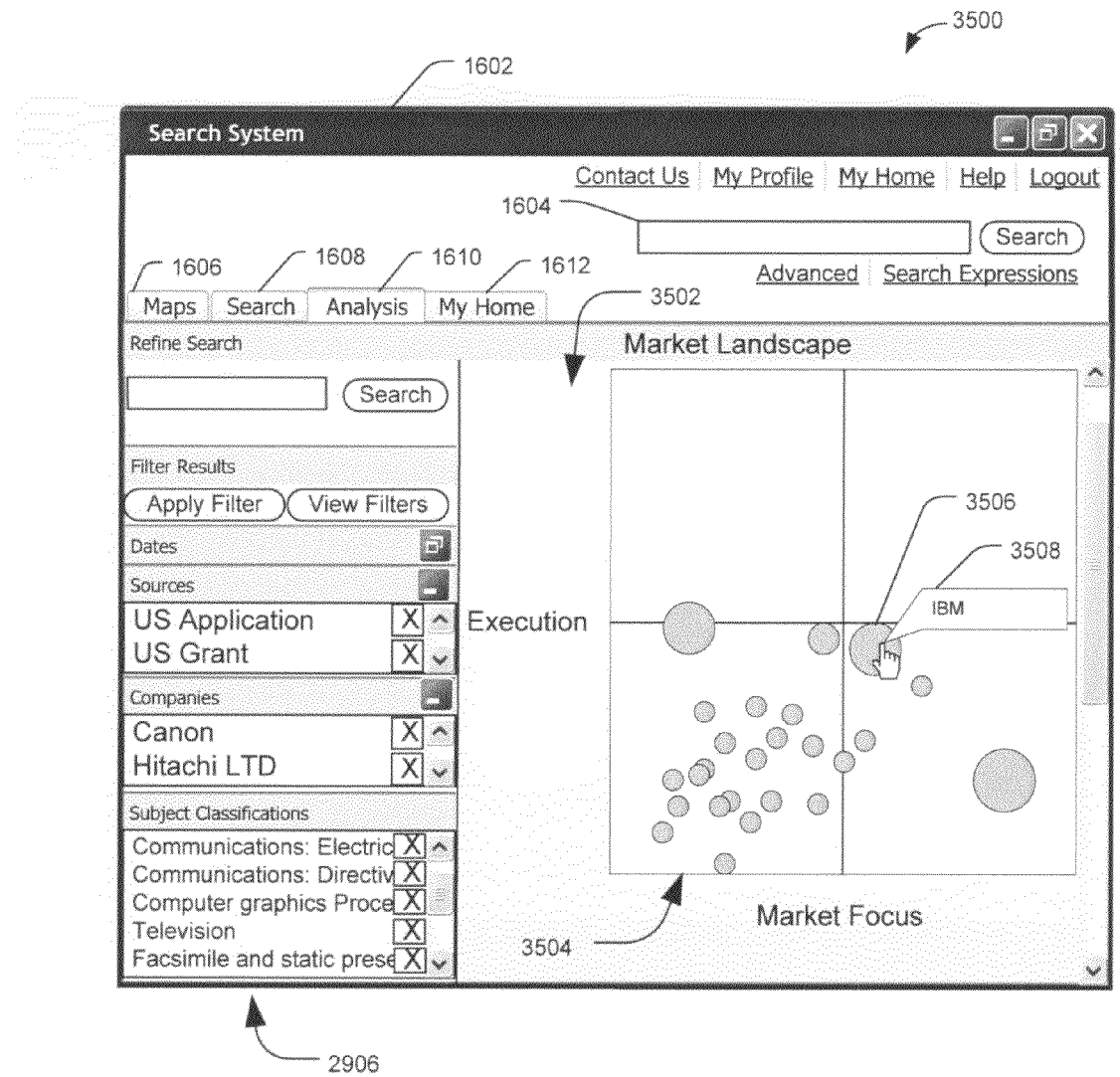

FIG. 35 is a diagram of a twelfth particular illustrative embodiment of a graphical user interface 3500 to search data sources. The graphical user interface 3500 includes a control panel 2906 and a market landscape visualization panel 3502, which includes a market landscape map 3504 having multiple selectable graphical indicators, such as the selectable graphical indicator 3506. The market landscape map 3504 provides a visual representation of the search results for each company plotted on a graph based on execution (e.g., number of documents) versus a particular category of information (e.g., industry classification, market classification, document classification, other classifications, or any combination thereof). When a pointer is positioned over the selectable graphic indicator 3506, a callout 3508 is displayed, indicating an association between the selectable graphic element 3506 and a company, i.e. IBM. By selecting one of the selectable graphic elements (by clicking on the element using a mouse pointer, for example), documents associated with the selected graphic element may be displayed.

Figure 36:
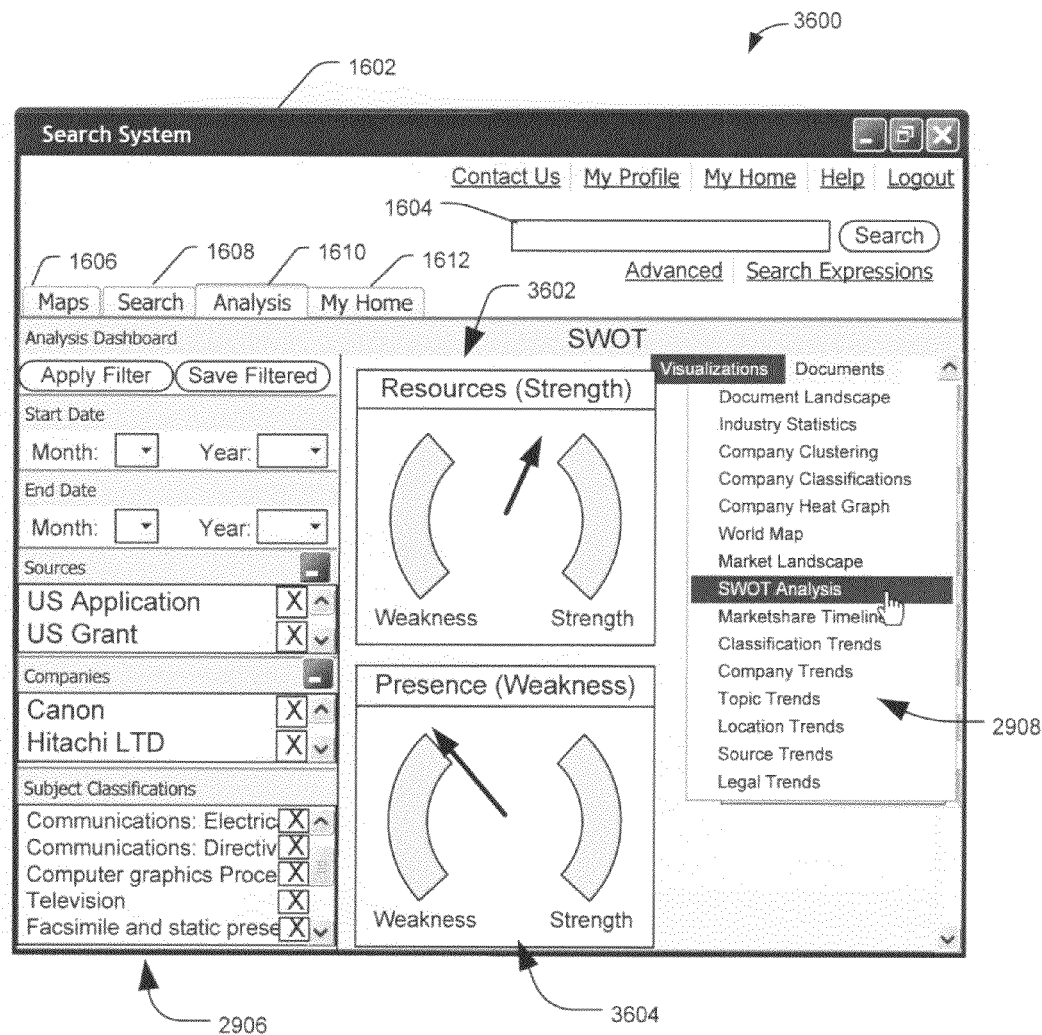

FIG. 36 is a diagram of a thirteenth particular illustrative embodiment of a graphical user interface 3600 to search data sources. The graphical user interface 3600 includes a control panel 2906 and a strengths-weaknesses-opportunities-threats (SWOT) panel 3602. The SWOT panel 3604 includes multiple selectable dashboard elements 3604, which indicate aspects of a company's performance relative to other companies. The SWOT panel 3604 provides a dynamic visual representation of the search results, providing a different perspective on the same information. The SWOT panel 3604 can be used to capture competitive intelligence. The SWOT panel 3604 can be used to identify competitors (new entrants and existing threats) and to readily compare competitive strengths, weaknesses, opportunities, and threats. The SWOT panel 3604 may also be used to identify potential partners for acquiring existing technologies.

Figure 37:
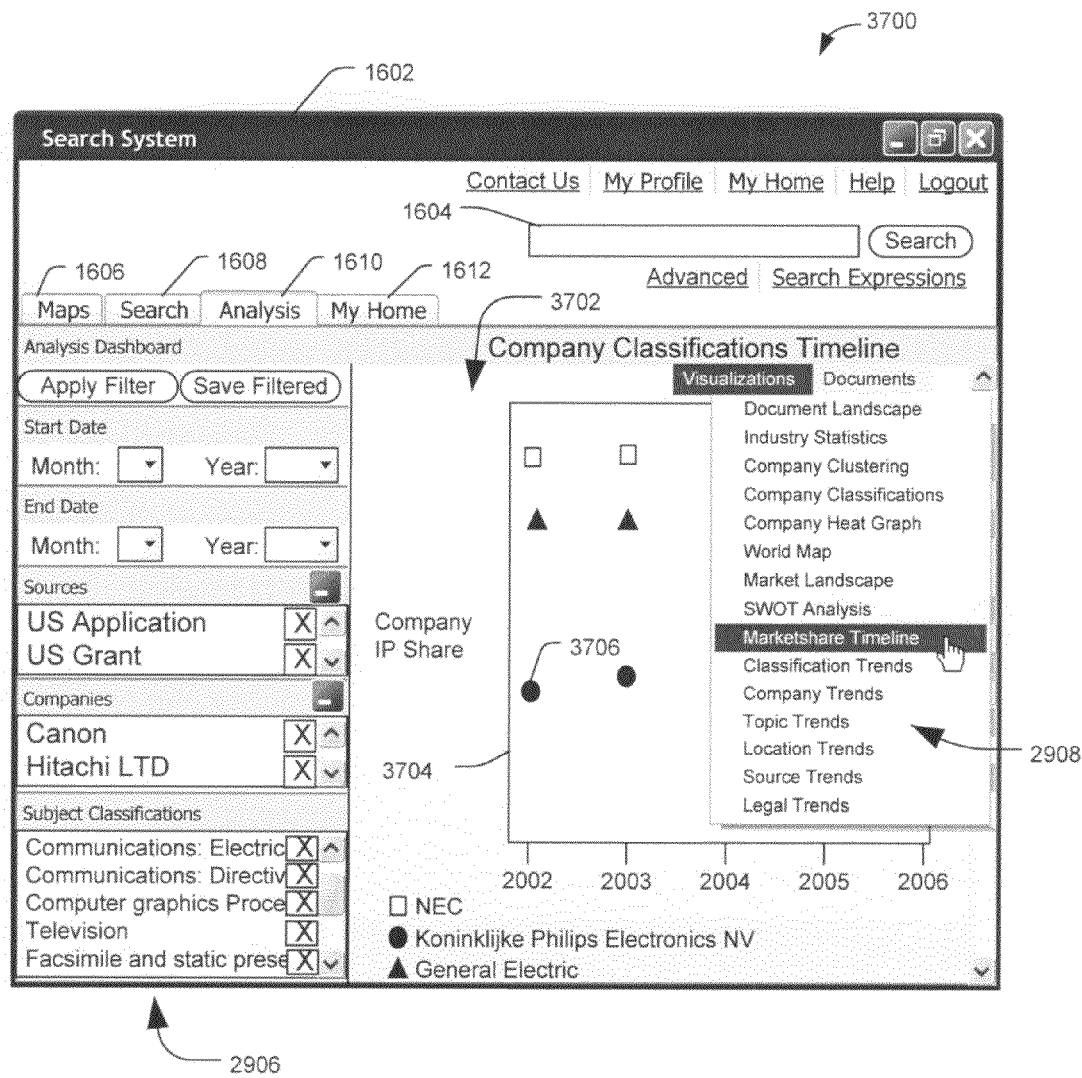

FIG. 37 is a diagram of a fourteenth particular illustrative embodiment of a graphical user interface 3700 to search data sources. The graphical user interface 3700 includes a control panel 2906 and a company classification timeline panel 3702, which includes a graph 3704 of the company's documents over time. The graph 3704 includes multiple selectable graphic elements 3706, which represent a particular company's documents within a particular classification at a particular time. In a particular embodiment, the graph 3704 may display the documents associated with a particular United States Patent Office classification.

Figure 38:
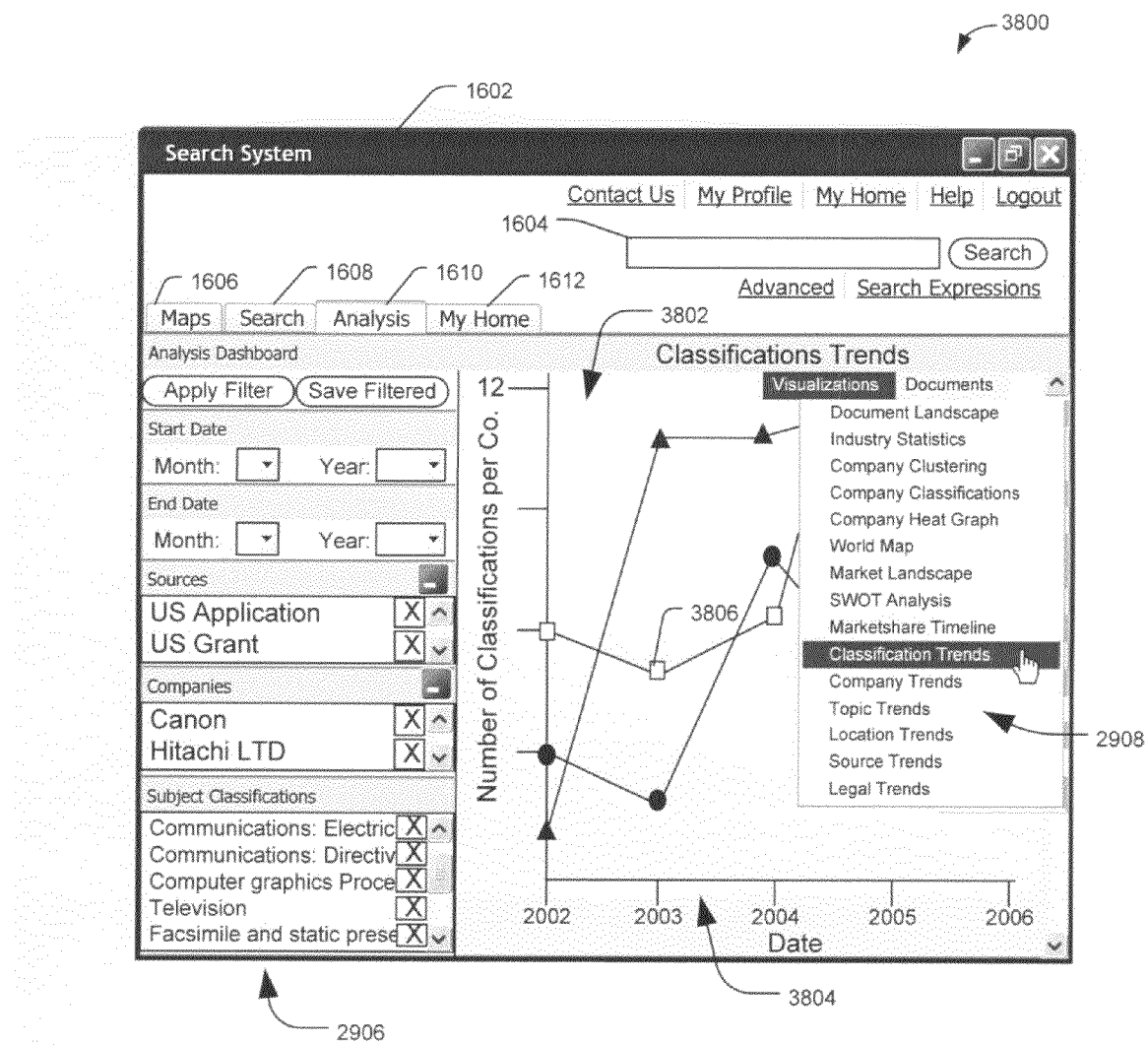

FIG. 38 is a diagram of a fifteenth particular illustrative embodiment of a graphical user interface 3800 to search data sources. The graphical user interface 3800 includes a control panel 2906 and a classification trends panel 3802, including a graph 3804 having multiple selectable graphical elements, such as the selectable graphical element 3806. In a particular illustrative embodiment, the graph 3804 may display a relative number of classifications per company for a period of time. In a particular embodiment, the classifications may include document classifications (such as United States Patent Office classifications, document classifications, subject matter classifications, other classifications, manual search scope, or any combination thereof). The classifications may be determined directly from the search results, from NAICS industry classifications, from correlations between the search results and industry classifications, from other classifications (such as pre-defined categories, abstract-based categories, keyword categories, or other categories), or from any combination thereof.

Figure 39:
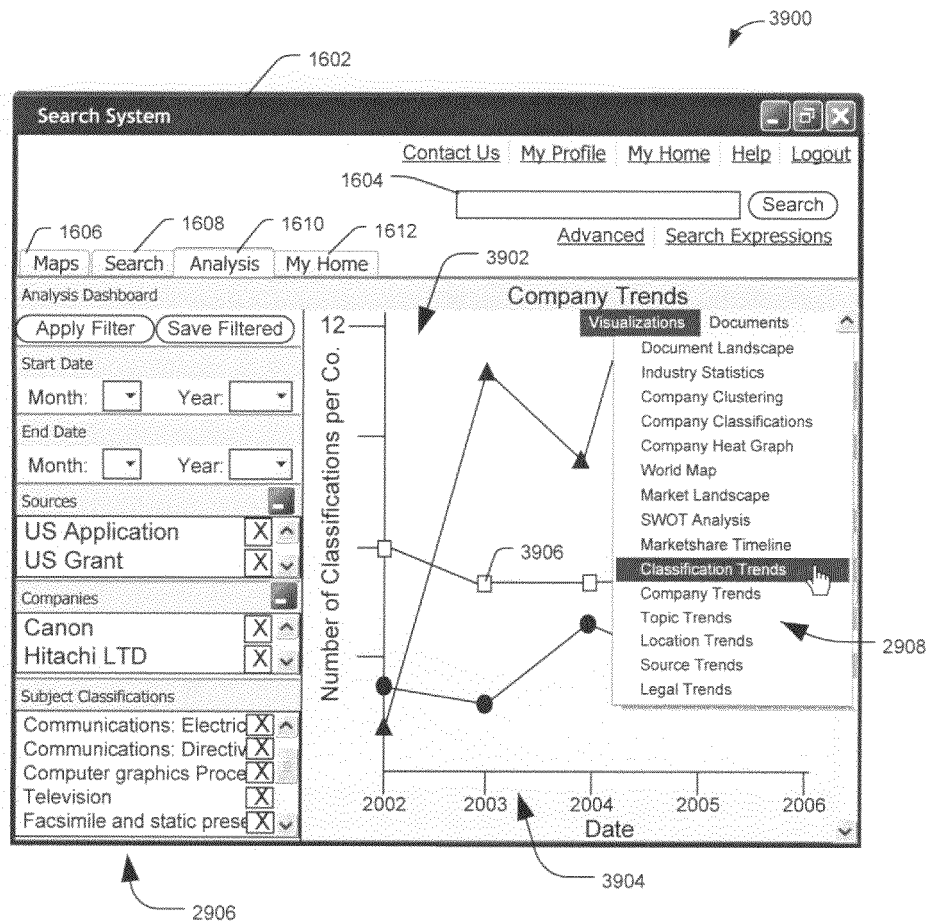

FIG. 39 is a diagram of a sixteenth particular illustrative embodiment of a graphical user interface 3900 to search data sources. The graphical user interface 3900 includes a control panel 2906 and a company trends visualization panel 3902, including a company trends graph 3904 having multiple selectable graphical elements 3906. The company trends graph 3904 can display information about a relative number of documents per classification.

In general, the search system is adapted to generate multiple graphical user interfaces and to provide multiple visualizations of the same data. In a particular illustrative embodiment, the search system generates a graphical user interface and provides the graphical user interface to a destination device, such as remote computer, for display. In another particular illustrative embodiment, the search system generates a graphical user interface and provides instructions executable by a browser application at the destination device, which executes the instructions to render the graphical user interface.

In a particular illustrative embodiment, each of the visualizations may be stored by the search system as a separate module, allowing additional visualizations to be added on the fly (dynamically), without having to compile the new code with the existing code. Processing logic at the search system can immediately implement new visualizations by providing the up-to-date menu options each time the user device accesses the search system.

Additionally, while the control panel 2906 included pull-down menus, check boxes, text boxes, and buttons to interact with the search results, it should be understood that other selectable control elements may also be included in the control panel 2906. For example, the control panel 2906 can include a slider, a rotatable knob, a set of radio buttons, other selectable indicators, or any combination thereof, which may be used to interact with the search results. In a particular embodiment, the legal trends visualization may provide insights into a particular company's litigation history, including settlements, licensing, verdicts, number of litigations (pending, settled, or ended), other information, or any combination thereof. Particular selectable elements may be provided to interact with particular aspects of the information to adjust the search results to identify particular information. For example, in a particular illustrative, non-limiting embodiment, a slider may be adjusted to identify companies that have less than five previous litigation matters, that have settled for $20,000 to $50,000, that have lost jury verdicts in excess of $10,000,000, or any combination thereof.

In a particular illustrative embodiment, the search system may be implemented as a single server adapted to execute multiple program modules. In another particular embodiment, the search system may be implemented using multiple servers ("a server system") in which various functions may be balanced across the multiple servers. In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can utilize distributed processing, component/object distributed processing, and parallel processing. Alternatively, virtual computer system processing can be constructed to implement one or more of the methods or functionality as described herein. Additionally, the present disclosure contemplates a computer-readable medium that includes instructions or receives and executes instructions responsive to a propagated signal, so that a device connected to a network can receive and execute the instructions.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of goal-oriented searching, the method comprising:
   providing a graphical user interface (GUI) to a user device from a server, the GUI including an input field accessible by a user to provide a text input and a selectable indicator accessible by the user to select one of a plurality of goal-oriented searches, each of the plurality of goal-oriented searches comprising a pre-defined query stored at a server prior to interaction by the user;
   receiving a user input including the text input and a selection corresponding to the selectable indicator indicating a selected one of the plurality of pre-defined goal oriented searches;
   retrieving a first document based on the text input;
   searching one or more data sources based on data extracted from the first document and according to search parameters defined by the selected one of the plurality of pre-defined goal oriented searches to identify a set of documents;
   applying a rule derived from explicit user interactions and implicit user interactions to produce a matrix including highest probability keywords identified from the search results;
   identifying a plurality of search results using a greedy algorithm;
   retrieving ancillary information from a secondary search of at least one other data source using a query that is related to data from the plurality of search results, the ancillary information including associative data that is not included within the search results;
   correlating the search results with the ancillary information to identify associations between search results to produce augmented search results;
   refining the rule based on the data;
   applying the refined rule to filter the set of documents based on the data extracted from the first document to produce a first filtered results; and
   providing an interface to the user device to present multiple views of the data, the multiple views including a first view and a second view that present the first filtered results in different contexts.

2. The method of claim 1, further comprising:
   performing link analysis on one or more links contained within the first document to extract additional information related to the pre-defined query.

3. The method of claim 2, wherein the first document comprises semi-structured data.

4. The method of claim 1, wherein the goal-oriented query comprises a competitive analysis search to identify data related to competitors of a particular entity represented by the first data.

5. The method of claim 1, wherein the goal-oriented query comprises an asset licensing search to identify data related to potential licensees of an asset represented by the first document.

6. The method of claim 1, wherein the goal-oriented query comprises a patent invalidity search to invalidate a patent identified within the first data.

7. The method of claim 1, wherein the goal-oriented query comprises an asset identifying search to identify a potentially valuable asset from a plurality of assets identified in the first document.

8. The method of claim 1, wherein the selected one of the plurality of goal oriented searches defines multiple criteria, and wherein the multiple criteria includes a date criteria automatically determined from the first document.

9. The method of claim 1, wherein the selected one of the plurality of goal oriented searches defines multiple criteria, and wherein the multiple criteria includes an industry classification.

10. The method of claim 1, wherein the selected one of the plurality of goal oriented searches defines multiple criteria, and wherein the multiple criteria includes an organization identifier.

11. The method of claim 1, wherein the selected one of the plurality of goal oriented searches defines multiple criteria, and wherein the multiple criteria includes a location identifier.

12. The method of claim 1, wherein the selected one of the plurality of goal oriented searches defines multiple criteria, and wherein the multiple criteria includes a range of annual revenues associated with an organization.

13. A computing system comprising:
   a network interface configured to couple to a network;
   a processor coupled to the network interface; and
   a memory accessible to the processor and storing instructions that, when executed, cause the processor to:
      receive a user input including a text input and a selection indicating a selected one of a plurality of goal oriented searches from a user device via the network interface, the plurality of goal oriented searches including a patent invalidity search;
      retrieve a first document based on the text input, the text input including a patent number;
      extract data from the first document, the extracted data including at least one of a list of citations and a priority date;
      search one or more data sources using the data from the first document based on the selected one of the plurality of goal oriented searches to produce a set of documents that satisfy multiple criteria defined by the selected one;
      apply a rule derived from explicit user interactions and implicit user interactions to produce a matrix including highest probability keywords identified from the search results;
      identify a plurality of search results using a greedy algorithm;

retrieve ancillary information from a secondary search of at least one other data source using a query that is related to data from the plurality of search results, the ancillary information including associative data that is not included within the search results;

correlate the search results with the ancillary information to identify associations between search results to produce augmented search results;

refine the rule based on the data; and filter the set of documents based on the extracted data to produce search results.

14. The system of claim 13, wherein the memory further comprises instructions executable by the processor to generate instructions executable at a destination device to render a second graphical user interface including data related to search results from the selected one of the plurality of goal oriented searches.

15. The system of claim 13, wherein the memory further comprises instructions executable by the processor to send data related to the selected one of the plurality of goal oriented searches to one or more data sources and to generate a visualization of search results from the selected one of the plurality of goal oriented searches.

16. The system of claim 13, wherein the memory further comprises instructions executable by the processor to generate selectable navigation elements related to search results from the selected one of the plurality of goal oriented searches.

17. The system of claim 13, wherein the memory further comprises instructions executable by the processor to reverse engineer a query from the data extracted from the first document.

18. The method of claim 13, wherein the memory further comprises instructions executable by the processor to reverse engineer a query from documents associated with a company that is related to the data extracted from the first document.

19. The method of claim 13, wherein the memory further comprises instructions executable by the processor to query multiple data sources using the data extracted from the first document.

20. The system of claim 13, wherein the selected one of the plurality of goal oriented searches comprises a one-click asset licensing search to identify one or more potential licensees of an identified licensable asset represented by the text input.

21. The system of claim 13, wherein the selected one of the plurality of goal oriented searches comprises a competitive analysis search to identify data related to competitors of a particular entity.

22. The system of claim 13, wherein the selected one of the plurality of goal oriented searches comprises an asset identifying search to identify a potentially valuable asset from a plurality of assets.

23. A computer-readable storage device embodying instructions that, when executed by a processor, cause the processor to:

receive an input corresponding to one of a company name and a patent document identifier and an identifier related to a selected one of a plurality of pre-defined goal oriented searches, each of the plurality of pre-defined goal oriented searches comprising multiple criteria, the plurality of pre-defined goal oriented searches including a patent invalidity search;

retrieve a first document based on the input, the first document comprising a patent document corresponding to the patent document identifier;

extract data from the first document using an extraction module, the extracted data including a priority date, an issue date, owner data, and a list of cited references;

insert at least some of the extracted data from the first document into the selected one of the plurality of pre-defined goal oriented searches provided by a server to produce a goal-oriented query constructed to identify one or more documents that satisfy the multiple criteria;

search one or more data sources using the goal-oriented query to retrieve search results;

apply a rule derived from explicit user interactions and implicit user interactions to produce a matrix including highest probability keywords identified from the search results;

identify a plurality of search results using a greedy algorithm;

retrieve ancillary information from a secondary search of at least one other data source using a query that is related to data from the plurality of search results, the ancillary information including associative data that is not included within the search results;

correlate the search results with the ancillary information to identify associations between search results to produce augmented search results;

refine the rule based on the data; and apply the refined rule to filter the search results according to some of the extracted data to produce filtered search results including prior art not cited in the patent document when the identifier corresponds to the patent invalidity search.

24. The computer-readable storage device of claim 23, further comprising instructions that, when executed by the processor, cause the processor to:

perform link analysis on one or more links contained within the first document to extract additional information related to the pre-defined query.

25. The computer-readable storage device of claim 23, wherein:

the plurality of pre-defined goal oriented searches further includes a competitive analysis search; and when the identifier corresponds to the competitive analysis search, further comprising instructions that, when executed, cause the processor to generate a competitive analysis report to identify data related to competitors of a particular entity based on search results from the pre-defined query.

26. The computer-readable storage device of claim 23, wherein:

the plurality of pre-defined goal oriented searches further includes a licensee search; and when the identifier corresponds to the licensee search, further comprising instructions that, when executed by the processor, cause the processor to generate a licensee report to identify data related to potential licensees of an asset based on search results from the pre-defined query.

27. The computer-readable storage device of claim 23, further comprising instructions that, when executed by the processor, cause the processor to:

generate a patent invalidity report to identify data related to documents that may invalidate one or more claims of the patent document corresponding to the patent document identifier based on search results from the pre-defined query; and wherein the processor uses the extracted data from the first document to filter the search results to produce a set of search results listing patents that were not cited during prosecution of the particular patent and that are related to the subject matter of the particular patent through at least one of a relationship to another patent cited in the particular patent, shared key words, and shared classifications.

28. The computer-readable storage device of claim 23, wherein:
the plurality of pre-defined goal oriented searches further includes an asset search; and
when the identifier corresponds to the asset search, further comprising instructions that, when executed, cause the processor to generate an asset report to identify data related to a potentially valuable asset from a plurality of assets based on search results from the pre-defined query.

* * * * *